US012809485B2

(12) United States Patent
Zhou

(10) Patent No.: US 12,809,485 B2
(45) Date of Patent: Nov. 24, 2026

(54) TOUCH SENSOR AND PREPARATION METHOD THEREOF, AND ELECTRONIC DEVICE COMPRISING TOUCH SENSOR

(71) Applicant: SHENZHEN SHOKZ CO., LTD., Shenzhen (CN)

(72) Inventor: Wenbing Zhou, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 2 days.

(21) Appl. No.: 18/822,266

(22) Filed: Sep. 1, 2024

(65) Prior Publication Data

US 2024/0419283 A1 Dec. 19, 2024

Related U.S. Application Data

(63) Continuation of application No. PCT/CN2022/136267, filed on Dec. 2, 2022.

(51) Int. Cl.
*G06F 3/044* (2006.01)
*G06F 3/041* (2006.01)

(52) U.S. Cl.
CPC .......... *G06F 3/0443* (2019.05); *G06F 3/0414* (2013.01); *G06F 2203/04103* (2013.01)

(58) Field of Classification Search
CPC ................. G06F 3/0443; G06F 3/0414; G06F 2203/04103; G06F 3/04146
See application file for complete search history.

(56) References Cited

U.S. PATENT DOCUMENTS 10,871,867 B1 12/2020 Banss et al.
2003/0205450 A1 11/2003 Divigalpitiya et al.
(Continued)

FOREIGN PATENT DOCUMENTS

CN 206627934 U 11/2017
CN 110045869 A 7/2019
(Continued)

OTHER PUBLICATIONS

International Search Report in PCT/CN2022/136267 mailed on Jun. 16, 2023, 6 pages.
(Continued)

*Primary Examiner* — Temesghen Ghebretinsae
*Assistant Examiner* — Ivelisse Martinez Quiles
(74) *Attorney, Agent, or Firm* — METIS IP LLC

(57) ABSTRACT

The present disclosure provides a touch sensor, comprising: a first electrode, a second electrode, and a matrix, the first electrode and the second electrode being located on both sides of the matrix, respectively; and at least one conduction post located in the matrix, at least one end of the at least one conduction post being electrically connected with the first electrode or the second electrode. When the matrix is in a natural state, an open circuit is formed between the first electrode, the at least one conduction post, and the second electrode. When a user exerts a force on the first electrode or the second electrode, the matrix deforms, and the first electrode and the second electrode are electrically connected by the at least one conduction post such that a closed circuit is formed between the first electrode, the at least one conduction post, and the second electrode.

11 Claims, 27 Drawing Sheets

(56) References Cited

U.S. PATENT DOCUMENTS

| | | | | |
|---|---|---|---|---|
| 2006/0283267 | A1* | 12/2006 | Tanabe | G06F 3/047 73/862.041 |
| 2018/0253180 | A1 | 9/2018 | Bie et al. | |
| 2022/0011899 | A1* | 1/2022 | Kim | G06F 3/0418 |

FOREIGN PATENT DOCUMENTS

| | | | |
|---|---|---|---|
| CN | 209895308 | U | 1/2020 |
| KR | 101964879 | B1 | 4/2019 |
| WO | 2019014243 | A1 | 1/2019 |

OTHER PUBLICATIONS

Written Opinion in PCT/CN2022/136267 mailed on Jun. 16, 2023, 6 pages.
The Extended European Search Report in European Application No. 22966951.0 mailed on Apr. 4, 2025, 11 pages.

* cited by examiner (a)

(b)

2700

2800

TOUCH SENSOR AND PREPARATION METHOD THEREOF, AND ELECTRONIC DEVICE COMPRISING TOUCH SENSOR

CROSS-REFERENCE TO RELATED APPLICATIONS

This application is a Continuation of International Patent Application No. PCT/CN2022/136267, filed on Dec. 2, 2022, the entire contents of which are incorporated herein by reference.

TECHNICAL FIELD

The present disclosure relates to the field of touch sensing technology, and in particular to a touch sensor and a preparation method thereof, and an electronic device.

BACKGROUND

As an important human-computer interaction method, touch sensing has been widely used in various electronic products. Touch sensing requires the touch sensor to generate electrical signals or change in electrical signals under the stimulation of the user's tapping, long pressing, sliding, etc. At present, the most commonly used touch sensor is the capacitive touch sensor. When the user's limb is close to or in contact with the capacitive touch sensor, the user's limb can be regarded as an equivalent capacitor plate, forming capacitance with the plates of the capacitive touch sensor. The capacitance is sensed by a test circuit and converted into a corresponding signal to realize touch-sensing control. However, the capacitive touch sensor is susceptible to interference. For example, when the capacitive touch sensor is applied to an earphone, the capacitive touch sensor is usually disposed on the inner surface of the housing of the earphone. When the user sweats during exercise, sweat may easily remain on the outer surface of the housing and form capacitance with the plate of the capacitive touch sensor disposed on the inner surface of the housing, which may result in false touch.

Therefore, it is desirable to provide a touch sensor that is not susceptible to external interference and is not prone to false touch.

SUMMARY

One of the embodiments of the present disclosure provides a touch sensor. The touch sensor may comprise: a first electrode, a second electrode, and a substrate, the first electrode and the second electrode being located on both sides of the substrate, respectively; and at least one conduction post located in the substrate. One end of the at least one conduction post may be electrically connected with the first electrode or the second electrode. When the substrate is in a natural state, an open circuit may be formed between the first electrode, the at least one conduction post, and the second electrode. When a user exerts a force on the first electrode or the second electrode, the substrate may deform, and the first electrode and the second electrode may be electrically connected by the at least one conduction post such that a closed circuit may be formed between the first electrode, the at least one conduction post, and the second electrode One of the embodiments of the present disclosure further provides a sensor for recognizing a user gesture. The sensor may comprise a plurality of touch sensors as described in any one described above, wherein the plurality of touch sensors may be distributed in an array, and each of at least two of the plurality of touch sensors may form a closed circuit therewithin in response to the user gesture; a power supply structure, configured to supply power to the plurality of touch sensors; and a processor, configured to determine a sliding direction of the user gesture based on position information of the at least two of the plurality of touch sensors and time information at which the closed circuit is formed.

One of the embodiments of the present disclosure further provides an electronic device. The electronic device may comprise an electronic device carrier; and at least one touch sensor of any one described above. The electronic device carrier may include a housing. The at least one touch sensor may be integrated in the housing of the electronic device carrier. The first electrode or the second electrode may be located on an inner surface or an outer surface of the housing.

One of the embodiments of the present disclosure provides a preparation method for a touch sensor. The preparation method may comprise: obtaining an electrode having a plate structure by performing patterning on at least one of two conductive structures, the electrode being provided with at least one conduction post protruding relative to a surface of the plate structure; spin coating the at least one of two conductive structures after the patterning with a flexible material such that the flexible material covers the electrode and the at least one conduction post; forming a substrate after the flexible material is solidified, and providing one or more hole portions on the substrate, the at least one conduction post being in flow communication with the outside through the one or more hole portions; and connecting the at least one of two conductive structures after the patterning and formation of the substrate with another of the two conductive structures such that the two conductive structures may be located on both sides of the substrate and cover the one or more hole portions to form the touch sensor.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
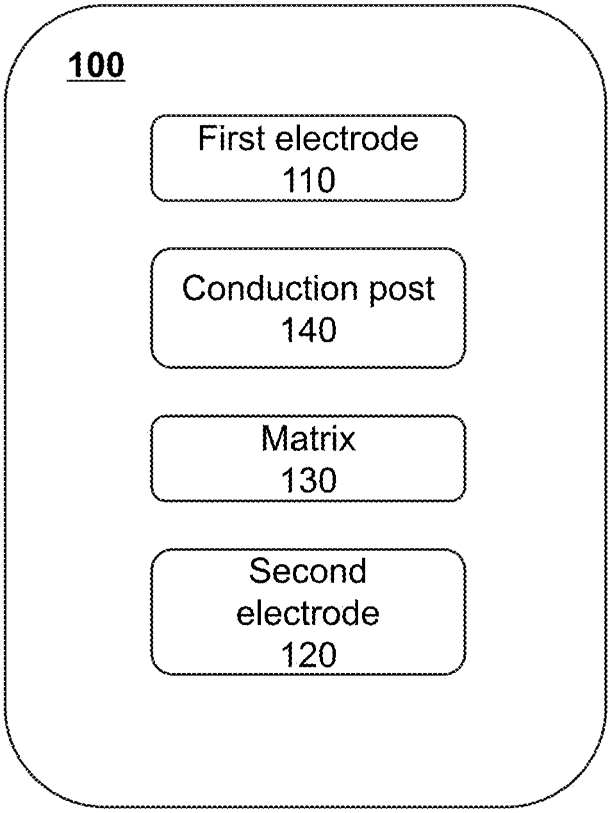
FIG. 1 is a block diagram illustrating an exemplary touch sensor according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms “system,” “device,” “unit” and/or “module” used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words “one,” “a,” “an,” “one kind,” and/or “the” do not refer specifically to the singular, but may also include the plural. Generally, the terms “including” and “comprising” suggest only the inclusion of clearly identified steps and elements, however, the steps and elements that do not constitute an exclusive list, and the method or apparatus may also include other steps or elements.

Flowcharts are used in the present disclosure to illustrate the operations performed by a system according to embodiments of the present disclosure, and the related descriptions are provided to aid in a better understanding of the magnetic resonance imaging method and/or system. It should be appreciated that the preceding or following operations are not necessarily performed in an exact sequence. Instead, steps can be processed in reverse order or simultaneously. Also, it is possible to add other operations to these processes or to remove a step or steps from these processes.

Some embodiments of the present disclosure provide a touch sensor. In some embodiments, the touch sensor may include a first electrode, a second electrode, a substrate, and at least one conduction post. The first electrode and the second electrode may be located on both sides of the substrate, respectively. The at least one conduction post may be located in the substrate. At least one end of the at least one conduction post may be electrically connected with the first electrode or the second electrode. When the substrate is in a natural state, an open circuit may be formed between the first electrode, the at least one conduction post, and the second electrode. When a user exerts a force on the first electrode or the second electrode, the substrate may deform, and the first electrode and the second electrode may be electrically connected by the at least one conduction post such that a closed circuit may be formed between the first electrode, the at least one conduction post, and the second electrode. When the touch sensor provided in some embodiments of the present disclosure is provided in a circuit, the touch sensor can recognize a user operation by measuring current in the circuit or voltage at both ends of another component (e.g., a resistor) in the circuit. For example, when the user does not touch the touch sensor, the open circuit may be formed between the first electrode, the at least one conduction post, and the second electrode. The entire circuit may be in an open state, and the voltage at both ends of the resistor connected in series with the touch sensor in the circuit may be 0. When the user touches the touch sensor, the closed circuit may be formed between the first electrode, the at least one conduction post, and the second electrode. The entire circuit may be in a closed state. In this case, both ends of the resistor has the voltage (e.g., voltage V1). When the user presses the touch sensor, the voltage at both ends of the resistor may change between two parameters of 0 and V1. By recognizing the voltage at both ends of the resistor, whether the user operates the touch sensor can be determined. According to the touch sensor provided in some embodiments of the present disclosure, in response to the contact pressure of a user gesture, the closed circuit may be formed between the first electrode, the at least one conduction post, and the second electrode to generate a touch signal (i.e., an electrical signal). When the user’s sweat is located on the first electrode or the second electrode of the touch sensor, the force of the sweat on the first electrode or the second electrode may be extremely small and may be ignored, so as to ensure that the touch sensor is not susceptible to interference and is not prone to false touch.

Some embodiments of the present disclosure further provide a sensor for recognizing a user gesture. In some embodiments, the sensor for recognizing the user gesture may include a processor, a plurality of touch sensors, and a power supply structure configured to supply power to the plurality of touch sensors. In some embodiments, at least two of the plurality of touch sensors may form a closed circuit therewithin in response to the user gesture. The processor may be configured to determine a sliding direction of the user gesture based on the position information of the at least two touch sensors and time information at which the closed circuit is formed, so as to recognize the user gesture. In some embodiments, the plurality of touch sensors may be distributed in an array. When the user slides on the sensor for recognizing the user gesture, the user may be in contact with at least two of the plurality of touch sensors in sequence, the at least two touch sensors may generate electrical signals in sequence according to an order of contact, and the processor may determine the user gesture based on the position information of the contacted touch sensors and the time at which the closed circuit is formed (i.e. the electrical signals are generated).

Some embodiments of the present disclosure further provide an electronic device. In some embodiments, the electronic device may include an electronic device carrier and at least one touch sensor described above. The electronic device carrier may include a housing. The at least one touch sensor may be integrated in the housing of the electronic device carrier. In some embodiments, the first electrode (or the second electrode) of the touch sensor may be located on an inner surface of the housing. In this case, the second electrode (or the first electrode) of the touch sensor that is away from the inner surface may be fixed in the housing through other structures (e.g. a support plate). That is, the second electrode (or the first electrode) may be fixed, and the first electrode (or the second electrode) located on the inner surface of the housing may deform by a force. The user may act on the housing by touching, long pressing, sliding, etc. to make the housing deform. The housing may deform to drive the first electrode (or the second electrode) on the inner surface of the housing to act on the substrate, and the substrate may deform, such that the first electrode and the second electrode may be electrically connected through the at least one conduction post to generate electrical signals. In some embodiments, the first electrode (or the second electrode) may be located on an outer surface of the housing. In this case, the first electrode (or the second electrode) located on the outer surface of the housing may be fixed, and the second electrode (or the first electrode) away from the outer surface of the housing may deform by the force. The user may act on the second electrode (or the first electrode) away from the housing by touching, long pressing, sliding, etc., such that the first electrode and the second electrode may be electrically connected through the at least one conduction post to generate the electrical signals. The user gesture (e.g., touching, long pressing, and the sliding direction, etc.) may be determined by the time when the electrical signals are generated and the position information of the contacted touch sensors, and a corresponding control instruction may be generated. The control instruction may be configured to control the electronic device to perform a corresponding function.

Some embodiments of the present disclosure further provide a preparation method for a touch sensor. In some embodiments, the preparation method may include obtaining an electrode having a plate structure by performing patterning on at least one of two conductive structures, the electrode being provided with at least one conduction post protruding relative to a surface of the plate structure; spin coating the at least one of two conductive structures after the patterning with a flexible material such that the flexible material covers the electrode and the at least one conduction post; forming a substrate after the flexible material is solidified, and providing one or more hole portions on the substrate, the at least one conduction post being in flow communication with the outside through the one or more hole portions; and connecting the at least one of two conductive structures after the patterning and formation of the substrate with another of the two conductive structures such that the two conductive structures may be located on both sides of the substrate and cover the one or more hole portions to form the touch sensor. According to the preparation method provided in some embodiments of the present disclosure, the touch sensor can be prepared quickly and conveniently.

FIG. 1 is a block diagram illustrating an exemplary touch sensor according to some embodiments of the present disclosure. As shown in FIG. 1, in some embodiments, a touch sensor 100 may include a first electrode 110, a second electrode 120, a substrate 130, and at least one conduction post 140. The first electrode 110 and the second electrode 120 may be located on both sides of the substrate 130, respectively. The at least one conduction post 140 may be located in the substrate 130, and at least one end of the at least one conduction post 140 may be electrically connected with the first electrode 110 or the second electrode 120.

The first electrode 110 and the second electrode 120 refer to structures with conductive properties. In some embodiments, the first electrode 110 and the second electrode 120 may be made of conductive materials. In some embodiments, the conductive materials may include but are not limited to a metal electrode material, a carbon material, a conductive polymer material, etc. In some embodiments, the metal electrode material refers to a metal oxide electrode material. The metal electrode material may include but is not limited to a $RuO_2$ electrode material, a $MnO_x$ electrode material, a $VO_x$ electrode material, or other metal oxide electrode materials (e.g., Ni, Co, Mn, V, W, Pb, etc.), and a composite electrode material (e.g., a mixed material of $RuO_2$ and $MoO_x$, a mixed material of $RuO_2$ and $VO_x$, a mixed material of $RuO_2$ and $TiO_2$, a mixed material of $RuO_2$ and $SnO_2$, etc.). In some embodiments, the carbon material may include but is not limited to activated carbon, carbon aerogel, a carbon nanotube, etc. In some embodiments, the conductive polymer material may include but is not limited to polypyrroles (PPY), polythiophenes (PTH), polyaniline (PAN), polyparaphenylenc (PPP), polyacenes (PAS), etc. In some embodiments, materials of the first electrode 110 and the second electrode 120 may be the same or different.

The substrate 130 serves to carry the first electrode 110 and the second electrode 120. In some embodiments, the substrate 130 may be clastic, and the substrate 130 may elastically deform under the action of an external force. The first electrode 110 and the second electrode 120 may be separated by the substrate 130, and the at least one conduction post 140 with conductive properties may be disposed in the substrate 130 between the first electrode 110 and the second electrode 120. The clastic substrate 130 and the at least one conduction post 140 with the conductive properties may control an electrical connection state between the first electrode 110 and the second electrode 120. For example, when the substrate 130 is in a natural state, an open circuit may be formed between the first electrode 110, the at least one conduction post 140, and the second electrode 120; when the user exerts a force on the first electrode 110 or the second electrode 120, the substrate 130 may deform, and the first electrode 110 and the second electrode 120 may be electrically connected through the at least one conduction post 140, such that a closed circuit may be formed between the first electrode 110, the at least one conduction post 140, and the second electrode 120.

To allow the substrate 130 to elastically deform under a relatively small external force to improve the sensitivity of the touch sensor 100, in some embodiments, the substrate 130 may be made of a flexible material. In some embodiments, the flexible material may include any one of polycarbonate (PC), polyamides (PA), acrylonitrile butadiene styrene (ABS), polystyrene (PS), high impact polystyrene (HIPS), polypropylene (PP), polyethylene terephthalate (PET), polyvinyl chloride (PVC), polyurethanes (PU), polyethylene (PE), phenol formaldehyde (PF), urea-formaldehyde (UF), melamine-formaldehyde (MF), polyarylate (PAR), polyetherimide (PEI), polyimide (PI), PolyethyleneNaphthalate two formic acid glycol ester (PEN), polyetheretherketone (PEEK), silicone, or the like, or any combination thereof. In some embodiments, the flexible material may include polyimide (PI), polydimethylsiloxane (PDMS), ethylene vinyl acetate copolymer (EVA), silicone, PEEK, etc. In some embodiments, the flexible material may also include an organic polymer material. The organic polymer material may include but is not limited to gel, organic silicone, acrylic, polyurethane, rubber, epoxy, etc. In some embodiments, the organic polymer material may include an organic silicone adhesive glue or an organic silicone sealing glue. In some embodiments, a Young's modulus of the flexible material may be within a range of 5E5 Pa-5E9 Pa. In some embodiments, the Young's modulus of the flexible material may be within a range of 5E5 Pa-2E9 Pa. In some embodiments, the Young's modulus of the flexible material may be within a range of 5E5 Pa-5E8 Pa. By making the Young's modulus of the flexible material within the above range, when the user exerts the force on the first electrode 110 or the second electrode 120, the substrate 130 may deform within a preset range, such that an end of the at least one conduction post 140 that is away from the first electrode 110 may be in contact with the second electrode 120 to achieve electrical connection, thereby forming the closed circuit between the first electrode 110, the at least one conduction post 140, and the second electrode 120.

The conduction post 140 refers to a structure with conductive properties. In some embodiments, the at least one conduction post 140 may be made of a conductive material. In some embodiments, the conductive material may include but is not limited to the metal electrode material, the carbon material, the conductive polymer materials, etc. More descriptions regarding the conductive material may be found in the related descriptions of the first electrode 110 and the second electrode 120, which are not repeated here. In some embodiments, the material of the at least one conduction post 140 may be the same as or different from the material of the first electrode 110 and the second electrode 120. In some embodiments, the at least one conduction post 140 may be electrically connected with the first electrode 110 and/or the second electrode 120. When the substrate 130 deforms under the action of an external force, the at least one conduction post 140 may achieve an electrical connection between the first electrode 110 and the second electrode 120. Several specific examples of the at least one conduction post 140 will be provided below for illustration.

In some embodiments, the at least one conduction post 140 may be integrated with the first electrode 110 or the second electrode 120. In some embodiments, the at least one conduction post 140 may also be independent from the first electrode 110 or the second electrode 120.

In some embodiments, the at least one conduction post 140 may include a first conduction post 141. One end of the first conduction post 141 may be electrically connected with the first electrode 110 (or the second electrode 120), and the other end of the first conduction post 141 may be spaced from the second electrode 120 (or the first electrode 110). When the substrate 130 is in a natural state, the other end of the first conduction post 141 may be disconnected from the second electrode 120 (or the first electrode 110), and the open circuit may be formed between the first electrode 110, the first conduction post 141, and the second electrode 120. When the user exerts force on the first electrode 110 or the second electrode 120, the substrate 130 may deform, and the other end of the first conduction post 141 may be in contact with the second electrode 120 (or the first electrode 110) to electrically connect the first electrode 110 and the second electrode 120, such that the closed circuit may be formed between the first electrode 110, the first conduction post 141, and the second electrode 120. It should be noted that one or more first conduction posts 141 may be provided. More descriptions may be found in FIG. 2B and related descriptions thereof, which are not repeated here.

In some embodiments, the at least one conduction post 140 may include a second conduction post 142 and a third conduction post 143. One end of the second conduction post 142 may be electrically connected with the first electrode 110. One end of the third conduction post 143 may be electrically connected with the second electrode 120. The other end of the second conduction post 142 that is away from the first electrode 110 may face the other end of the third conduction post 143 that is away from the second electrode 120. A spacing may be provided between the other end of the second conduction post 142 that is away from the first electrode 110 and the other end of the third conduction post 143 that is away from the second electrode 120. When the user exerts the force on the first electrode 110 or the second electrode 120, the substrate 130 may deform, and the other end of the second conduction post 142 may be in contact with the other end of the third conduction post 143, such that a closed circuit may be formed between the first electrode 110, the second conduction post 142, the third conduction post 143, and the second electrode 120. It should be noted that one or more second conduction posts 142 and one or more third conduction posts 143 may be provided, and a count of the second conduction posts 142 may be the same as a count of the third conduction posts 143. More descriptions may be found in FIG. 14A and related descriptions, which are not repeated here. In some embodiments, one end of the second conduction post 142 may be electrically connected with the first electrode 110, and one end of the third conduction post 143 may be electrically connected with the second electrode 120. The second conduction post 142 and the third conduction post 143 may be spaced apart from each other. A spacing may be provided between the other end of the second conduction post 142 that is away from the first electrode 110 and a side of the second electrode 120 that is in contact with the substrate 130. A spacing may be provided between the other end of the third conduction post 143 that is away from the second electrode 120 and a side of the first electrode 110 that is in contact with the substrate 130. When the user exerts the force on the first electrode 110 or the second electrode 120, the substrate 130 may deform, the other end of the second conduction post 142 may be electrically connected with the second electrode 120, and the other end of the third conduction post 143 may be electrically connected with the first electrode 110, such that an open circuit may be formed between the first electrode 110, the second conduction post 142, and the second electrode 120, and an open circuit may be formed between the first electrode 110, the third conduction post 143, and the second electrode 120. It should be noted that one or more second conduction posts 142 or one or more third conduction posts 143 may be provided, and the count of the second conduction posts 142 may be the same as or different from the count of the third conduction posts 143. More descriptions may be found in FIG. 20B and related descriptions, which are not repeated here.

Figure 2A:
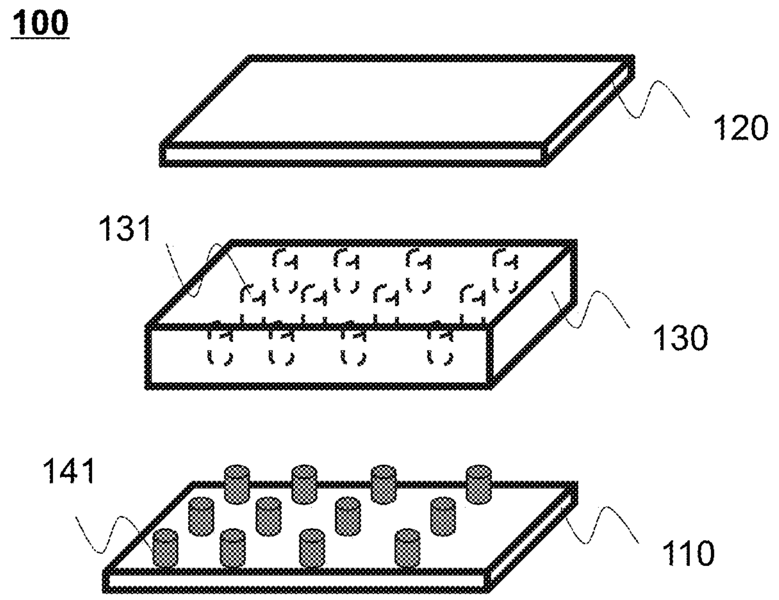
FIG. 2A is a schematic diagram illustrating an exploded view of an exemplary touch sensor according to some embodiments of the present disclosure.
Figure 2B:
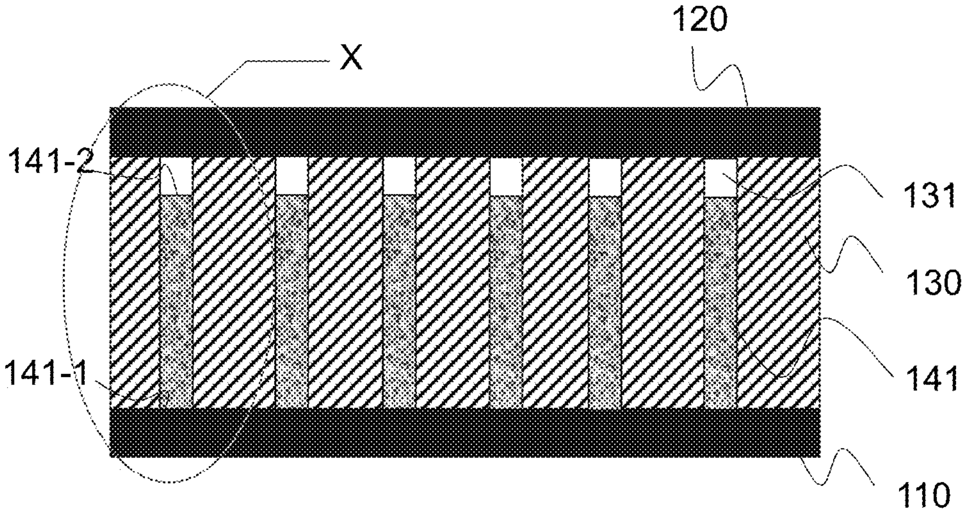
FIG. 2B is a schematic diagram illustrating a cross-sectional view of an exemplary touch sensor in an extension direction of at least one conduction post according to some embodiments of the present disclosure.

FIG. 2A is a schematic diagram illustrating an exploded view of an exemplary touch sensor according to some embodiments of the present disclosure. FIG. 2B is a schematic diagram illustrating an exploded view of an exemplary touch sensor in an extension direction of at least one conduction post according to some embodiments of the present disclosure. Referring to FIG. 2A and FIG. 2B, in some embodiments, the touch sensor 100 may include the first electrode 110, the second electrode 120, the substrate 130, and the at least one conduction post 140. The first electrode 110 and the second electrode 120 may be located on both sides of the substrate 130, respectively. The at least one conduction post 140 may be located in the substrate 130, and one end of the at least one conduction post 140 may be electrically connected with the first electrode 110.

In some embodiments, the at least one conduction post 140 may include one or more first conduction posts 141. Each of the one or more first conduction posts 141 may include a first end portion 141-1 and a second end portion 141-2. The first end portion 141-1 of each of the one or more first conduction posts 141 may be electrically connected with the first electrode 110. A spacing may be provided between the second end portion 141-2 of each of the one or more first conduction posts 141 and a side of the second electrode 120 that is in contact with the substrate 130. In some embodiments, the first end portion 141-1 of each of the one or more first conduction posts 141 may also be electrically connected with the second electrode 120. A spacing may be provided between the second end portion 141-2 of each of the one or more first conduction posts 141 and a side of the first electrode 110 that is in contact with the substrate 130.

In some embodiments, the first electrode 110 and the second electrode 120 may be arranged in parallel, and the one or more first conduction posts 141 may be disposed between the first electrode 110 and the second electrode 120. An extension direction (also referred to as a length direction) of the one or more first conduction posts 141 may be perpendicular to a plane where the first electrode 110 or the second electrode 120 is located. In some embodiments, the one or more first conduction posts 141 may also be disposed obliquely with respect to the first electrode 110 or the second electrode 120. That is, an angle may be formed between the extension direction of the one or more first conduction posts 141 and the plane where the first electrode 110 or the second electrode 120 is located. In some embodiments, the angle between the extension direction of the one or more first conduction posts 141 and the plane where the first electrode 110 or the second electrode 120 is located may be within a range of 15°-175°. For example, the angle may be 30°, 45°, 60°, 120°, 150°, etc.

For case of illustration, the following description takes a structure as an example. In the structure, the first end portion 141-1 of the one or more first conduction posts 141 is electrically connected with the first electrode 110, the spacing is provided between the second end portion 141-2 of the one or more first conduction posts 141 and the side of the second electrode 120 that is in contact with the substrate 130, and the extension direction of the one or more first conduction posts 141 is perpendicular to the plane where the first electrode 110 or the second electrode 120 is located.

Figure 3A:
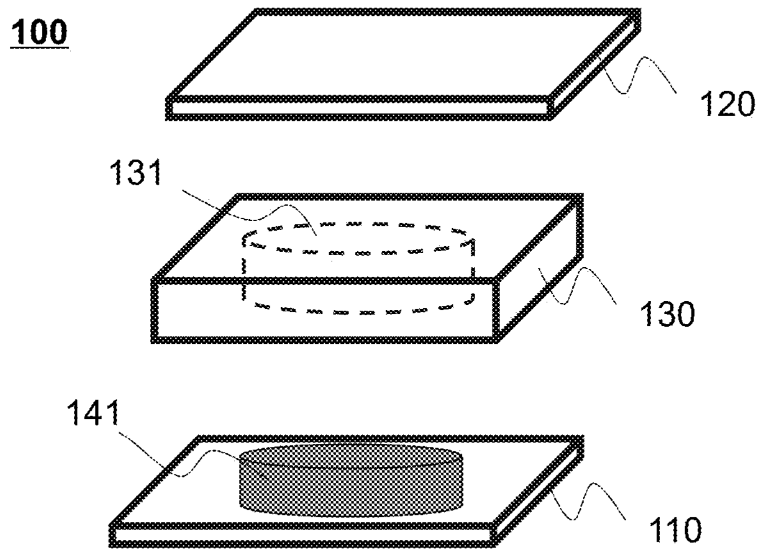
FIG. 3A is a schematic diagram illustrating an exploded view of another exemplary touch sensor according to some embodiments of the present disclosure.
Figure 3B:
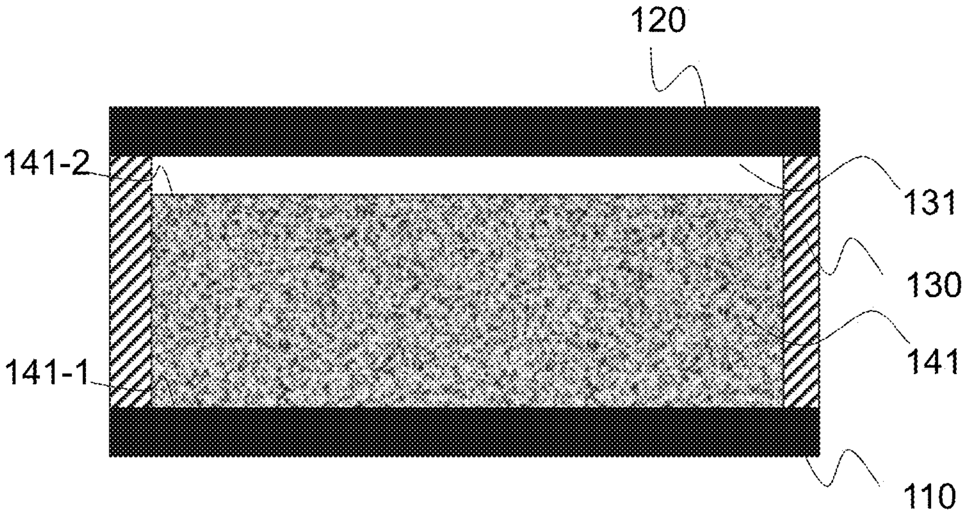
FIG. 3B is a schematic diagram illustrating a cross-sectional view of another exemplary touch sensor in an extension direction of at least one conduction post according to some embodiments of the present disclosure.

FIG. 3A is a schematic diagram illustrating an exploded view of another exemplary touch sensor according to some embodiments of the present disclosure. FIG. 3B is a schematic diagram illustrating a cross-sectional view of another exemplary touch sensor in an extension direction of at least one conduction post according to some embodiments of the present disclosure. Referring to FIGS. 2A-3B, in some embodiments, one first conduction post 141 may be provided, as shown in FIGS. 3A and 3B. The first end portion 141-1 of the first conduction post 141 may be in contact with (electrically connected with) the first electrode 110, and a spacing may be provided between the second end portion 141-2 of the first conduction post 141 and the second electrode 120. The user may exert a force on the first electrode 110 or the second electrode 120 to act on the substrate 130, the substrate 130 may deform, and the spacing between the second end portion 141-2 and the second electrode 120 may be reduced until the second end portion 141-2 is in contact with the second electrode 120, so as to achieve electrical connection between the first electrode 110 and the second electrode 120.

In some embodiments, two or more first conduction posts 141 may be provided, as shown in FIGS. 2A and 2B, the first end portions 141-1 of the plurality of first conduction posts 141 may be electrically connected with the first electrode 110, and spacing may be provided between the second end portions 141-2 of the plurality of first conduction posts 141 and the second electrode 120.

Figure 4A:
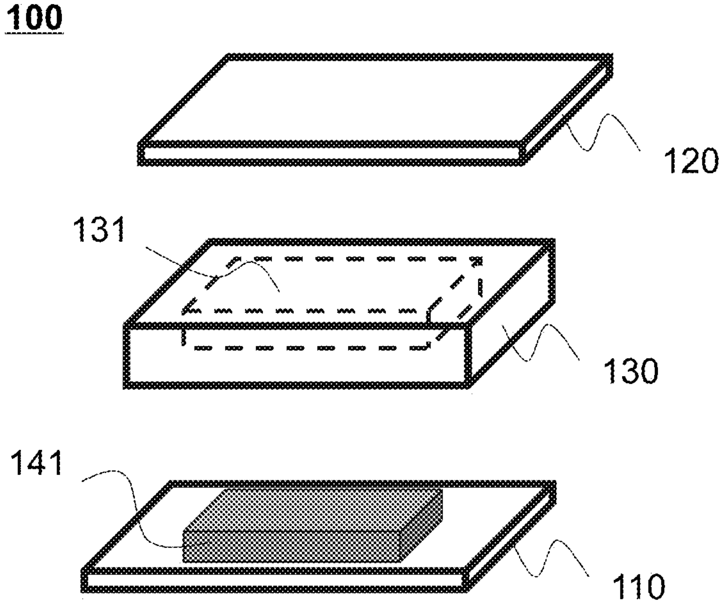
FIG. 4A is a schematic diagram illustrating an exploded view of another exemplary touch sensor according to some embodiments of the present disclosure.
Figure 4B:
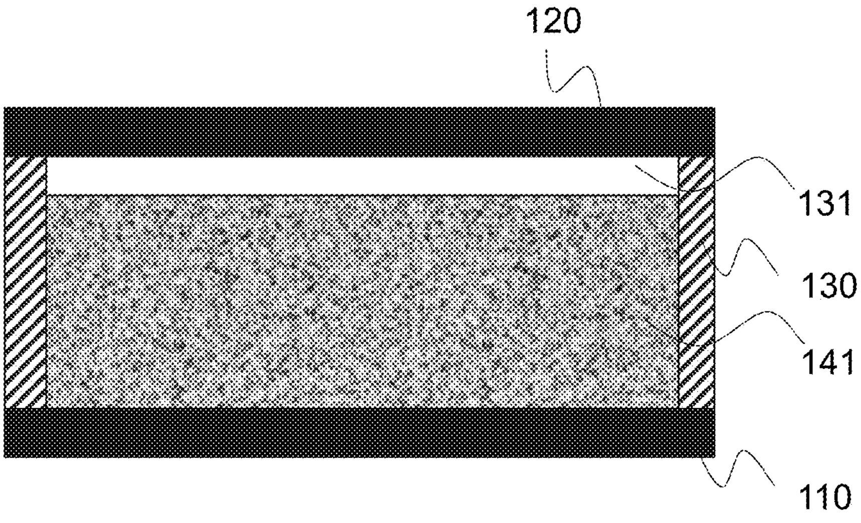
FIG. 4B is a schematic diagram illustrating a cross-sectional view of another exemplary touch sensor in an extension direction of at least one conduction post according to some embodiments of the present disclosure.

FIG. 4A is a schematic diagram illustrating an exploded view of another exemplary touch sensor according to some embodiments of the present disclosure. FIG. 4B is a schematic diagram illustrating a cross-sectional view of another exemplary touch sensor in an extension direction of at least one conduction post according to some embodiments of the present disclosure. Referring to FIGS. 2A-4B, in some embodiments, a shape of each of the one or more first conduction posts 141 may include but is not limited to a cylindrical shape, a prism shape (e.g., a quadrangular prism, a hexagonal prism, an octagonal prism, etc.), etc. In some embodiments, the shape of each of the one or more first conduction posts 141 may also include a conical shape or a truncated cone shape, such as a cone, a triangular pyramid, a truncated cone, a quadrangular cone, etc. In some embodiments, the shape of each of the one or more first conduction posts 141 may also include other shapes (e.g., an elliptical cylinder or a drum, etc.), which is not limited in the present disclosure. Any structure of any shape capable of achieving the electrical connection between the first electrode 110 and the second electrode 120 when the substrate 130 deforms can be regarded as the first conduction post 141 in the embodiments of the present disclosure.

Figure 5:
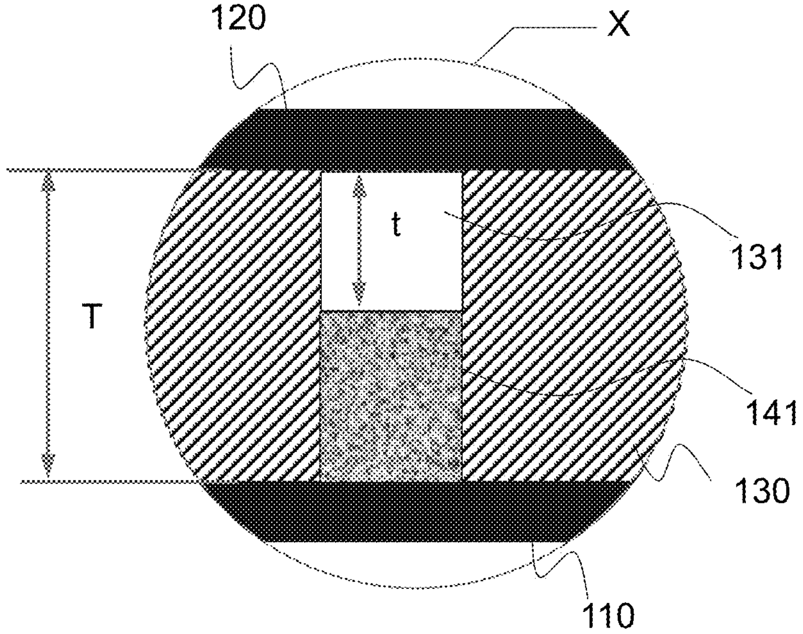
FIG. 5 is a schematic diagram illustrating an enlarged view of an X-region in FIG. 2B.

FIG. 5 is a schematic diagram illustrating an enlarged view of an X-region in FIG. 2B. Referring to FIG. 2B and FIG. 5, in some embodiments, a spacing between an end (the second end portion 141-2) of a first conduction posts 141 that is away from the first electrode 110 and a side of the second electrode 120 that is in contact with the substrate 130 is denoted as t. The spacing t may reflect a deformation amount of the substrate 130 moving in the extension direction of the one or more first conduction posts 141 during the touch of the user. When material and dimension parameters of the substrate 130 are constant, the sensitivity of the touch sensor 100 may be adjusted by adjusting the spacing t. For example, the spacing t and the sensitivity of the touch sensor 100 may be inversely correlated, i.e., the smaller the spacing t, the higher the sensitivity of the touch sensor 100.

From the perspective of improving the sensitivity of the touch sensor 100, the smaller the value of the spacing t, the better. However, considering the processing technology, the value of the spacing t cannot be reduced indefinitely. To ensure the normal processing of the touch sensor 100 and make the touch sensor 100 have a relatively high sensitivity, in some embodiments, the spacing t between the end (the second end portion 141-2) of the first conduction post 141 that is away from the first electrode 110 and the side of the second electrode 120 that is in contact with the substrate 130 may be within a range of 1 μm-1 mm. To further improve the sensitivity of the touch sensor 100, in some embodiments, the spacing t between the end (the second end portion 141-2) of the first conduction post 141 that is away from the first electrode 110 and the side of the second electrode 120 that is in contact with the substrate 130 may be within a range of 3 μm-500 μm. In some embodiments, the spacing t between the end (the second end portion 141-2) of the first conduction post 141 that is away from the first electrode 110 and the side of the second electrode 120 that is in contact with the substrate 130 may be within a range of 5 μm-100 μm. In some embodiments, the spacing t between the end (the second end portion 141-2) of the first conduction post 141 that is away from the first electrode 110 and the side of the second electrode 120 that is in contact with the substrate 130 may be matched with a hardness (i.e., a Young's modulus) of a material of the substrate 130, such that after the user exerts a force on the first electrode 110 or the second electrode 120, a deformation degree of the substrate 130 may reduce the spacing t to 0, making the end (the second end portion 141-2) of the first conduction post 141 that is away from the first electrode 110 contact the second electrode 120 to achieve electrical connection. For the substrate 130 made of a material with a relatively low Young's modulus, the spacing t between the end (the second end portion 141-2) of the first conduction post 141 that is away from the first electrode 110 and the side of the second electrode 120 that is in contact with the substrate 130 may be relatively large. For example, when the flexible material is ethylene vinyl acetate (EVA), the corresponding Young's modulus is 2E6 Pa. In this case, the spacing t between the end (the second end portion 141-2) of the first conduction post 141 that is away from the first electrode 110 and the side of the second electrode 120 that is in contact with the substrate 130 may be within a range of 20 μm-50 μm. For the substrate 130 made of a material with a relatively high Young's modulus, the spacing t between the end (the second end portion 141-2) of the first conduction post 141 that is away from the first electrode 110 and the side of the second electrode 120 that is in contact with the substrate 130 may be relatively small. For example, when the flexible material is polyimide (PI), the corresponding Young's modulus is 3.29E9 Pa. In this case, the spacing t between the end (the second end portion 141-2) of the first conduction post 141 that is away from the first electrode 110 and the side of the second electrode 120 that is in contact with the substrate 130 may be within a range of 5 μm-10 μm.

Referring to FIG. 5, in some embodiments, a distance between the first electrode 110 and the second electrode 120 is denoted as T, i.e., the thickness of the substrate 130 in a natural state may also be T. In addition to the spacing t, the sensitivity of the touch sensor 100 may also be closely correlated with the distance T (i.e., the thickness T of the substrate 130) between the first electrode 110 and the second electrode 120. When the material parameters (e.g. the Young's modulus of the substrate 130, etc.) of the substrate 130 are constant, actual deformation displacement of the substrate 130 may be proportional to the thickness T under the same external load, i.e., the greater the thickness T of the substrate 130, the greater the actual deformation displacement of the substrate 130 of the touch sensor 100. When the material parameters of the substrate 130 are constant, the greater the thickness T of the substrate 130 and the smaller the spacing t, the higher the sensitivity of the touch sensor 100.

However, when the thickness T of the substrate 130 of the touch sensor 100 increases, the overall thickness of the touch sensor 100 may increase, then the overall dimension of the touch sensor 100 may increase, and the space occupied in an applied electronic product may increase. For the electronic product (e.g., a TWS earphone, etc.), the space is extremely limited, so it is necessary to control the overall dimension of the touch sensor 100. In some embodiments, the overall thickness of the touch sensor 100 may be less than 2 mm, i.e., the thickness T of the substrate 130 of the touch sensor 100 may be less than 2 mm. In some embodiments, the thickness T of the substrate 130 may be within a range of 0.5 mm-1.5 mm. In some embodiments, the thickness T of the substrate 130 may be within a range of 0.8 mm-1.8 mm. For example, the thickness T of the substrate 130 may be 1 mm.

In some embodiments, a ratio of the spacing t to the distance T is defined as a, which is expressed as:

$$\alpha = t/T. \tag{1}$$

To make the touch sensor 100 have a relatively small dimension and a relatively high sensitivity, the ratio α of the distance T (i.e., the thickness T of the substrate 130) to the spacing t may be within a preset value range. In some embodiments, when the Young's modulus of the flexible material is within a range of 5E5 Pa-5E9 Pa, the ratio α of the spacing t to the distance T may be within a range of 1/1500-1000/1001. In some embodiments, when the Young's modulus of the flexible material is within a range of 7E5 Pa-2E9 Pa, the ratio α of the spacing t to the distance T may be within a range of 2/1500-1000/1001. In some embodiments, when the Young's modulus of the flexible material is within a range of 2E5 Pa-2E8 Pa, the ratio α of the spacing t to the distance T may be within a range of 4/1500-1000/1001. In some embodiments, when the Young's modulus of the flexible material is within a range of 5E7 Pa-5E8 Pa, the ratio α of the spacing t to the distance T may be within a range of 5/1500-1000/1001.

In some embodiments, the substrate 130 may include one or more hole portions 131. The one or more hole portions 131 may penetrate through the substrate 130, i.e., openings at both ends of each of the one or more hole portions 131 may be in contact with the first electrode 110 and the second electrode 120, respectively. In a natural state, a depth of each of the one or more hole portions 131 may be the same as the thickness T of the substrate 130. The one or more first conduction post 141 may be located in the one or more hole portions 131. When the user exerts the force on the first electrode 110 or the second electrode 120, the substrate 130 may deform, the one or more hole portions 131 may be compressed in an extension direction of the one or more hole portions 131, and the end of at least one of the one or more first conduction posts 141 that is away from the first electrode 110 may be in contact with the second electrode 120.

In some embodiments, the extension direction of the one or more hole portions 131 may be consistent with the extension direction of the one or more first conduction posts 141. For example, when the extension direction of the one or more first conduction post 141 is perpendicular to a plane where the first electrode 110 is located, the extension direction of the one or more hole portions 131 may also be perpendicular to the plane where the first electrode 110 is located. As another example, when the extension direction of the one or more first conduction posts 141 is disposed obliquely with respect to the plane where the first electrode 110 is located, the extension direction of the one or more hole portions 131 may also be disposed obliquely with respect to the plane where the first electrode 110 is located. In some embodiments, the extension direction of the one or more hole portions 131 may not be consistent with the extension direction (i.e., a length direction) of the one or more first conduction posts 141, as long as the one or more first conduction post 141 can be accommodated in the one or more hole portions 131. For example, when the extension direction of the one or more first conduction posts 141 is perpendicular to the plane where the first electrode 110 is located, the extension direction of the one or more hole portions 131 may be disposed obliquely with respect to the plane where the first electrode 110 is located. In the natural state, one end (the first end portion 141-1) of the first conduction post 141 that is close to the first electrode 110 may be located in the opening of a hole portion 131 that is close to the first electrode 110, and one end (the second end portion 141-2) of the first conduction post 141 that is away from the first electrode 110 may be located in the hole portion 131. When the user exerts the force on the first electrode 110 or the second electrode 120 to achieve an electrical connection between the first electrode 110 and the second electrode 120 through the one or more first conduction posts 141, one end (the second end portion 141-2) of the first conduction posts 141 that is away from the first electrode 110 may be located in the opening of the hole portion 131 that is close to the second electrode 120, such that one end of the first conduction post 141 that is away from the first electrode 110 may be in contact with the second electrode 120, thereby achieving electrical connection between the first electrode 110, the one or more first conduction posts 141, and the second electrode 120.

In some embodiments, a count of the one or more hole portions 131 may match a count of the one or more first conduction posts 141. Each of the one or more first conduction posts 141 may be disposed in each of the one or more hole portions 131, as shown in FIG. 2A, FIG. 3A, and FIG. 4A. In some embodiments, the count of the one or more hole portions 131 may be less than the count of the one or more first conduction posts 141, a plurality of first conduction posts 141 may be disposed in one of the one or more hole portions 131, and the plurality of first conduction posts 141 disposed in one of the one or more hole portions 131 may be disposed at intervals. In some embodiments, the count of the one or more hole portions 131 may also be greater than the count of the one or more first conduction posts 141. In this case, at least one of the one or more hole portions 131 may not be provided with the one or more first conduction posts 141. The one or more hole portions 131 without the one or more first conduction posts 141 may reduce the overall rigidity of the substrate 130, so as to improve the capability of elastic deformation of the substrate, thereby improving the sensitivity of the touch sensor 100.

In some embodiments, the shape and the dimension of each of the one or more hole portions 131 may match the shape and the dimension of each of the one or more first conduction posts 141, and a sidewall of the substrate 130 corresponding to at least one of the one or more hole portions 131 may be in contact with at least one of the one or more first conduction posts 141 without gap. In some embodiments, the dimension of at least one of the one or more hole portions 131 may be slightly larger than the dimension of at least one of the one or more first conduction posts 141 to reduce the friction generated between the at least one first conduction post 141 and the sidewall of the substrate 130 corresponding to the at least one hole portion 131 during the clastic deformation of the substrate 130, thereby improving the capability of elastic deformation of the substrate 130, and improving the sensitivity of the touch sensor 100.

In some embodiments, in a direction perpendicular to the extension direction of the at least one conduction post 140, a gap may be provided between at least a portion of a peripheral sidewall of the at least one conduction post 140 and the substrate 130. That is, in the direction perpendicular to the extension direction of the at least one first conduction post 141, a gap may be provided between at least a portion of the peripheral sidewall of at least one first conduction post 141 and the sidewall of the substrate 130 corresponding to the at least one hole portion 131. By setting the gap, the rigidity of the substrate 130 close to the at least one first conduction post 141 can be reduced, such that when the substrate 130 has the same thickness dimension, material parameters, and a constant external force, the deformation of the substrate 130 can be further increased, thereby increasing the sensitivity of the touch sensor 100.

Figure 6A:
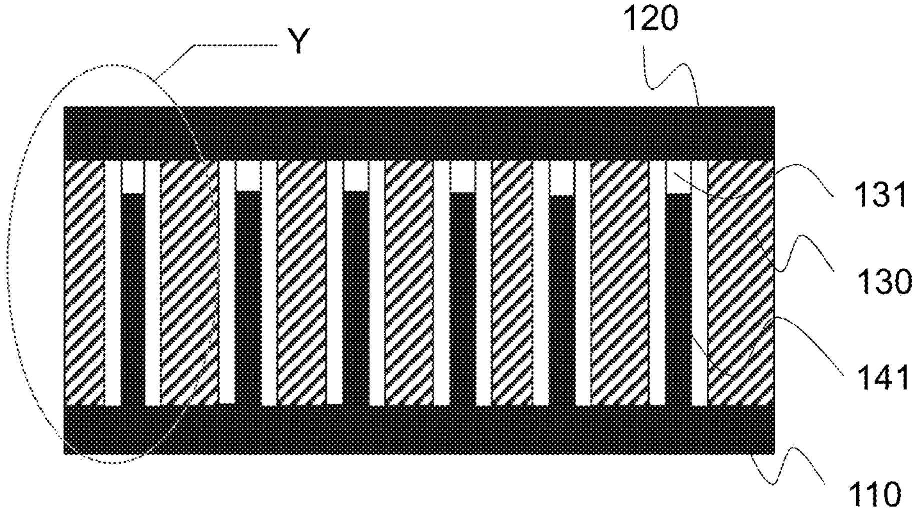
FIG. 6A is a schematic diagram illustrating a cross-sectional view of another exemplary touch sensor in an extension direction of at least one conduction post according to some embodiments of the present disclosure.
Figure 6B:
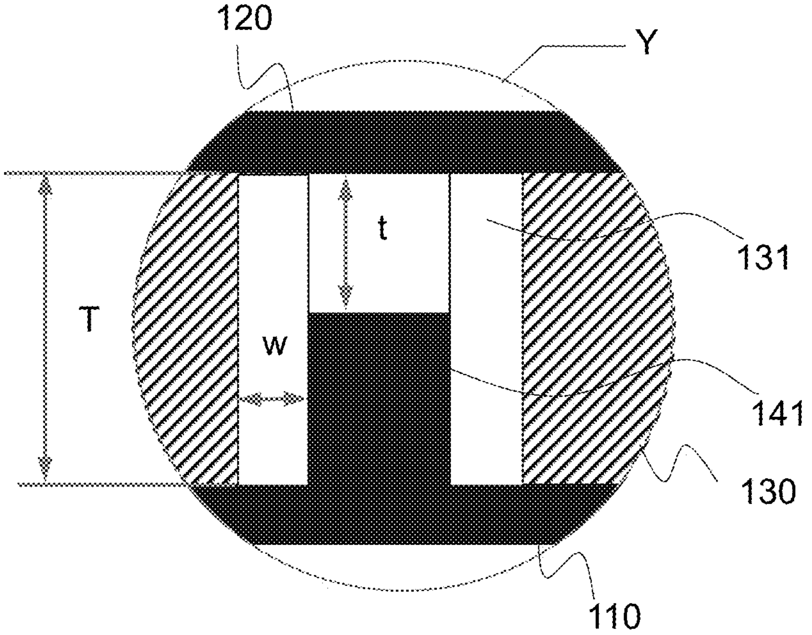
FIG. 6B is a schematic diagram illustrating an enlarged view of a Y-region in FIG. 6A.
Figure 6C:
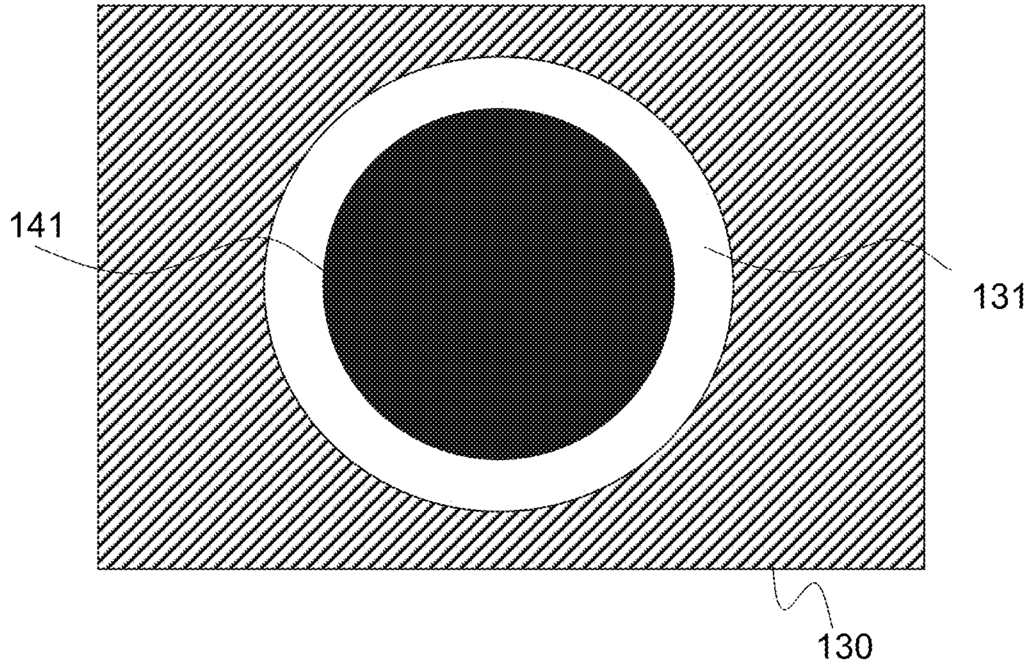
FIG. 6C is a schematic diagram illustrating a cross-sectional view of an exemplary touch sensor corresponding to FIG. 6A in a direction perpendicular to an extension direction of at least one conduction post.

FIG. 6A is a schematic diagram illustrating a cross-sectional view of another exemplary touch sensor in an extension direction of at least one conduction post according to some embodiments of the present disclosure. FIG. 6B is a schematic diagram illustrating an enlarged view of a Y-region in FIG. 6A. FIG. 6C is a schematic diagram illustrating a cross-sectional view of an exemplary touch sensor corresponding to FIG. 6A in a direction perpendicular to an extension direction of at least one conduction post. As shown in FIG. 6A, FIG. 6B, and FIG. 6C, in some embodiments, in the direction perpendicular to the extension direction of the at least one first conduction post 141, a gap may be provided between the entire peripheral sidewall the at least one first conduction post 141 and the substrate 130, and the width of the gap is denoted as w. By setting the gap between the entire peripheral sidewall of the at least one first conduction post 141 and the substrate 130, the rigidity of the substrate 130 close to the at least one first conduction post 141 can be reduced, thereby improving the sensitivity of the touch sensor 100.

In some embodiments, a gap may be provided between a portion of the peripheral sidewall of the at least one first conduction post 141 and the substrate 130, and a portion of the peripheral sidewall of the at least one first conduction post 141 may be in direct contact with the substrate 130. In such cases, the rigidity of the substrate 130 close to the at least one first conduction post 141 can be reduced, which may increase the sensitivity of the touch sensor 100, and the substrate 130 can be in direct contact with the at least one first conduction post 141 such that the substrate 130 can be supported by the at least one first conduction post 141 and the substrate 130 can be prevented from greatly deforming in the direction perpendicular to the extension direction of the at least one first conduction post 141, thereby enhancing the stability of the touch sensor 100. For example, when a direction of the force exerted by the user is not perpendicular to the plane where the first electrode 110 or the second electrode 120 is located, the substrate 130 may deform in a transverse direction (the direction perpendicular to the extension direction of the at least one first conduction post 141). In this case, since a portion of the peripheral sidewall of the at least one first conduction post 141 is in direct contact with the substrate 130, the at least one first conduction post 141 may support the substrate 130, reducing the deformation of the substrate 130 in the transverse direction. Meanwhile, since the gap is provided between a portion of the peripheral sidewall of the at least one first conduction post 141 and the substrate 130, the gap may provide a larger deformation space for the substrate 130, improving the capacity of elastic deformation of the substrate 130 and the capacity of recovering clastic deformation, thereby improving the sensitivity of the touch sensor 100.

Figure 7:
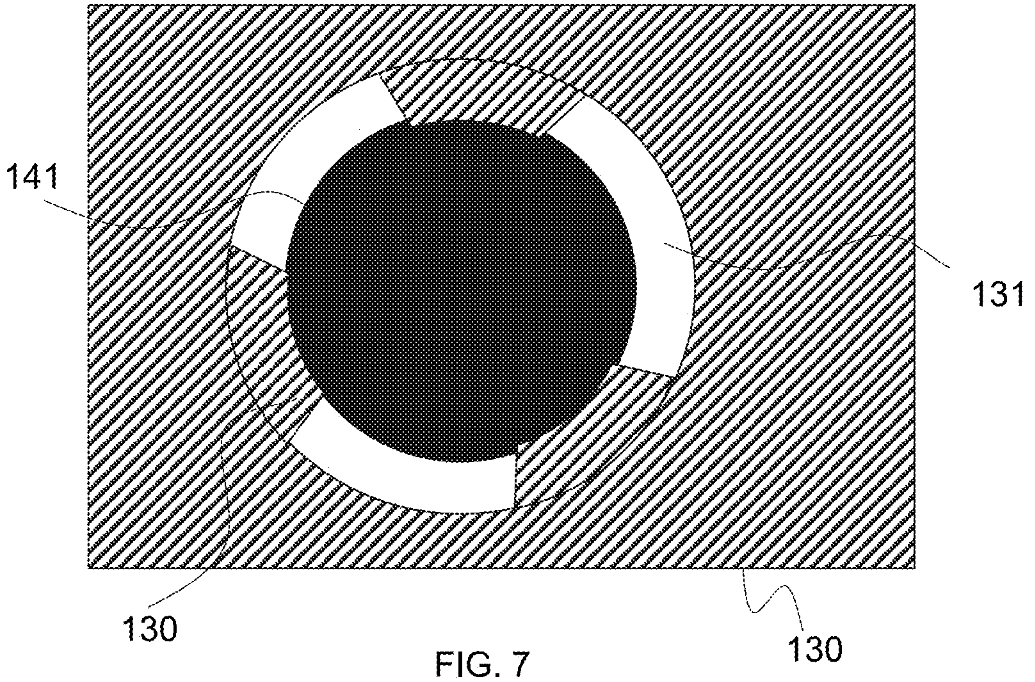
FIG. 7 is a schematic diagram illustrating a cross-sectional view of another exemplary touch sensor in a direction perpendicular to an extension direction of at least one conduction post according to some embodiments of the present disclosure.

FIG. 7 is a schematic diagram illustrating a cross-sectional view of another touch sensor in a direction perpendicular to an extension direction of at least one conduction post according to some embodiments of the present disclosure. As shown in FIG. 7, in some embodiments, in the direction perpendicular to the extension direction of the at least one first conduction post 141, i.e., in a circumferential direction of the at least one first conduction post 141, a gap may be provided between a portion of the peripheral sidewall of the at least one first conduction post 141 and the substrate 130, and the remaining portion of the peripheral sidewall of the at least one first conduction post 141 may be in contact with the substrate 130. That is, in the circumferential direction of the at least one first conduction post 141, one or more gaps may be distributed at intervals, and in the extension direction of the at least one first conduction post 141, the one or more gaps may penetrate through the one or more hole portions 131. That is, in an axial direction of the at least one first conduction post 141, two ends of each of the one or more gaps may be in contact with the first electrode 110 and the second electrode 120, respectively. Merely by way of example, in the circumferential direction of the at least one first conduction post 141, the peripheral sidewall of the at least one first conduction post 141 may be evenly divided into six portions. Three non-adjacent portions of the six portions may be in contact with the substrate 130, respectively, and the remaining three non-adjacent portions of the six portions may be provided with gaps, respectively.

Figure 8A:
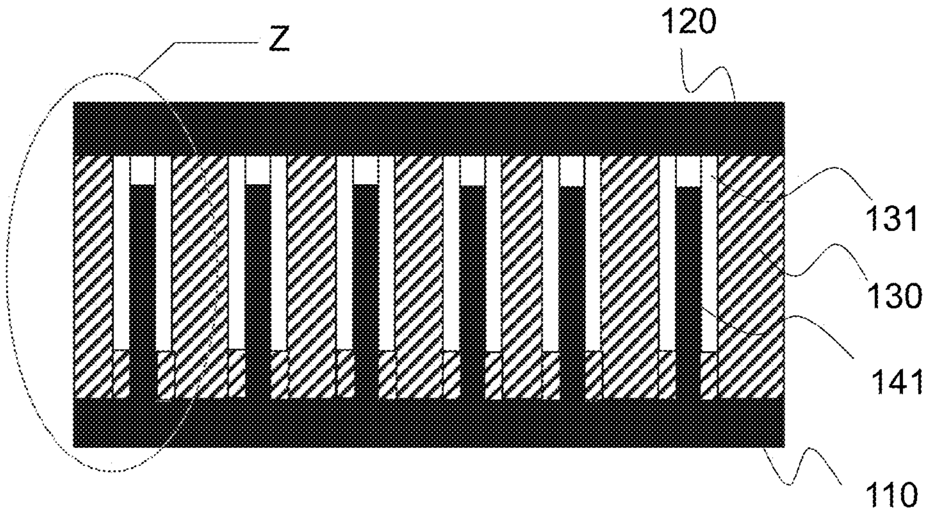
FIG. 8A is a schematic diagram illustrating a cross-sectional view of another exemplary touch sensor in a direction perpendicular to an extension direction of at least one conduction post according to some embodiments of the present disclosure.
Figure 8B:
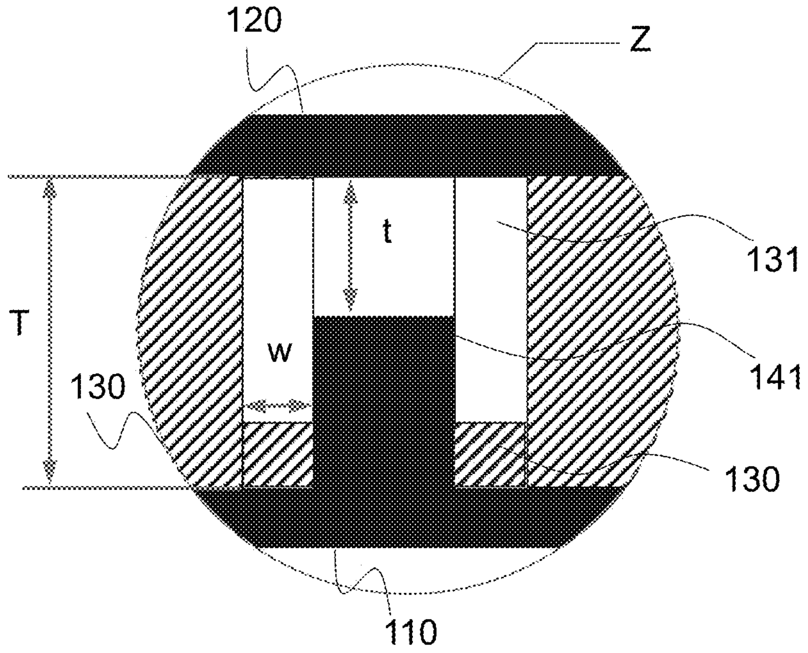
FIG. 8B is a schematic diagram illustrating an enlarged view of a Z-region in FIG. 8A.

FIG. 8A is a schematic diagram illustrating a cross-sectional view of another exemplary touch sensor in a direction perpendicular to an extension direction of at least one conduction post according to some embodiments of the present disclosure. FIG. 8B is a schematic diagram illustrating an enlarged view of a Z-region in FIG. 8A. As shown in FIG. 8A and FIG. 8B, in some embodiments, in the extension direction (also referred to as an axial direction or a length direction) of the at least one first conduction post 141, a gap may be provided between a portion of the peripheral sidewall of the at least one first conduction post 141 and the substrate 130, and the remaining portion of the peripheral sidewall of the at least one first conduction post 141 may be in contact with and connected with the substrate 130. For example, one end (i.e., the first end portion 141-1) of the at least one first conduction post 141 that is connected with the first electrode 110, and the peripheral sidewall near the one end may be in contact with the substrate 130, and a gap may be provided between a peripheral sidewall region of the at least one first conduction post 141 that is away from the first electrode 110 and the substrate 130, as shown in FIG. 8A and FIG. 8B. As another example, in the extension direction of the at least one first conduction post 141, two ends of the at least one first conduction post 141 and the peripheral sidewall near the two ends may be in contact with and connected with the substrate 130, and a gap may be provided between a peripheral sidewall in the middle of the at least one first conduction post 141 and the substrate 130.

Referring to FIG. 6B and FIG. 8B, in some embodiments, by setting the dimension (i.e., the width w of the gap) of the gap in the direction perpendicular to the extension direction of the at least one first conduction post 141, the rigidity of the substrate 130 close to the at least one first conduction post 141 can be effectively adjusted, thereby adjusting the degree of deformation difficulty of the substrate 130, and adjusting the sensitivity of the touch sensor 100. The rigidity of the substrate 130 close to the at least one first conduction post 141 may be inversely correlated with the width of the gap. As the width of the gap increases, the rigidity of the substrate 130 close to the at least one first conduction post 141 may decrease. That is, under the action of the same magnitude of force, as the width w of the gap increases, the deformation amount of the substrate 130 close to the at least one first conduction post 141 may increase, such that one end of the at least one first conduction post 141 that is away from the first electrode 110 may be easier to contact the second electrode 120, thereby increasing the sensitivity of the touch sensor 100. It should be noted that the range of the width w of the gap needs to be comprehensively considered in combination with the count and the dimension of the one or more hole portions 131 and the at least one first conduction post 141, and the dimension of the substrate 130. To improve the sensitivity of the touch sensor 100 based on the reasonable structure of the touch sensor 100, in some embodiments, the dimension w of the gap in the direction perpendicular to the extension direction of the at least one first conduction post 141 may be within a range of 5 μm-5 mm. In some embodiments, the dimension w of the gap in the direction perpendicular to the extension direction of the at least one first conduction post 141 may be within a range of 5 μm-4 mm. In some embodiments, the dimension w of the gap in the direction perpendicular to the extension direction of the at least one first conduction post 141 may be within a range of 5 μm-3.5 mm. In some embodiments, the dimension w of the gap in the direction perpendicular to the extension direction of the at least one first conduction post 141 may be within a range of 5 μm-3 mm.

Figure 9A:
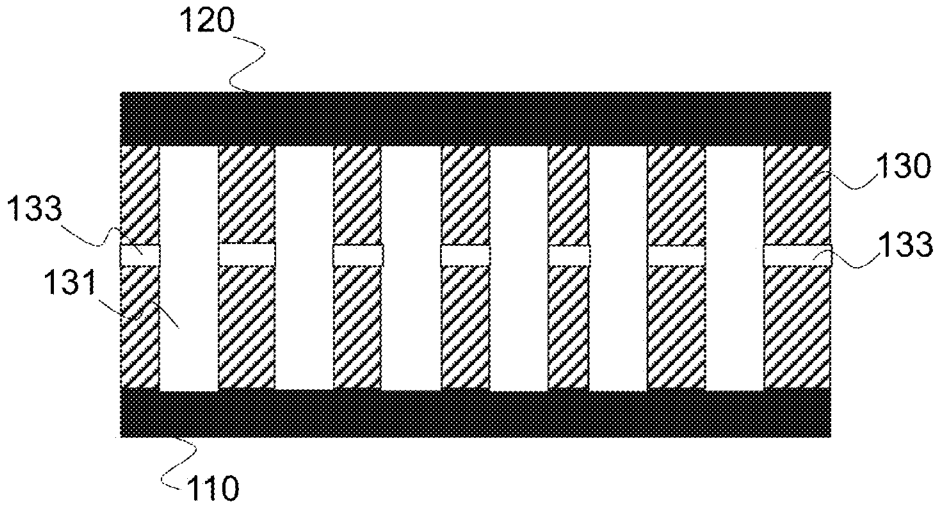
FIG. 9A is a schematic diagram illustrating a cross-sectional view of an exemplary substrate in an extension direction of at least one conduction post according to some embodiments of the present disclosure.
Figure 9B:
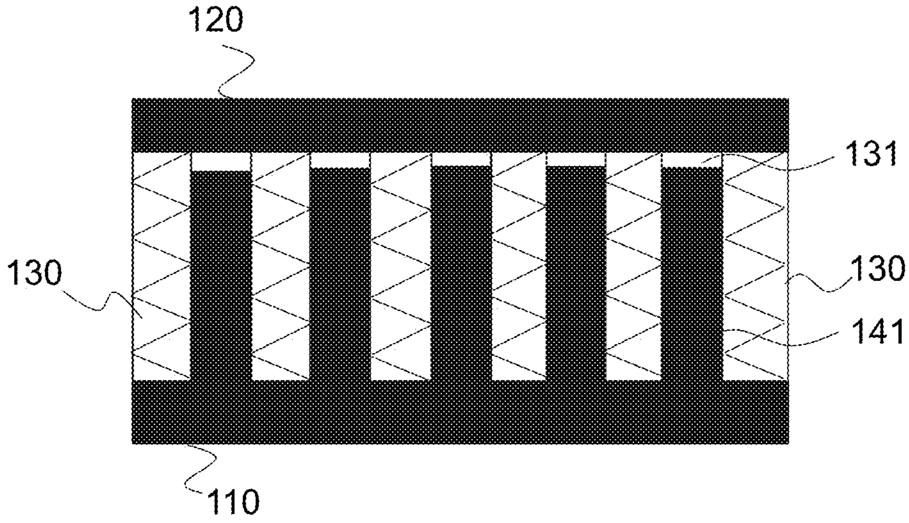
FIG. 9B is a schematic diagram illustrating a cross-sectional view of another exemplary substrate in an extension direction of at least one conduction post according to some embodiments of the present disclosure.

FIG. 9A is a schematic diagram illustrating a cross-sectional view of an exemplary substrate in an extension direction of at least one conduction post according to some embodiments of the present disclosure. FIG. 9B is a schematic diagram illustrating a cross-sectional view of another exemplary substrate in an extension direction of at least one conduction post according to some embodiments of the present disclosure. In some embodiments, the touch sensor 100 may also be provided with other structures to adjust (reduce) the overall rigidity of the substrate 130, so as to improve the elasticity of the substrate 130, thereby improving the sensitivity of the touch sensor 100.

As shown in FIG. 9A, in some embodiments, one or more through holes 133 may be provided on the substrate 130. The one or more through holes 133 may be in flow communication with the one or more hole portions 131. By providing the one or more through holes 133 in the substrate 130, the local rigidity of the substrate 130 close to the one or more through holes 133 may be reduced, and the overall elasticity of the substrate 130 may be improved, thereby improving the sensitivity of the touch sensor 100. In some embodiments, one or more hollow structures or one or more partially hollowed structures may also be provided on the substrate 130 to reduce the rigidity of the substrate 130, so as to increase the elasticity of the substrate 130, thereby improving the sensitivity of the touch sensor 100.

As shown in FIG. 9B, in some embodiments, one or more elastic structures may be provided on the substrate 130 in the extension direction of the one or more hole portions 131. The extension direction of the one or more elastic structures may be the same as the extension direction of the one or more hole portions 131. In some embodiments, the one or more clastic structures may be disposed in a region of the substrate 130 other than the one or more hole portions 131. In some embodiments, the one or more clastic structures and the one or more hole portions 131 may be disposed at intervals. By disposing the one or more elastic structures, the deformation capacity and deformation recovery capacity of the substrate 130 can be improved, thereby improving the sensitivity of the touch sensor 100. In some embodiments, the one or more elastic structures may include but are not limited to a spring structure, an elastic sheet structure, etc.

In some embodiments, a conductive structure may be provided at one end of the at least one first conduction post 141 that is away from the first electrode 110. When a user exerts a force on the first electrode 110 or the second electrode 120 to make the substrate 130 deform, the conductive structure on the at least one first conduction post 141 may be in contact with the second electrode 120, thereby achieving an electrical connection between the first electrode 110, the at least one first conduction post 141, and the second electrode 120. The setting of the conductive structure may be equivalent to indirectly reducing the spacing t between one end of the at least one first conduction post 141 that is away from the first electrode 110 and the second electrode 120, thereby achieving the purpose of improving the sensitivity of the touch sensor 100.

Figure 10A:
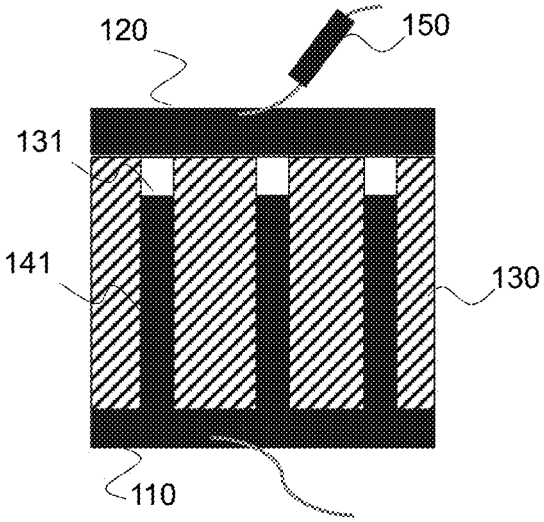
FIG. 10A is a schematic diagram illustrating circuit connection of a touch sensor according to some embodiments of the present disclosure.
Figure 10B:
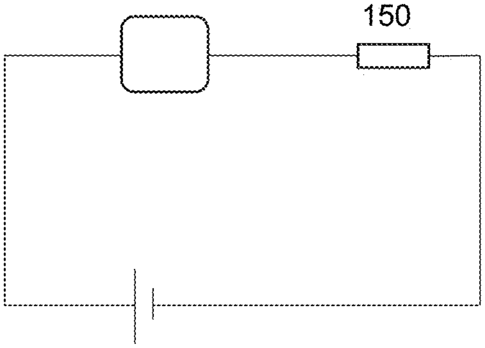
FIG. 10B is a schematic diagram illustrating a circuit corresponding to FIG. 10A.

FIG. 10A is a schematic diagram illustrating circuit connection of a touch sensor according to some embodiments of the present disclosure. FIG. 10B is a schematic diagram illustrating a circuit corresponding to FIG. 10A. As shown in FIG. 10A and FIG. 10B, in some embodiments, the touch sensor 100 may further include a resistor 150. The resistor 150 may be electrically connected with the first electrode 110 or the second electrode 120 through a conductive wire. In some embodiments, the touch sensor 100 may further include a power supply component. The power supply component may be configured to supply power to the touch sensor 100. In the entire circuit, the resistor 150 may be connected in series with the touch sensor 100.

In some embodiments, whether a user operates the touch sensor 100 may be determined by testing voltage at both ends of the resistor 150. Specifically, a voltage sensing element (e.g., a voltmeter) may be connected in parallel with the resistor 150 to monitor the voltage at both ends of the resistor 150. The voltage sensing element may be configured to monitor the voltage of the resistor 150. In a natural state, the first electrode 110 and the second electrode 120 may be in an open circuit state, and no current flows through the resistor 150. The voltage sensing element may recognize that the voltage of the resistor 150 is 0, thereby determining that the user does not operate the touch sensor 100. When the user exerts a force on the touch sensor 100, the first electrode 110 and the second electrode 120 may be electrically connected through the at least one first conduction post 141, and the current may flow through the resistor 150. The resistor 150 may have the voltage at this time. The voltage sensing element may recognize the voltage at both ends of the resistor 150, thereby determining that the user operates the touch sensor 100.

In some embodiments, whether the user operates the touch sensor 100 may also be determined by testing the current of the resistor 150. Specifically, the resistor 150 may be connected in series with a current sensing element (e.g., an ammeter). The current sensing element may be configured to monitor the current flowing through the resistor 150. In the natural state, the first electrode 110 and the second electrode 120 may be in the open circuit state, and no current flows through the resistor 150. The current sensing element may recognize that the current flowing through the resistor 150 is 0, thereby determining that the user does not operate the touch sensor 100. When the user exerts the force on the touch sensor 100, the first electrode 110 and the second electrode 120 may be electrically connected through the at least one first conduction post 141, and the current may flow through the resistor 150. The current sensing element may recognize that the current flows through the resistor 150, thereby determining that the user operates the touch sensor 100.

Figure 11:
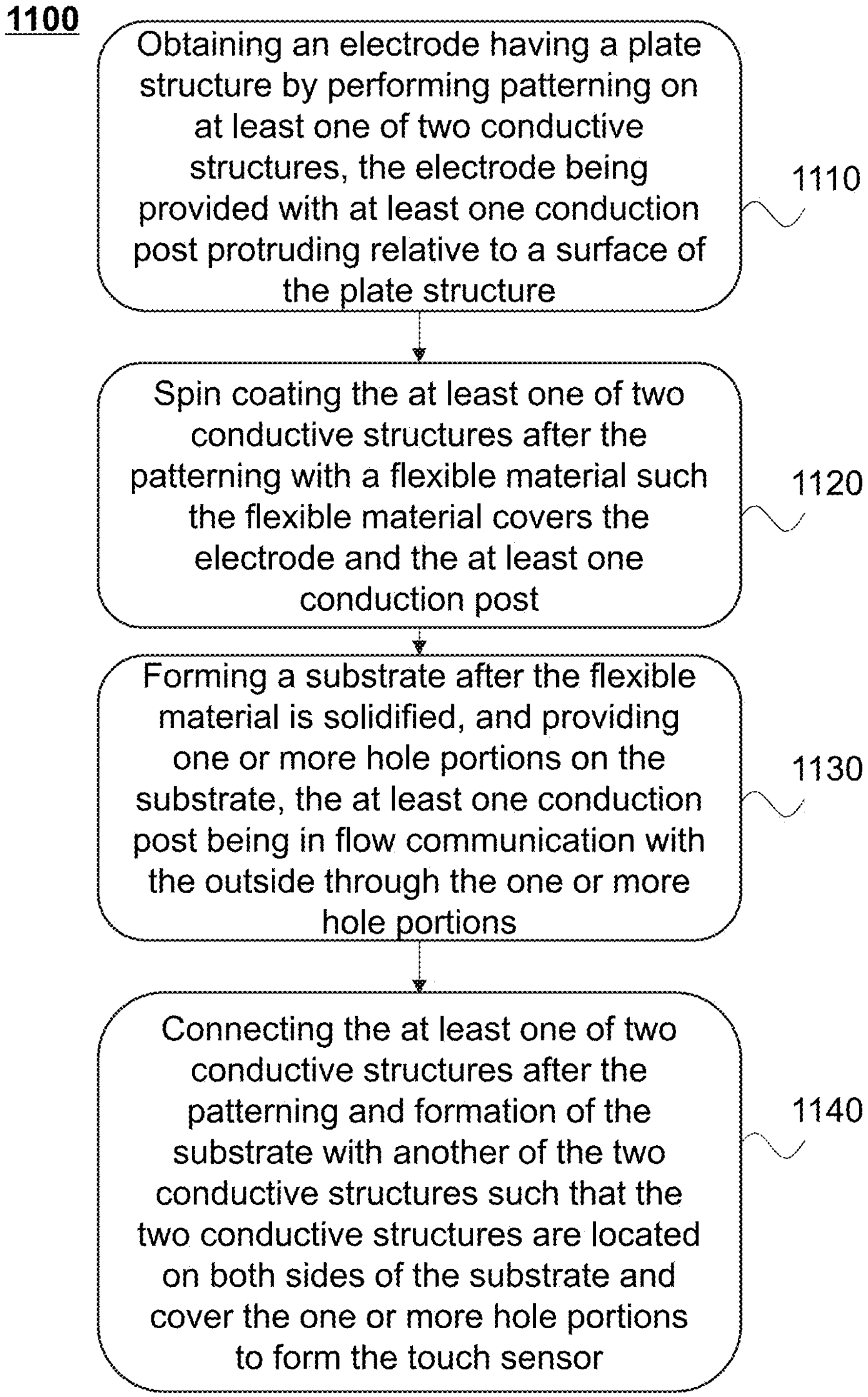
FIG. 11 is a flowchart illustrating an exemplary preparation process of a touch sensor according to some embodiments of the present disclosure.
Figure 12:
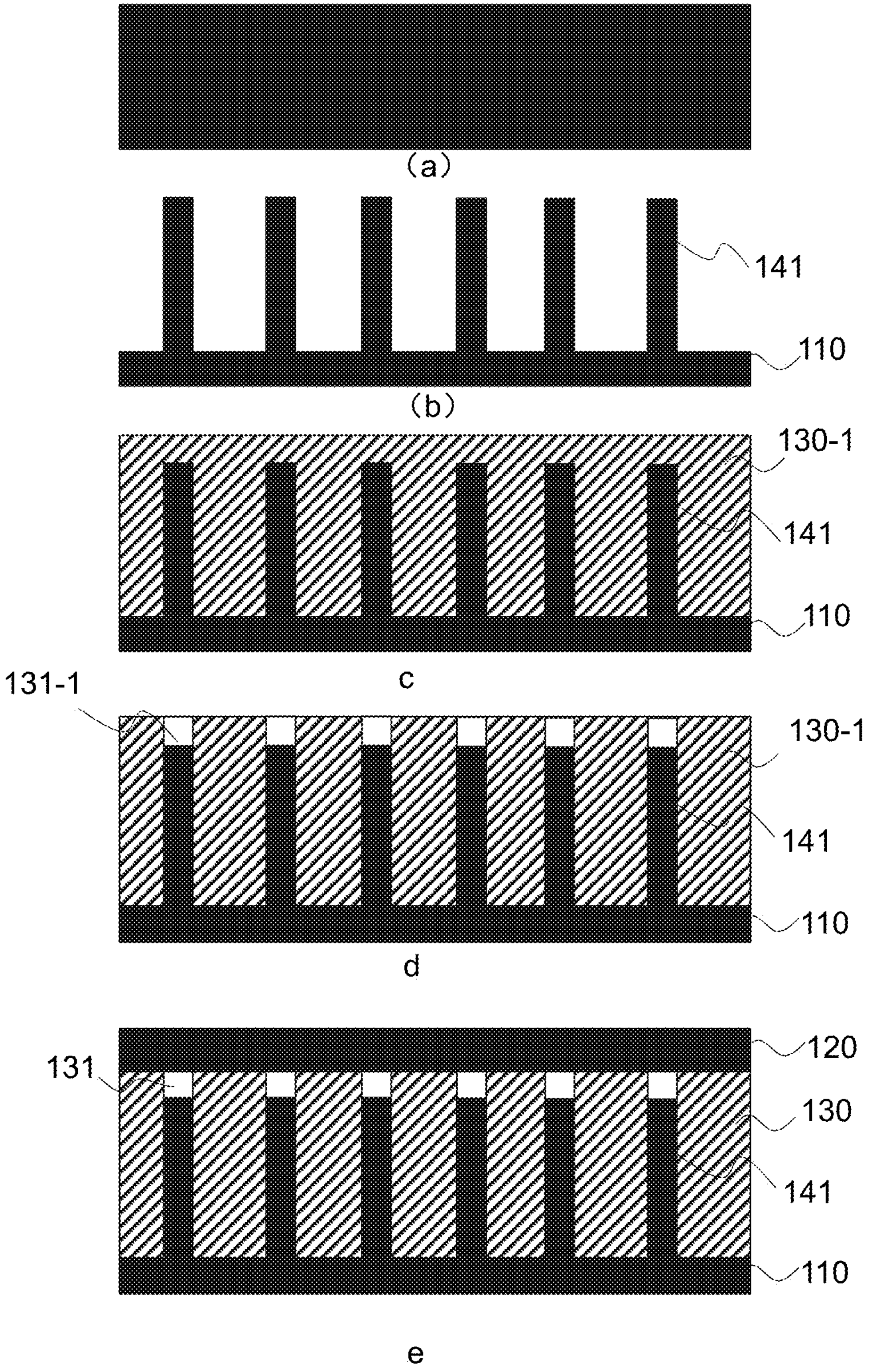
FIG. 12 is a schematic diagram illustrating an exemplary preparation process of a touch sensor according to some embodiments of the present disclosure.

FIG. 11 is a flowchart illustrating an exemplary preparation process of a touch sensor according to some embodiments of the present disclosure. FIG. 12 is a schematic diagram illustrating an exemplary preparation process of a touch sensor according to some embodiments of the present disclosure. As shown in FIG. 11, a process 1100 may include the following operations.

In 1110, an electrode having a plate structure may be obtained by performing patterning on at least one of two conductive structures, the electrode being provided with at least one conduction post protruding relative to a surface of the plate structure.

In some embodiments, the conductive structure refers to a raw material made of a conductive material, as shown in (a) of FIG. 12. In some embodiments, the conductive material may include but is not limited to a metal electrode material (e.g., copper, gold, silver, platinum, palladium, iridium, etc.), a coated electrode material, a graphite electrode material, etc.

In some embodiments, patterning refers to a process for cutting the conductive structure. In some embodiments, a patterning manner may include photolithography and etching. In some embodiments, the patterning manner may also include laser, hot pressing, and other processes, which are not limited in the present disclosure.

As shown in (b) of FIG. 12, in some embodiments, obtaining the electrode having the plate structure by performing patterning on at least one of two conductive structures, the electrode being provided with at least one conduction post protruding relative to the surface of the plate structure may include: obtaining the first electrode 110 having a plate structure by performing patterning on one of the two conductive structures, the first electrode 110 being provided with the at least one conduction post protruding relative to the surface of the plate structure. In this case, the at least one conduction post may correspond to the at least one first conduction post 141 shown in FIG. 2B. In some embodiments, the other of the two conductive structures may not be processed and directly used as the second electrode 120.

In 1120, the at least one of two conductive structures after the patterning may be spin coated with a flexible material such that the flexible material covers the electrode and the at least one conduction post. In some embodiments, a flexible material may constitute the substrate 130. The flexible material may include but is not limited to any one of polycarbonate (PC), polyamides (PA), acrylonitrile butadiene styrene (ABS), polystyrene (PS), high impact polystyrene (HIPS), polypropylene (PP), polyethylene terephthalate (PET), polyvinyl chloride (PVC), polyurethanes (PU), polyethylene (PE), phenol formaldehyde (PF), urea-formaldehyde (UF), melamine-formaldehyde (MF), polyarylate (PAR), polyetherimide (PEI), polyimide (PI), Polyethylene Naphthalate two formic acid glycol ester (PEN), polyetheretherketone (PEEK), silicone, or the like, or any combination thereof. In some embodiments, the flexible material may include polyimide (PI), polydimethylsiloxane (PDMS), ethylene vinyl acetate copolymer (EVA), silicone, polyetheretherketone (PEEK), etc. In some embodiments, the flexible material may also include an organic polymer material. The organic polymer material may include but is not limited to gel, organic silicone, acrylic, polyurethane, rubber, epoxy, etc. In some embodiments, the organic polymer material may include a silicone adhesive glue or a silicone sealing glue. In some embodiments, the Young's modulus of the flexible material may be within a range of 5E5 Pa-5E9 Pa. In some embodiments, the Young's modulus of the flexible material may be within a range of 7E5 Pa-2E9 Pa. In some embodiments, the Young's modulus of the flexible material may be within a range of 5E5 Pa-5E8 Pa.

As shown in (c) of FIG. 12, in some embodiments, spin coating the at least one of two conductive structures after the patterning with the flexible material such that the flexible material covers the electrode and the at least one conduction post may include: spin coating the at least one of the two conductive structures after the patterning (e.g., the first electrode 110 and the at least one first conduction post 141) with a first flexible material such that the first flexible material covers the first electrode 110 and the at least one first conduction post 141.

In 1130, a substrate may be formed after the flexible material is solidified, and one or more hole portions may be provided on the substrate, the at least one conduction post being in flow communication with the outside through the one or more hole portions.

As shown in (d) of FIG. 12, in some embodiments, after the substrate 130 is formed after the flexible material is solidified, the one or more hole portions 131 may be provided on a side of the substrate 130 that is away from the plate structure at positions corresponding to the at least one first conduction post 141. An opening of each of the one or more hole portions 131 that is away from the plate structure may be in flow communication with the outside to facilitate subsequent assembly.

In some embodiments, forming the substrate after the flexible material is solidified, and providing the one or more hole portions on the substrate, the at least one conduction post being in flow communication with the outside through the one or more hole portions may include: after a first substrate is formed after the first flexible material is solidified, one or more first hole portions may be provided on the first substrate, the at least one conduction post being in flow communication with the outside through the one or more first hole portions.

In some embodiments, since the at least one of the two conductive structures on which the first flexible material is spin coated is the first electrode 110 and the at least one first conduction post 141, after a first substrate 130-1 is formed after the first flexible material is solidified, one or more first hole portions 131-1 may be provided on a side of the first substrate 130-1 that is away from the first electrode 110, and an opening of each of the one or more first hole portions 131-1 that is away from the first electrode 110 may be in flow communication with the outside, such that the at least one first conduction post 141 may correspond to the one or more first hole portions 131-1 one by one. In some embodiments, when a plurality of first conduction posts 141 are provided, the plurality of first conduction posts 141 may not correspond to the one or more first hole portions 131-1 one by one, i.e., only some of the at least one first conduction post 141 may have corresponding first hole portions 131-1 on the side away from the first electrode 110.

In some embodiments, when the one or more first hole portions 131-1 are provided, a gap at a preset position and with a preset dimension may be disposed between the at least one first conduction post 141 and the first substrate 130-1.

In some embodiments, the one or more first hole portions 131-1 may be formed when the first flexible material covers the at least one first conduction post 141. In some embodiments, a peripheral side of the at least one first conduction post 141 may maintain a certain distance with the first flexible material in a preset region, such that a gap may be formed between the peripheral side of the at least one first conduction post 141 and the first substrate 130-1.

In some embodiments, the first substrate 130-1 may be directly used as the substrate 130 of the touch sensor 100, and the one or more first hole portions 131-1 may directly constitute the one or more hole portions 131. A distance between one end of a first conduction post 141 that is away from the first electrode 110 and the opening of a first hole portion 131-1 away from the first electrode 110 may be the spacing t between one end of the first conduction post 141 that is away from the first electrode 110 and the second electrode 120.

In some embodiments, a dimension (i.e., the depth of at least one of the one or more first hole portions 131-1) of at least one of the one or more first hole portions 131-1 in an extension direction of the at least one first conduction post 141 may be within a range of 1 μm-1 mm. In some embodiments, the dimension (i.e., the depth of at least one of the one or more first hole portions 131-1) of at least one of the one or more first hole portions 131-1 in the extension direction of the at least one first conduction post 141 may be within a range of 5 μm-500 μm. In some embodiments, the dimension (i.e., the depth of at least one of the one or more first hole portions 131-1) of at least one of the one or more first hole portions 131-1 in the extension direction of the at least one first conduction post 141 may be within a range of 10 μm-100 μm.

In some embodiments, a ratio of the dimension (i.e., the depth of at least one of the one or more first hole portions 131-1) of at least one of the one or more first hole portions 131-1 in the extension direction of the at least one first conduction post 141 to a dimension (i.e., the thickness of the first substrate 130-1) of the first substrate 130-1 in the extension direction of the at least one first conduction post 141 may be within a range of 1/1500-1000/1001. In some embodiments, the ratio of the dimension (i.e., the depth of at least one of the one or more first hole portions 131-1) of at least one of the one or more first hole portions 131-1 in the extension direction of the at least one first conduction post 141 to the dimension (i.e., the thickness of the first substrate 130-1) of the first substrate 130-1 in the extension direction of the at least one first conduction post 141 may be within a range of 2/1500-1000/1001. In some embodiments, the ratio of the dimension (i.e., the depth of at least one of the one or more first hole portions 131-1) of at least one of the one or more first hole portions 131-1 in the extension direction of the at least one first conduction post 141 to a dimension (i.e., the thickness of the first substrate 130-1) of the first substrate 130-1 in the extension direction of the at least one first conduction post 141 may be within a range of 4/1500-1000/1001. In some embodiments, the ratio of the dimension (i.e., the depth of at least one of the one or more first hole portions 131-1) of at least one of the one or more first hole portions 131-1 in the extension direction of the at least one first conduction post 141 to a dimension (i.e., the thickness of the first substrate 130-1) of the first substrate 130-1 in the extension direction of the at least one first conduction post 141 may be within a range of 5/1500-1000/1001.

In 1140, the at least one of two conductive structures after the patterning and formation of the substrate may be connected with another of the two conductive structures such that the two conductive structures are located on both sides of the substrate and cover the one or more hole portions to form the touch sensor.

In some embodiments, the at least one of two conductive structures after the patterning and formation of the substrate refers to the first electrode 110 and the at least one first conduction post 141, and the other of two conductive structures refers to the second electrode 120. The first electrode 110 and the second electrode 120 may be connected through the substrate 130, such that the first electrode 110 and the second electrode 120 may be located on both sides of the substrate 130, respectively, and the second electrode 120 may cover the one or more hole portions 131 to form the touch sensor shown in (c) of FIG. 12.

Figure 13:
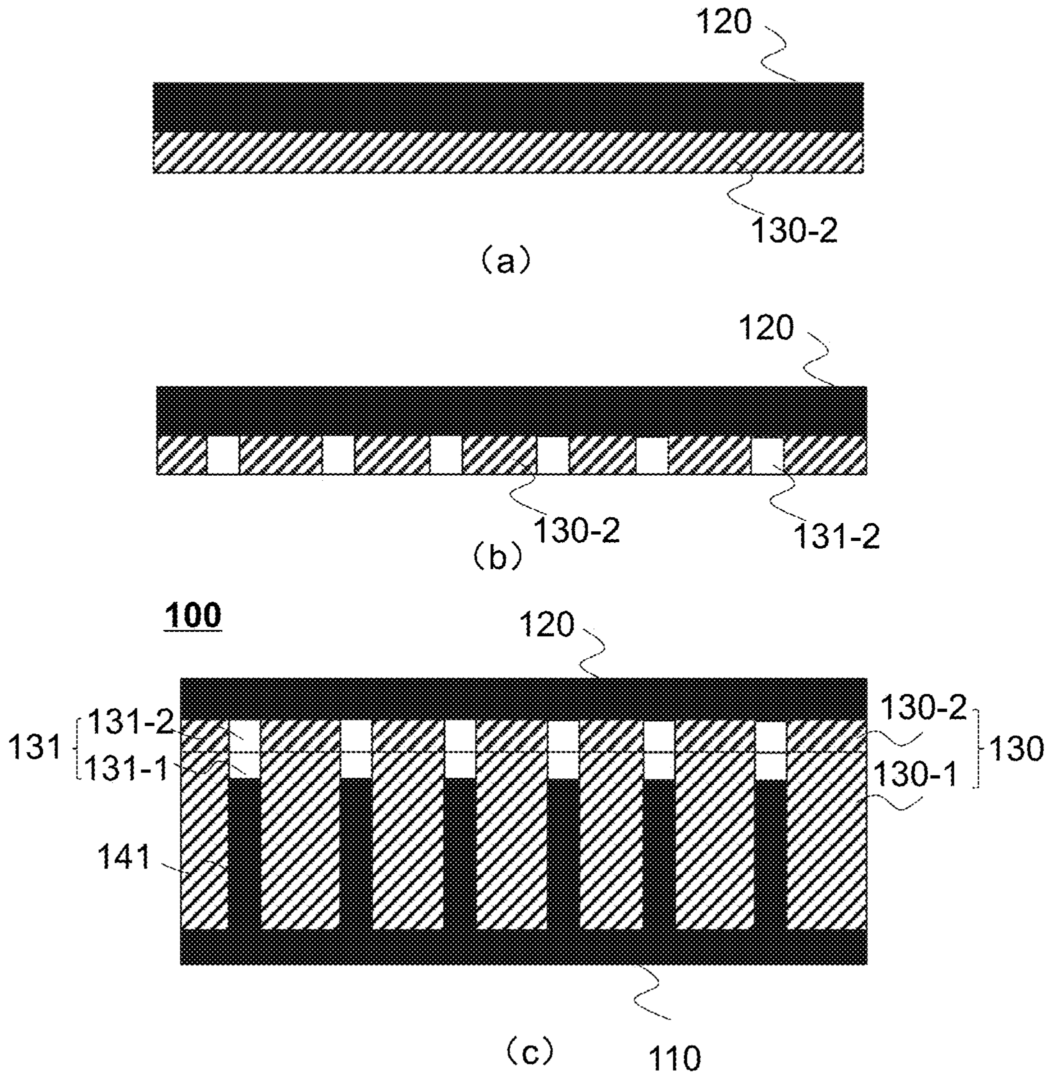
FIG. 13 is a schematic diagram illustrating another preparation process of a second electrode according to some embodiments of the present disclosure.

FIG. 13 is a schematic diagram illustrating another preparation process of a second electrode according to some embodiments of the present disclosure. In some embodiments, the process 1100 may further include: spin coating one side of the second electrode with a second flexible material, forming a second substrate after the second flexible material is solidified, and providing one or more second hole portions corresponding to the one or more first hole portions one by one on the second substrate, the one or more second hole portions penetrating through the second substrate. When the second electrode 120 and the first electrode 110 are installed and connected, a side of the first substrate 130-1 away from the first electrode 110 may be connected with a side of the second substrate 130-2 away from the second electrode 120, and the one or more first hole portions 131-1 may correspond to the one or more second hole portions 131-2 one by one, as shown in (c) of FIG. 13.

In some embodiments, referring to (a) of FIG. 13, one side of the other conductive structure (the second electrode 120) may be spin coated with the second flexible material such that the second flexible material covers the second electrode 120. In this case, the first substrate 130-1 and the second substrate 130-2 may constitute the substrate 130 together. In some embodiments, the first flexible material and the second flexible material may be made of the same material to ensure the uniformity and property stability of the substrate 130, thereby improving the operation stability of the touch sensor 100. In some embodiments, the first flexible material and the second flexible material may be made of different materials, as long as the Young's modulus of the formed substrate 130 is within a range of 5E5 Pa-5E9 Pa.

As shown in the (a), (b), and (c) of FIG. 13, in some embodiments, the second substrate 130-2 may be formed after the second flexible material is solidified. The one or more second hole portions 131-2 may be provided on the second substrate 130-2, and the one or more second hole portions 131-2 may correspond to the one or more first hole portions 131-1 one by one. For at least one of the one or more second hole portions 131-2, an opening at one end of the second hole portion 131-2 may be provided on a surface of the second electrode 120, and an opening at the other end of the second hole portion 131-2 may be in flow communication with the outside. In this case, the first substrate 130-1 and the second substrate 130-2 may constitute the substrate 130 together, and the one or more first hole portions 131-1 and the one or more second hole portions 131-2 may constitute the one or more hole portion 131 together. A sum of a distance between one end of the at least one first conduction post 141 that is away from the first electrode 110 and the opening of the first hole portion 131-1 that is away from the first electrode 110 and the depth of the second hole portion 131-2 may be the spacing t between one end of the at least one first conduction post 141 that is away from the first electrode 110 and the second electrode 120.

In some embodiments, a sum of dimensions of the first hole portion 131-1 and the second hole portion 131-2 in the extension direction of the at least one first conduction post 141 may be within a range of 1 μm-1 mm. In some embodiments, the sum of the dimensions of the first hole portion 131-1 and the second hole portion 131-2 in the extension direction of the at least one first conduction post 141 may be within a range of 0.5 μm-0.5 mm. In some embodiments, the sum of the dimensions of the first hole portion 131-1 and the second hole portion 131-2 in the extension direction of the at least one first conduction post 141 may be within a range of 10 μm-0.1 mm.

In some embodiments, a ratio of the sum (i.e., the spacing t) of the dimensions of the first hole portion 131-1 and the second hole portion 131-2 in the extension direction of the at least one first conduction post 141 to a sum (i.e., the distance T) of the dimensions of the first substrate and the second substrate 130-2 in the extension direction of the at least one first conduction post 141 may be within a range of 1/1500-1000/1001. In some embodiments, the ratio of the sum (i.e., the spacing t) of the dimensions of the first hole portion 131-1 and the second hole portion 131-2 in the extension direction of the at least one first conduction post 141 to a sum (i.e., the distance T) of the dimensions of the first substrate and the second substrate 130-2 in the extension direction of the at least one first conduction post 141 may be within a range of 2/1500-1000/1001. In some embodiments, the ratio of the sum (i.e., the spacing t) of the dimensions of the first hole portion 131-1 and the second hole portion 131-2 in the extension direction of the at least one first conduction post 141 to a sum (i.e., the distance T) of the dimensions of the first substrate and the second substrate 130-2 in the extension direction of the at least one first conduction post 141 may be within a range of 4/1500-1000/1001. In some embodiments, the ratio of the sum (i.e., the spacing t) of the dimensions of the first hole portion 131-1 and the second hole portion 131-2 in the extension direction of the at least one first conduction post 141 to a sum (i.e., the distance T) of the dimensions of the first substrate and the second substrate 130-2 in the extension direction of the at least one first conduction post 141 may be within a range of 5/1500-1000/1001.

Figure 14A:
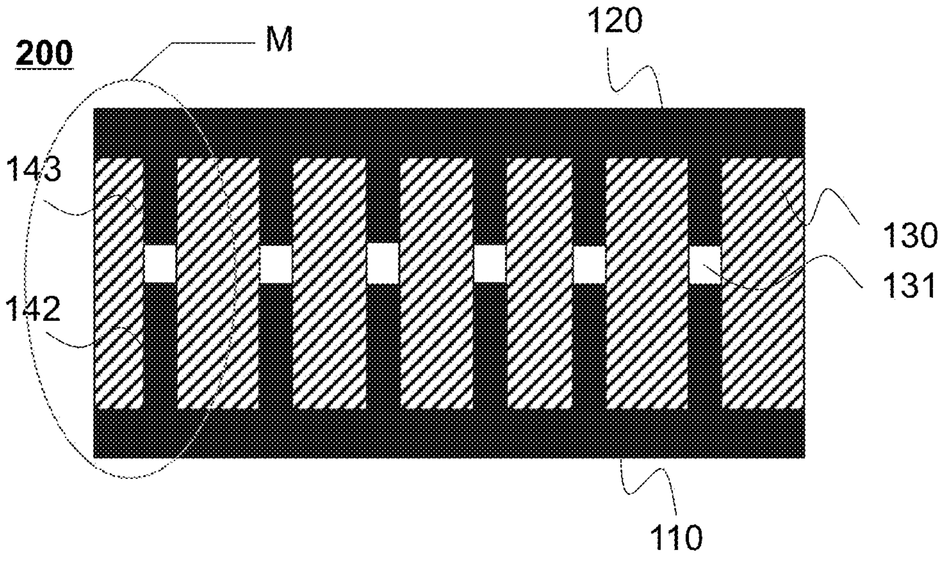
FIG. 14A is a schematic diagram illustrating a cross-sectional view of another touch sensor in an extension direction of at least one conduction post according to some embodiments of the present disclosure.
Figure 14B:
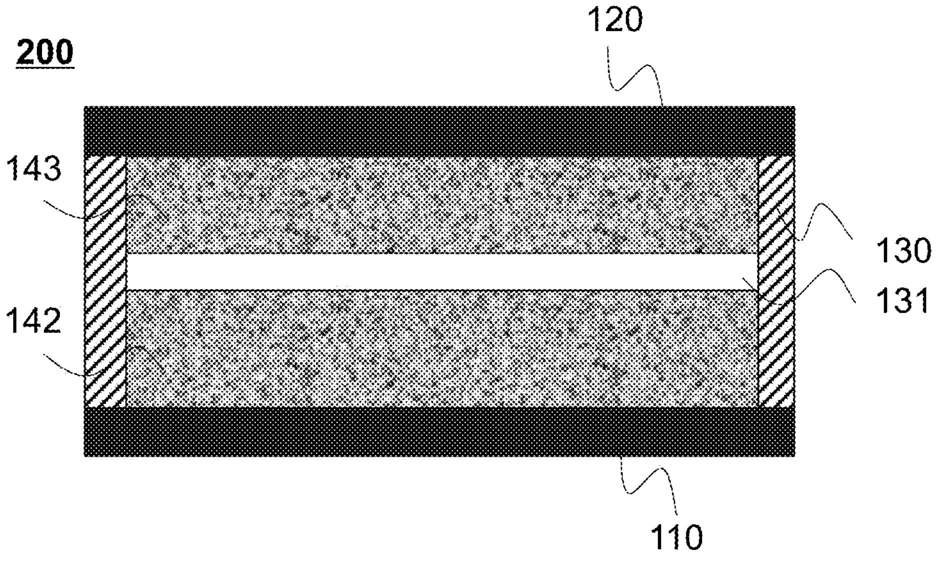
FIG. 14B is a schematic diagram illustrating a cross-sectional view of another touch sensor in an extension direction of at least one conduction post according to some embodiments of the present disclosure.

FIG. 14A is a schematic diagram illustrating a cross-sectional view of another touch sensor in an extension direction of at least one conduction post according to some embodiments of the present disclosure. FIG. 14B is a schematic diagram illustrating a cross-sectional view of another touch sensor in an extension direction of at least one conduction post according to some embodiments of the present disclosure. As shown in FIGS. 14A-14B, in some embodiments, a touch sensor 200 may include the first electrode 110, the second electrode 120, the substrate 130, and the at least one conduction post 140. The first electrode 110 and the second electrode 120 may be located on both sides of the substrate 130, respectively. The at least one conduction post 140 may be located in the substrate 130, and one end of the at least one conduction post 140 may be electrically connected with the first electrode 110. The at least one conduction post 140 may include one or more second conduction posts 142 and one or more third conduction posts 143. One end of a second conduction post 142 may be electrically connected with the first electrode 110. One end of a third conduction post 143 may be electrically connected with the second electrode 120. The other end of the second conduction post 142 that is away from the first electrode 110 may face the other end of the o third conduction post 143 that is away from the second electrode 120, and a spacing may be provided between the other end of the second conduction post 142 that is away from the first electrode 110 and the other end of the third conduction post 143 that is away from the second electrode 120.

In some embodiments, an extension direction of the second conduction post 142 and an extension direction of the third conduction post 143 may be perpendicular to a plane where the first electrode 110 is located and a plane where the second electrode 120 is located, respectively. In some embodiments, the one or more second conduction posts 142 and the one or more third conduction post s143 may also be disposed obliquely with respect to the first electrode 110 or the second electrode 120, i.e., a preset angle may be formed between the extension directions of the second conduction post 142 and the third conduction post 143 and the plane where the first electrode 110 or the second electrode 120 is located, but one end of each of the second conduction post 142 that is away from the first electrode 110 may face one end of the third conduction post 143 that is away from the second electrode 120, such that when a user exerts a force on the first electrode 110 or the second electrode 120 and the substrate 130 deforms, the one or more second conduction posts 142 and the one or more third conduction posts 143 may contact to achieve electrical connection. In some embodiments, the angle between the extension directions of the one or more second conduction posts 142 and the third conduction posts 143 and the plane where the first electrode 110 or the second electrode 120 is located may be within a range of 15°-175°. For example, the angle may be 30°, 45°, 60°, 120°, 150°, etc.

Referring to FIG. 14A and FIG. 14B, in some embodiments, the one or more second conduction posts 142 may correspond to the one or more third conduction posts 143 one by one. A count of the one or more second conduction posts 142 may be the same as a count of the one or more third conduction posts 143. In some embodiments, one second conduction post 142 and one third conduction post 143 may be provided, respectively, as shown in FIG. 14B. One end of the second conduction post 142 may be in contact with (electrically connected with) the first electrode 110, and one end of the third conduction post 143 may be in contact with (electrically connected with) the second electrode 120. A spacing may be provided between the other end of the second conduction post 142 that is away from the first electrode 110 and the other end of the third conduction post 143 that is away from the second electrode 120. When a user exerts a force on the first electrode 110 or the second electrode 120, the substrate 130 may deform, and the spacing between the other end of the second conduction post 142 and the other end of the third conduction post 143 may be reduced until being in contact, so as to achieve electrical connection between the first electrode 110 and the second electrode 120.

In some embodiments, two or more second conduction posts 142 and two or more third conduction posts 143 may be provided, and the count of the second conduction posts 142 may be the same as the count of the third conduction posts 143, as shown in FIG. 14A. One end of each of the plurality of second conduction posts 142 may be electrically connected with the first electrode 110, and one end of each of the plurality of third conduction posts 143 may be electrically connected with the second electrode 120. The spacing may be provided between the other end of each of the plurality of second conduction posts 142 that is away from the first electrode 110 and the other end of each of the plurality of third conduction posts 143 that is away from the second electrode 120. When the user exerts the force on the first electrode 110 or the second electrode 120, the substrate 130 may deform, and the spacing between the other end of at least one of the plurality of second conduction posts 142 and the other end of the corresponding third conduction post 143 may be reduced until being in contact, so as to achieve electrical connection between the first electrode 110 and the second electrode 120.

Referring to FIGS. 2A-4B, in some embodiments, the shape of each of the one or more second conduction post 142 and the shape of each of the one or more third conduction posts 143 may include but are not limited to a cylindrical shape, a prism shape (e.g., a quadrangular prism, a hexagonal prism, an octagonal prism, etc.), etc. In some embodiments, the shape of each of the one or more second conduction post 142 and the shape of each of the one or more third conduction posts 143 may also include a conical shape or a truncated cone shape, such as a cone, a triangular pyramid, a truncated cone, a quadrangular cone, etc. In some embodiments, the shape of each of the one or more second conduction post 142 and the shape of each of the one or more third conduction posts 143 may also include other shapes (e.g., an elliptical cylinder or a drum, etc.), which are not limited in the present disclosure. Any structure of any shape capable of achieving the electrical connection between the first electrode 110 and the second electrode 120 when the substrate 130 deforms can be regarded as the second conduction post 142 and the third conduction post 143 in the embodiments of the present disclosure. In some embodiments, the shape of each of the one or more second conduction posts 142 and the shape of each of the one or more third conduction posts 143 may be the same or different.

Figure 15:
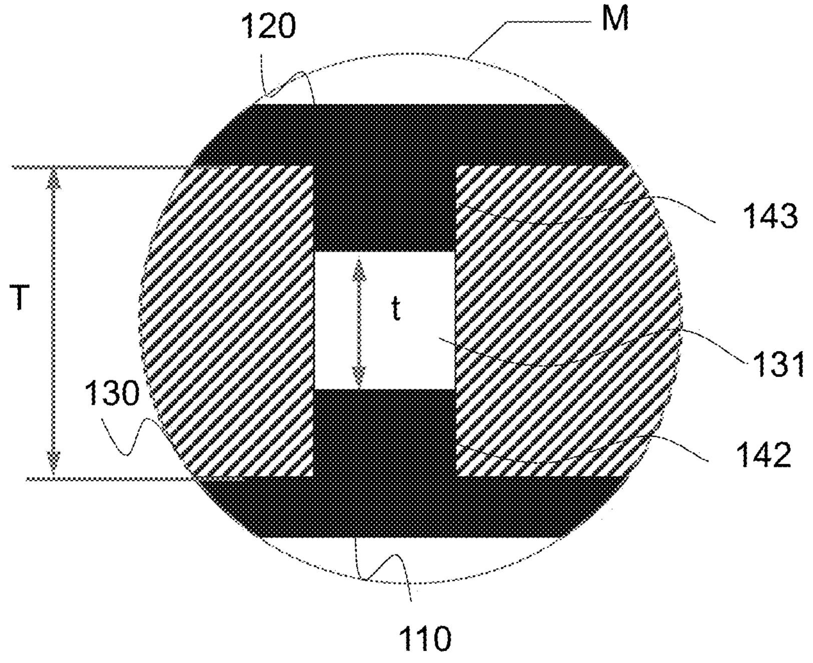
FIG. 15 is a schematic diagram illustrating an enlarged view of an M-region in FIG. 14A.

FIG. 15 is a schematic diagram illustrating an enlarged view of an M-region in FIG. 14A. As shown in FIG. 15, in some embodiments, a spacing between one end of a second conduction post 142 that is away from the first electrode 110 and one end of a third conduction post 143 that is away from the second electrode 120 may be denoted as t. The spacing t may reflect a deformation amount of the substrate 130 moving in an extension direction of the second conduction post 142 and the third conduction post 143 when a user touches the touch sensor 200. When the material and dimension parameters of the substrate 130 are constant, the sensitivity of the touch sensor 200 may be adjusted by adjusting the spacing t. For example, the spacing t and the sensitivity of the touch sensor 100 may be inversely correlated, i.e., the smaller the spacing t, the higher the sensitivity of the touch sensor 200.

From the perspective of improving the sensitivity of the touch sensor 200, the smaller the value of the spacing t, the better. However, considering the processing technology, the value of the spacing t cannot be reduced indefinitely. To ensure the normal processing of the touch sensor 200 and make the touch sensor 200 have a relatively high sensitivity, in some embodiments, the spacing t between one end of the second conduction post 142 that is away from the first electrode 110 and one end of the third conduction post 143 that is away from the second electrode 120 may be within a range of 1 μm-1 mm. To further improve the sensitivity of the touch sensor 200, in some embodiments, the spacing t between one end of the second conduction post 142 that is away from the first electrode 110 and one end of the third conduction post 143 that is away from the second electrode 120 may be within a range of 3 μm-500 μm. Preferably, the spacing t between one end of the second conduction post 142 that is away from the first electrode 110 and one end of the third conduction post 143 that is away from the second electrode 120 may be within a range of 5 μm-100 μm. In some embodiments, the spacing t between one end of the second conduction post 142 that is away from the first electrode 110 and one end of the third conduction post 143 that is away from the second electrode 120 may be matched with a hardness (i.e., a Young's modulus) of a material of the substrate 130, such that after the user exerts a force on the first electrode 110 or the second electrode 120, a deformation degree of the substrate 130 may reduce the spacing t to 0, making one end of the second conduction post 142 that is away from the first electrode 110 contact one end of the third conduction post 143 that is away from the second electrode 120 to achieve electrical connection. For the substrate 130 made of a material with a relatively low Young's modulus, the spacing t between the one end of the first conduction post 142 that is away from the first electrode 110 and one end of the third conduction post 143 that is away from the second electrode 120 may be relatively large. For the substrate 130 made of a material with a relatively high Young's modulus, the spacing t between the one end of the first conduction post 142 that is away from the first electrode 110 and one end of the third conduction post 143 that is away from the second electrode 120 may be relatively small.

Referring to FIG. 15, in some embodiments, a distance between the first electrode 110 and the second electrode 120 is denoted as T, i.e., the thickness of the substrate 130 in a natural state may be T. In addition to the spacing t, the sensitivity of the touch sensor 100 may also be closely correlated with the distance T (i.e., the thickness T of the substrate 130) between the first electrode 110 and the second electrode 120. When the material parameters (e.g. the Young's modulus of the substrate 130, etc.) of the substrate 130 are constant, actual deformation displacement of the substrate 130 may be proportional to the thickness T under the same external load, i.e., the greater the thickness T of the substrate 130, the greater the actual deformation displacement of the substrate 130 of the touch sensor 200. When the material parameters of the substrate 130 are constant, the greater the thickness T of the substrate 130 and the smaller the spacing t, the higher the sensitivity of the touch sensor 200.

However, when the thickness T of the substrate 130 of the touch sensor 200 increases, the overall thickness of the touch sensor 200 may increase, then the overall dimension of the touch sensor 200 may increase, and the space occupied in an applied electronic product may increase. For the electronic product (e.g., a TWS earphone, etc.), the space is extremely limited, so it is necessary to control the overall dimension of the touch sensor 100. In some embodiments, the overall thickness of the touch sensor 200 may be less than 2 mm, i.e., the thickness T of the substrate 130 of the touch sensor 200 may be less than 2 mm. In some embodiments, the thickness T of the substrate 130 may be within a range of 0.5 mm-1.5 mm. In some embodiments, the thickness T of the substrate 130 may be within a range of 0.8 mm-1.8 mm. For example, the thickness T of the substrate 130 may be 1 mm.

In some embodiments, a ratio of the spacing t to the distance T is defined as a according to equation (1). To make the touch sensor 200 have a relatively small dimension and a relatively high sensitivity, the ratio α of the distance T (i.e., the thickness T of the substrate 130) to the spacing t may be within a preset value range. In some embodiments, the ratio α of the spacing t to the distance T may be within a range of 1/1500-1000/1001. In some embodiments, the ratio α of the spacing t to the distance T may be within a range of 2/1500-1000/1001. In some embodiments, the ratio α of the spacing t to the distance T may be within a range of 4/1500-1000/1001. In some embodiments, the ratio α of the spacing t to the distance T may be within a range of 5/1500-1000/1001.

In some embodiments, the substrate 130 may include one or more hole portions 131. The one or more hole portions 131 may penetrate through the substrate 130, i.e., openings at both ends of each of the one or more hole portions 131 may be in contact with the first electrode 110 and the second electrode 120, respectively. In a natural state, a depth of each of the one or more hole portions 131 may be the same as the thickness T of the substrate 130. The one or more second conduction post 142 and the corresponding one or more third conduction post 143 may be located in the one or more hole portions 131, as shown in FIG. 14A. When the user exerts the force on the first electrode 110 or the second electrode 120, the substrate 130 may deform, the one or more hole portions 131 may be compressed in an extension direction of the one or more hole portions 131, and one end of at least one of the one or more second conduction posts 142 that is away from the first electrode 110 may be in contact with one end of at least one of the one or more third conduction posts 143 that is away from the second electrode 120.

In some embodiments, the extension direction of the one or more hole portions 131 may be consistent with the extension direction of the one or more second conduction posts 142 and the extension direction of the one or more third conduction posts 143. For example, when the extension direction of the one or more second conduction posts 142 and the extension direction of the one or more third conduction posts 143 are perpendicular to a plane where the first electrode 110 is located and a plane where the second electrode 120 is located, the extension direction of the one or more hole portions 131 may also be perpendicular to the plane where the first electrode 110 is located and the plane where the second electrode 120 is located. When the extension direction of the one or more second conduction posts 142 is disposed obliquely with respect to the plane where the first electrode 110 is located and the extension direction of the one or more third conduction posts 143 is disposed obliquely with respect to the plane where the second electrode 120 is located, the extension direction of the one or more hole portions 131 may also be disposed obliquely with respect to the plane where the first electrode 110 is located and the plane where the second electrode 120 is located at a corresponding angle. In some embodiments, the extension direction of the one or more hole portions 131 may not be consistent with the extension direction of the one or more second conduction posts 142 and the extension direction of the one or more third conduction posts 143, as long as the one or more second conduction post 142 and the one or more third conduction post 143 can be accommodated in the one or more hole portions 131. For example, when the extension direction of the one or more second conduction posts 142 and the extension direction of the one or more third conduction posts 143 are perpendicular to the plane where the first electrode 110 is located and the plane where the second electrode 120 is located, the extension direction of the one or more hole portions 131 may be disposed obliquely with respect to the plane where the first electrode 110 is located and the plane where the second electrode 120 is located. In the natural state, one end of a second conduction post 142 that is close to the first electrode 110 may be located in an opening of a hole portion 131 that is close to the first electrode 110, and one end of a third conduction posts 143 that is close to the second electrode 120 may be located in an opening of the hole portion 131 that is close to the second electrode. One end of the second conduction post 142 that is away from the first electrode 110 and one end of the third conduction post 143 that is away from the second electrode 110 may be located in the hole portion 131. When the user exerts the force on the first electrode 110 or the second electrode 120 to achieve an electrical connection between the first electrode 110 and the second electrode 120 through the one or more second conduction posts 142 and the one or more third conduction posts 143, one end of at least one of the one or more second conduction posts 142 that is away from the first electrode 110 may be in contact with one end of at least one of the one or more third conduction posts 143 that is away from the second electrode 110 in the one or more hole portions 131, thereby achieving electrical connection between the first electrode 110 and the second electrode 120.

As shown in FIG. 14A and FIG. 14B, in some embodiments, a count of the one or more hole portions 131 may match a count of the one or more second conduction posts 142 and/or a count of the one or more third conduction posts 143. Each of the one or more hole portions 131 may be provided with a second conduction post 142 and a third conduction post 143. In some embodiments, the count of the one or more hole portions 131 may be less than the count of the one or more second conduction posts 142 and/or the count of the one or more third conduction posts 143. A plurality of second conduction posts 142 and a plurality of third conduction posts 143 may be disposed in one of the one or more hole portions 131. The plurality of second conduction posts 142 disposed in one of the one or more hole portions 131 may be disposed at intervals. The plurality of third conduction posts 143 disposed in one of the one or more hole portions 131 may be disposed at intervals. In some embodiments, the count of the one or more hole portions 131 may also be greater than the count of the one or more second conduction posts 142 and/or the count of the one or more third conduction posts 143. In this case, at least one of the one or more hole portions 131 may not be provided with the one or more second conduction posts 142 and the one or more third conduction posts 143. The at least one of the one or more hole portions 131 without the one or more second conduction posts 142 and the one or more third conduction posts 143 may reduce the overall rigidity of the substrate 130, so as to improve the capability of elastic deformation of the substrate 130, thereby improving the sensitivity of the touch sensor 200.

In some embodiments, the shape and the dimension of a hole portion 131 may match the shape and the dimension of a second conduction post 142 and a third conduction post 143. A sidewall of the substrate 130 corresponding to the hole portion 131 may be in contact with the second conduction post 142 and third conduction post 143 without gap. In some embodiments, the dimension of the hole portion 131 may be slightly larger than the dimension of the second conduction post 142 and the third conduction post 143 to reduce the friction generated between the second conduction post 142 and the third conduction post 143 and the sidewall of the substrate 130 corresponding to the hole portion 131 during the clastic deformation of the substrate 130, thereby improving the capability of clastic deformation of the substrate 130, and improving the sensitivity of the touch sensor 200.

Figure 16A:
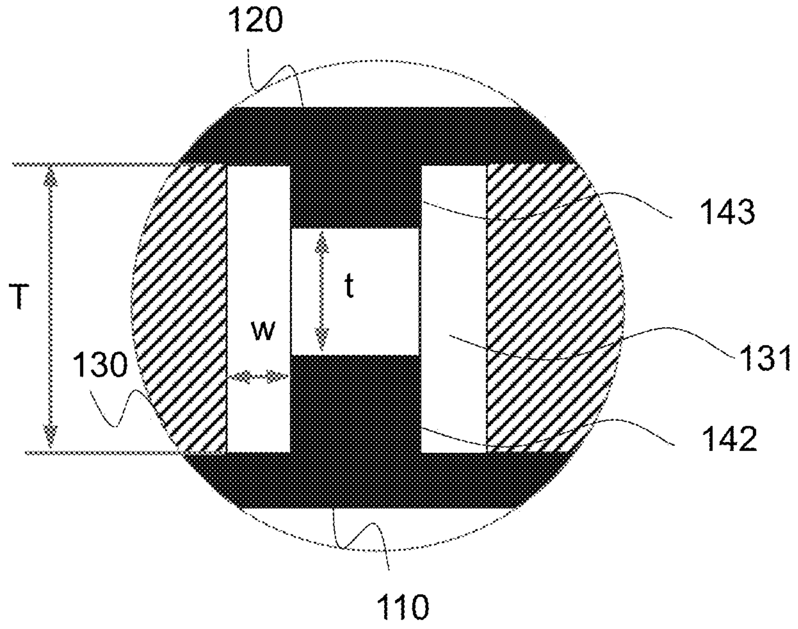
FIG. 16A is a schematic diagram illustrating a cross-sectional view of another touch sensor in an extension direction of at least one conduction post according to some embodiments of the present disclosure.
Figure 16B:
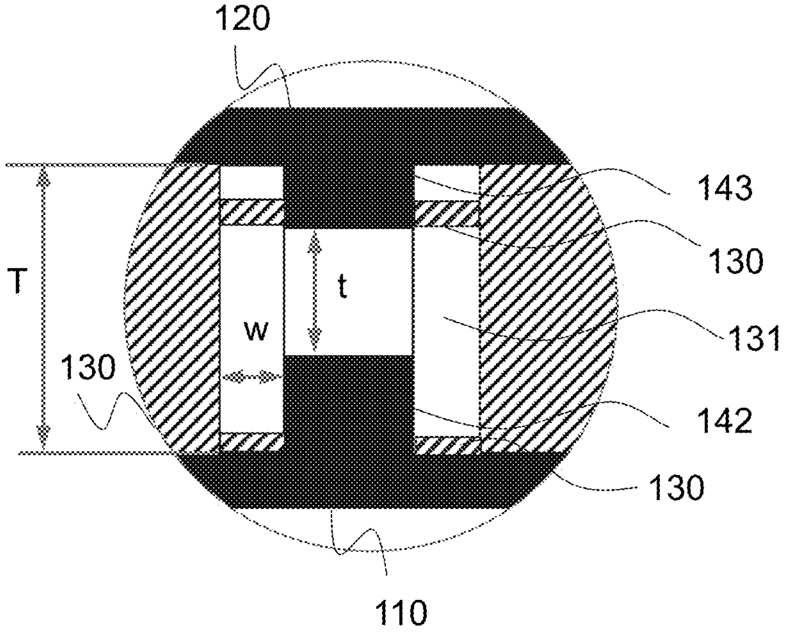
FIG. 16B is a schematic diagram illustrating a cross-sectional view of another touch sensor in an extension direction of at least one conduction post according to some embodiments of the present disclosure.

FIG. 16A is a schematic diagram illustrating a cross-sectional view of another touch sensor in an extension direction of at least one conduction post according to some embodiments of the present disclosure. FIG. 16B is a schematic diagram illustrating a cross-sectional view of another touch sensor in an extension direction of at least one conduction post according to some embodiments of the present disclosure. In some embodiments, in a direction perpendicular to the extension direction of the at least one conduction post 140, a gap may be provided between at least a portion of the peripheral sidewall of the at least one conduction post 140 and the substrate 130. That is, in a direction perpendicular to an extension direction of the one or more second conduction posts 142 and the extension direction of the one or more third conduction posts 143, a gap may be provided between at least a portion of the peripheral sidewall of a second conduction post 142 and/or the third conduction post 143 and an inner wall of the hole portion. By setting the gap, the rigidity of the substrate 130 close to the second conduction post 142 and/or the third conduction post 143 can be reduced, such that the deformation amount of the substrate 130 can be further increased under the same thickness and material parameters of the substrate 130 and a constant external force, thereby improving the sensitivity of the touch sensor 200.

As shown in FIG. 16A, in some embodiments, in the direction perpendicular to the extension direction of the one or more second conduction posts 142 and the extension direction of the one or more third conduction posts 143, a gap may be provided between an overall peripheral sidewall of the second conduction post 142 and an overall peripheral sidewall of the third conduction post 143 and the substrate 130, and the width of the gap is denoted as w. By providing the gap between the overall peripheral sidewall of the second conduction post 142 and the overall peripheral sidewall of the third conduction post 143 and the substrate 130, the rigidity of the substrate 130 close to the second conduction post 142 and the third conduction post 143 can be reduced, thereby improving the sensitivity of the touch sensor 200.

In some embodiments, a gap may be provided between only a portion of the peripheral sidewall of the second conduction post 142 and/or a portion of the peripheral sidewall of the third conduction post 143 and the substrate 130, and the remaining portion of the peripheral sidewall of the second conduction post 142 and/or the remaining portion of the peripheral sidewall of the third conduction post 143 may be in direct contact with the substrate 130. Through the above structural setting, the rigidity of the substrate 130 close to the second conduction post 142 and/or the third conduction post 143 can be reduced to increase the sensitivity of the touch sensor 200; and the substrate 130 can be in direct contact with the one or more second conduction posts 142 and/or the one or more third conduction posts 143, thereby enhancing the operation stability of the touch sensor 200. For example, when a direction of the force exerted by the user is not perpendicular to a plane where the first electrode 110 or the second electrode 120 is located, the substrate 130 may undergo transverse deformation (a direction perpendicular to the extension direction of the one or more second conduction posts 142 and the extension direction of the one or more third conduction posts 143). In this case, since a portion of the peripheral sidewalls of the one or more second conduction post 142 and/or the one or more third conduction post 143 are in direct contact with the substrate 130, the one or more second conduction post 142 and/or the one or more third conduction post 143 may support the substrate 130 to reduce the transverse deformation of the substrate 130. Meanwhile, since the gaps are provided between part of the peripheral sidewalls of the one or more second conduction posts 142 and/or the one or more third conduction posts 143 and the substrate 130, the gap may reduce the friction force generated between the one or more second conduction post 142 and/or the one or more third conduction post 143 and the sidewall of the substrate 130 corresponding to the one or more hole portions 131 during the deformation of the substrate 130 in the extension direction of the one or more second conduction post 142 and the extension direction of the one or more third conduction posts 143, thereby improving the capability of clastic deformation of the substrate 130, and improving the sensitivity of the touch sensor 200.

Referring to FIG. 7, in some embodiments, in the direction perpendicular to the extension direction of the one or more second conduction posts 142 and the extension direction of the one or more third conduction posts 143, i.e., in a circumferential direction of the one or more second conduction post 142 and the one or more third conduction post 143, a gap may be provided between a portion of the peripheral sidewall of the second conduction post 142 and/or the third conduction post 143 and the substrate 130, and the remaining peripheral sidewall of the second conduction post 142 and/or the third conduction post 143 may be in contact with and connected with the substrate 130. That is, in the circumferential direction of the second conduction post 142 and/or the third conduction post 143, one or more gaps may be distributed at intervals, and in the extension direction of the one or more second conduction posts 142 and/or the one or more third conduction post 143, the one or more gaps may penetrate the hole portion 131. That is, in an axial direction of the second conduction post 142 and/or the third conduction post 143, two end portions of each of the one or more gaps may be in contact with the first electrode 110 and the second electrode 120, respectively. Merely by way of example, in the circumferential direction of the one or more second conduction posts 142 and/or the one or more third conduction posts 143, the peripheral sidewall of the second conduction post 142 and/or the third conduction post 143 may be evenly divided into six portions. Three non-adjacent portions of the six portions may be in contact with and connected with the substrate 130, respectively, and the remaining three non-adjacent portions of the six portions may be provided with the one or more gaps, respectively.

Referring to FIG. 16B, in some embodiments, in the extension direction (also referred to as the axial direction or the length direction) of the one or more second conduction posts 142 and/or the one or more third conduction posts 143, the gap may be provided between a portion of the peripheral sidewall of at least one of the one or more second conduction posts 142 and/or the peripheral sidewall of at least one of the one or more third conduction posts 143 and the substrate 130, and the remaining peripheral sidewall of the at least one second conduction post 142 and/or the at least one third conduction post 143 may be in contact with and connected with the substrate 130. For example, one end of the at least one second conduction post 142 that is connected with the first electrode 110 and the peripheral sidewall near the one end may be in contact with the substrate 130, the peripheral sidewall of the at least one third conduction post 143 near the end away from the second electrode 120 may be in contact with the substrate 130, a gap may be provided between a peripheral sidewall region of the at least one second conduction post 142 that is away from the first electrode 110 and the substrate 130, and a gap may be provided between a peripheral sidewall region of the at least one third conduction posts 143 near the end connected with the second electrode 120 and the substrate 130, as shown in FIG. 16B.

Referring to FIG. 16A and FIG. 16B, in some embodiments, by setting the dimension (i.e., the width w of the gap) of the gap in the direction perpendicular to the extension direction of the one or more second conduction posts 142 and/or the third conduction posts 143, the rigidity of the substrate 130 close to the one or more second conduction posts 142 and/or the one or more third conduction posts 143 may be effectively adjusted, thereby adjusting the degree of deformation difficulty of the substrate 130, and adjusting the sensitivity of the touch sensor 200. The rigidity of the substrate 130 close to the one or more second conduction posts 142 and/or the one or more third conduction posts 143 may be inversely correlated with the width of the gap. As the width of the gap increases, the rigidity of the substrate 130 close to the one or more second conduction posts 142 and/or the one or more third conduction posts 143 may decrease. That is, under the action of the same magnitude of force, as the width w of the gap increases, the deformation amount of the substrate 130 close to the one or more second conduction posts 142 and/or the one or more third conduction posts 1431 may increase, making it easier for one end of at least one of the one or more second conduction posts 142 that is away from the first electrode 110 and one end of at least one of the one or more third conduction posts 143 that is away from the second electrode 120 to contact each other, thereby increasing the sensitivity of the touch sensor 200.

It should be noted that the range of the width w of the gap needs to be comprehensively considered in combination with the count and the dimension of the one or more hole portions 131, the one or more second conduction posts 142, and the one or more third conduction posts 143, and the dimension of the substrate 130. To improve the sensitivity of the touch sensor 200 based on the reasonable structure of the touch sensor 200, in some embodiments, the dimension w of the gap in the direction perpendicular to the extension direction of the one or more second conduction posts 142 and/or the one or more third conduction posts 143 may be within a range of 5 μm-5 mm. In some embodiments, the dimension w of the gap in the direction perpendicular to the extension direction of the one or more second conduction posts 142 and/or the one or more third conduction posts 143 may be within a range of 5 μm-4 mm. In some embodiments, the dimension w of the gap in the direction perpendicular to the extension direction of the one or more second conduction posts 142 and/or the one or more third conduction posts 143 may be within a range of 5 μm-3.5 mm. In some embodiments, the dimension w of the gap in the direction perpendicular to the extension direction of the one or more second conduction posts 142 and/or the one or more third conduction posts 143 may be within a range of 5 μm-3 mm.

In some embodiments, the touch sensor 200 may be further provided with other structures to adjust (reduce) the overall rigidity of the substrate 130, and improve the elasticity of the substrate 130, thereby improving the sensitivity of the touch sensor 200.

In some embodiments, the substrate 130 may be provided with one or more through holes 133. The one or more through holes 133 may be in flow communication with the one or more hole portions 131. In some embodiments, the substrate 130 may also be provided with one or more elastic structures in an extension direction of the one or more hole portions 131. The extension direction of the one or more elastic structures may be the same as the extension direction of the one or more hole portions 131. More descriptions regarding the one or more through holes 133 and the one or more elastic structures may be found in the related descriptions of FIG. 9A and FIG. 9B, which are not repeated here.

In some embodiments, a conductive structure may be provided at one end of at least one of the one or more second conduction posts 142 that is away from the first electrode 110 and/or one end of at least one of the one or more third conduction posts 143 that is away from the second electrode 110. When a user exerts a force on the first electrode 110 or the second electrode 120 to make the substrate 130 deform, the conductive structure on at least one of the one or more second conduction posts 142 and/or the conductive structure on at least one of the one or more third conduction posts 143 may be in contact with each other, thereby achieving electrical connection between the first electrode 110, the one or more second conduction posts 142, the one or more third conduction posts 143, and the second electrode 120. The setting of the conductive structure may be equivalent to indirectly reducing the spacing t between one end of at least one of the one or more second conduction posts 142 that is away from the first electrode 110 and one end of at least one of the one or more third conduction posts 143 that is away from the second electrode 120, thereby achieving the purpose of improving the sensitivity of the touch sensor 200.

Figure 17:
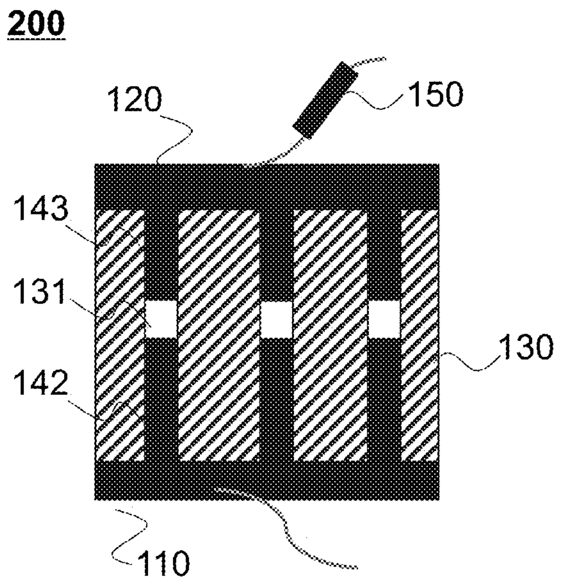
FIG. 17 is a schematic diagram illustrating circuit connection of a touch sensor according to some embodiments of the present disclosure.

FIG. 17 is a schematic diagram illustrating a circuit connection of a touch sensor according to some embodiments of the present disclosure. Referring to FIG. 17 and FIG. 10B, in some embodiments, the touch sensor 200 may further include the resistor 150. The resistor 150 may be electrically connected with the first electrode 110 and the second electrode 120 through a wire. In some embodiments, the touch sensor 200 may further include a power supply component configured to supply power to the touch sensor 200. In the entire circuit, the resistor 150 and the touch sensor 200 may be connected in series.

In some embodiments, whether a user operates the touch sensor 200 may be determined by testing voltage at both ends of the resistor 150. Specifically, a voltage sensing element (e.g., a voltmeter) may be connected in parallel with the resistor 150 to monitor the voltage at both ends of the resistor 150. The voltage sensing element may be configured to monitor the voltage of the resistor 150. In a natural state, the first electrode 110 and the second electrode 120 may be in an open circuit state, and no current flows through the resistor 150. The voltage sensing element may recognize that the voltage of the resistor 150 is 0, thereby determining that the user does not operate the touch sensor 200. When the user exerts a force on the touch sensor 200, the first electrode 110 and the second electrode 120 may be electrically connected through the at least one first conduction post 141, and the current may flow through the resistor 150. The resistor 150 may have the voltage at this time. The voltage sensing element may recognize the voltage at both ends of the resistor 150, thereby determining that the user operates the touch sensor 200.

In some embodiments, whether the user operates the touch sensor 200 may also be determined by testing the current of the resistor 150. Specifically, the resistor 150 may be connected in series with a current sensing element (e.g., an ammeter). The current sensing element may be configured to monitor the current flowing through the resistor 150. In the natural state, the first electrode 110 and the second electrode 120 may be in the open circuit state, and no current flows through the resistor 150. The current sensing element may recognize that the current flowing through the resistor 150 is 0, thereby determining that the user does not operate the touch sensor 200. When the user exerts the force on the touch sensor 100, the first electrode 110 and the second electrode 120 may be electrically connected through the at least one first conduction post 141, and the current may flow through the resistor 150. The current sensing element may recognize that the current flows through the resistor 150, thereby determining that the user operates the touch sensor 200.

Figure 18:
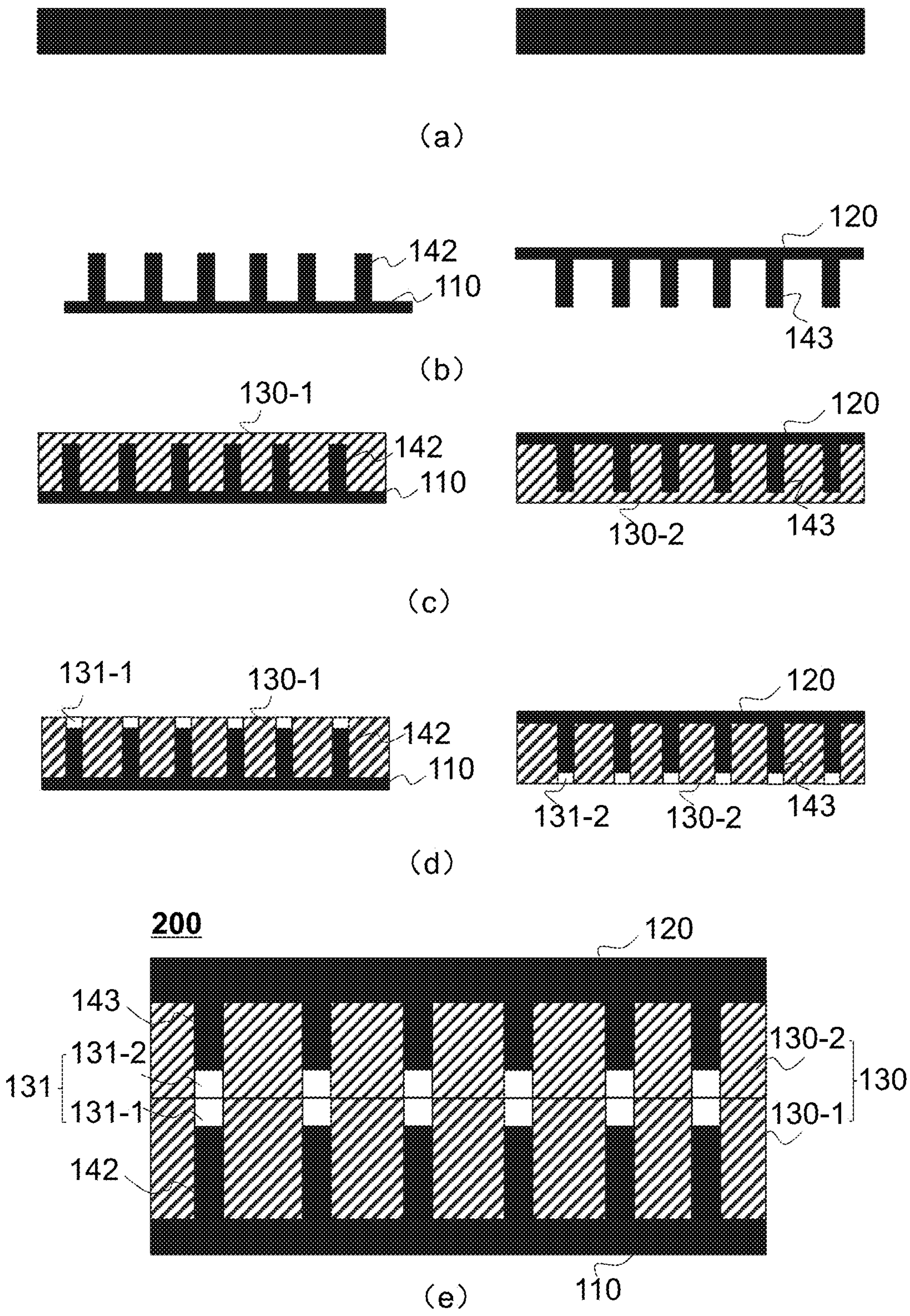
FIG. 18 is a schematic diagram illustrating another preparation process of a touch sensor according to some embodiments of the present disclosure.

FIG. 18 is a schematic diagram illustrating another preparation process of a touch sensor according to some embodiments of the present disclosure. Referring to FIG. 11 and FIG. 18, in some embodiments, the touch sensor 200 may be prepared according to the process 1100. In some embodiments, the process 1100 may include the following operations.

In 1110, an electrode having a plate structure may be obtained by performing patterning on at least one of two conductive structures, the electrode being provided with at least one conduction post protruding relative to a surface of the plate structure.

In some embodiments, the conductive structure refers to a raw material made of a conductive material, as shown in (a) of FIG. 18. In some embodiments, the conductive material may include but is not limited to a metal electrode material (e.g., copper, gold, silver, platinum, palladium, iridium, etc.), a coated electrode material, a graphite electrode material, etc.

In some embodiments, patterning refers to a process for cutting the conductive structure. In some embodiments, a patterning manner may include photolithography and etching. In some embodiments, the patterning manner may also include laser, hot pressing, and other processes, which are not limited in the present disclosure.

In some embodiments, obtaining the electrode having the plate structure by performing patterning on at least one of two conductive structures, the electrode being provided with at least one conduction post protruding relative to the surface of the plate structure may include: obtaining the first electrode 110 and the second electrode 120 having plate structures by performing patterning on the two conductive structures, the first electrode 110 being provided with the one or more second conduction posts 142 protruding relative to the surface of the plate structure, and the second electrode 120 being provided with the one or more third conduction posts 143 protruding relative to the surface of the plate structure. The one or more second conduction posts 142 may correspond to the one or more third conduction posts 143 one by one, as shown in FIG. (b) of FIG. 18.

In 1120, the two conductive structures after the patterning may be spin coated with a flexible material such that the flexible material covers the electrode and the at least one conduction post.

In some embodiments, the electrode may include the first electrode 110 and the second electrode 120, and the at least one conduction post 140 may include the one or more second conduction posts 142 and the one or more third conduction posts 143.

As shown in (c) of FIG. 18, in some embodiments, spin coating the two conductive structures after the patterning with the flexible material such that the flexible material covers the electrode and the at least one conduction post may include: spin coating the first electrode 110 and the one or more second conduction posts 142 with a first flexible material such that the first flexible material covers the first electrode 110 and the one or more second conduction posts 142; and spin coating the second electrode 120 and the one or more third conduction posts 143 with a second flexible material such that the second flexible material covers the second electrode 120 and the one or more third conduction posts 143.

In some embodiments, the first flexible material and the second flexible material may be used together as a material of the substrate 130. In some embodiments, the first flexible material and the second flexible material may be the same material to ensure the uniformity and property stability of the substrate 130, thereby improving the operation stability of the touch sensor 200. In some embodiments, the first flexible material and the second flexible material may also be made of different materials, as long as the Young's modulus of the formed substrate 130 is within a range of 5E5 Pa-5E9 Pa.

In 1130, a substrate may be formed after the flexible material is solidified, and one or more hole portions may be provided on the substrate, the at least one conduction post being in flow communication with the outside through the one or more hole portions.

As shown in (d) of FIG. 18, in some embodiments, after the substrate 130 is formed after the flexible material is solidified, the one or more hole portions 131 may be provided on a side of the substrate 130 that is away from the plate structure at positions corresponding to the one or more second conduction posts 142 or the one or more third conduction posts 143. An opening of each of the one or more hole portions 131 that is away from the plate structure may be in flow communication with the outside to facilitate subsequent assembly.

In some embodiments, forming the substrate after the flexible material is solidified, and providing the one or more hole portions on the substrate, the at least one conduction post being in flow communication with the outside through the one or more hole portions may include: forming the first substrate 130-1 after the first flexible material is solidified, and providing the one or more first hole portions 131-1 on the first substrate 130-1, the one or more second conduction posts 142 being in flow communication with the outside through the one or more first hole portions 131-1; and forming the second substrate 130-2 after the first flexible material is solidified, and providing the one or more second hole portions 131-2 corresponding to the one or more first hole portions 131-1 on the second substrate 130-2, the one or more third conduction posts 143 being in flow communication with the outside through the one or more second hole portions 131-2.

As shown in (d) of FIG. 18, in some embodiments, after the first substrate 130-1 is formed after the first flexible material is solidified, the one or more first hole portions 131-1 may be provided on a side of the first substrate 130-1 that is away from the first electrode 110, and an opening of the one or more first hole portions 131-1 that is away from the first electrode 110 may be in flow communication with the outside, such that the one or more second conduction posts 142 may correspond to the one or more first hole portions 131-1 one by one. After the second substrate 130-2 is formed after the second flexible material is solidified, the one or more second hole portions 131-2 may be provided on a side of the second substrate 130-2 that is away from the second electrode 120, and an opening of the one or more second hole portions 131-2 that is away from the second electrode 120 may be in flow communication with the outside, such that the one or more third conduction posts 143 may correspond to the one or more second hole portions 131-2 one by one. The one or more first hole portions 131-1 may correspond to the one or more second hole portions 131-2 one by one. In some embodiments, when a plurality of second conduction posts 142 and a plurality of third conduction posts 143 are provided, the plurality of second conduction posts 142 may not correspond to the one or more first hole portions 131-1 one by one, and the plurality of third conduction posts 143 may not correspond to the one or more second hole portions 131-2 one by one. In other words, only some of the one or more second conduction posts 142 have corresponding first hole portions 131-1 on the side away from the first electrode 110, and only some of the one or more third conduction posts 143 have corresponding second hole portions 131-2 on the side away from the first electrode 110.

In some embodiments, when the one or more first hole portions 131-1 are provided, a gap at a preset position and with a preset dimension may be provided between the one or more second conduction posts 142 and the first substrate 130-1; when the one or more second hole portions 131-2 are provided, a gap of at a preset position and with a preset dimension may be provided between the one or more third conduction posts 143 and the second substrate 130-2.

In some embodiments, the first substrate 130-1 and the second substrate 130-2 may be used together as the substrate 130 of the touch sensor 200, and the one or more first hole portions 131-1 and the one or more second hole portions 131-2 may be used together as the one or more hole portions 131. A sum of a distance between one end of a second conduction post 142 that is away from the first electrode 110 and an opening of a first hole portion 131-1 that is away from the first electrode 110 and a distance between one end of a third conduction posts 143 that is away from the second electrode 120 and an opening of a second hole portion 131-2 that is away from the second electrode 120 may be the spacing t between one end of the second conduction post 142 that is away from the first electrode 110 and one end of the third conduction post 143 that is away from the second electrode 120.

In some embodiments, a sum of the dimensions of the one or more first hole portions 131-1 and the second hole portions 131-2 in the extension direction of the one or more second conduction posts 142 (and/or the one or more third conduction posts 143) may be within a range of 1 μm-1 mm. In some embodiments, the sum of the dimensions of the one or more first hole portions 131-1 and the second hole portions 131-2 in the extension direction of the one or more second conduction posts 142 (and/or the one or more third conduction posts 143) may be within a range of 5 μm-500 μm. In some embodiments, the sum of the dimensions of the one or more first hole portions 131-1 and the second hole portions 131-2 in the extension direction of the one or more second conduction posts 142 (and/or the one or more third conduction posts 143) may be within a range of 10 μm-100 μm.

In some embodiments, a ratio of the sum (i.e., the spacing t) of the dimensions of the one or more first hole portions 131-1 and the one or more second hole portions 131-2 in the extension direction of the one or more second conduction posts 142 to a sum (i.e., the distance T) of the dimensions of the first substrate 130-1 and the second substrate 130-2 in the extension direction of the one or more second conduction posts may be within a range of 1/1500-1000/1001. In some embodiments, the ratio of the sum (i.e., the spacing t) of the dimensions of the one or more first hole portions 131-1 and the one or more second hole portions 131-2 in the extension direction of the one or more second conduction posts 142 to a sum (i.e., the distance T) of the dimensions of the first substrate 130-1 and the second substrate 130-2 in the extension direction of the one or more second conduction posts may be within a range of 2/1500-1000/1001. In some embodiments, the ratio of the sum (i.e., the spacing t) of the dimensions of the one or more first hole portions 131-1 and the one or more second hole portions 131-2 in the extension direction of the one or more second conduction posts 142 to a sum (i.e., the distance T) of the dimensions of the first substrate 130-1 and the second substrate 130-2 in the extension direction of the one or more second conduction posts may be within a range of 4/1500-1000/1001. In some embodiments, the ratio of the sum (i.e., the spacing t) of the dimensions of the one or more first hole portions 131-1 and the one or more second hole portions 131-2 in the extension direction of the one or more second conduction posts 142 to a sum (i.e., the distance T) of the dimensions of the first substrate 130-1 and the second substrate 130-2 in the extension direction of the one or more second conduction posts may be within a range of 5/1500-1000/1001.

In 1140, the at least one of two conductive structures after the patterning and formation of the substrate may be connected with another of the two conductive structures such that the two conductive structures are located on both sides of the substrate and cover the one or more hole portions to form the touch sensor.

In some embodiments, the at least one of two conductive structures after the patterning and formation of the substrate 130 refers to the first electrode 110 and the one or more second conduction posts 142, and the other of two conductive structures refers to the second electrode 120 and the one or more third conduction posts 143. The first electrode 110 and the second electrode 120 may be connected through the substrate 130, such that the first electrode 110 and the second electrode 120 may be located on both sides of the substrate 130, respectively, and the second electrode 120 may cover the one or more hole portions 131 to form the touch sensor 200 shown in (c) of FIG. 18.

In some embodiments, connecting the at least one of two conductive structures after the patterning and formation of the substrate with another of the two conductive structures such that the two conductive structures are located on both sides of the substrate and cover the one or more hole portions to form the touch sensor may include: connecting a side of the first substrate 130-1 away from the first electrode 110 with a side of the second substrate 130-2 away from the second electrode 120, and aligning openings of the one or more first hole portions 131-1 with openings of the one or more second hole portions 131-2 one by one.

In some embodiments, by aligning the openings of the one or more first hole portions 131-1 with the openings of the one or more second hole portions 131-2 one by one, the one or more first hole portions 131-1 and the one or more second hole portions 131-2 may constitute the one or more hole portions 131 together, such that the one or more second conduction posts 142 and the one or more third conduction posts 143 may correspond to the one or more hole portions 131 one by one.

Figure 19:
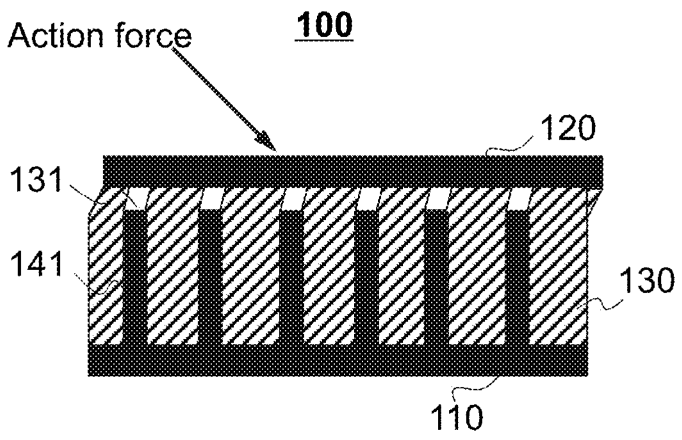
FIG. 19 is a schematic diagram illustrating a cross-sectional view of an exemplary touch sensor in an extension direction of at least one conduction post when a force is applied to the touch sensor according to some embodiments of the present disclosure.

FIG. 19 is a schematic diagram illustrating a cross-sectional view of an exemplary touch sensor in an extension direction of at least one conduction post when a force is applied to the touch sensor according to some embodiments of the present disclosure. Referring to FIG. 2B and FIG. 19, when the touch sensor 100 is used, since the position and direction of the pressure applied by a user are both random within a certain range, when the at least one conduction post 140 is located on one electrode (e.g., the first electrode 110), hollow regions (i.e., spacing regions between the at least one conduction post 140 and the other electrode in the one or more hole portions 131) of the one or more hole portions 131 may be located on a side of the substrate 130 that is close to the other electrode (e.g., the second electrode 120), resulting in a small local stiffness of the substrate 130 close to the other electrode, as shown in FIG. 2B. When the direction of the force applied by the user is not perpendicular to a surface of the electrode but presents a certain inclination angle, a portion of the substrate 130 with the hollow regions of the one or more hole portions 131 may deform in an extension direction of the electrode, affecting the shape of the hollow regions of the one or more hole portions 131, as shown in FIG. 19, which in turn affects the electrical connection between the at least one conduction post 140 and the other electrode (e.g., the second electrode 120), and reduces the sensitivity of the touch sensor 100.

Figure 20A:
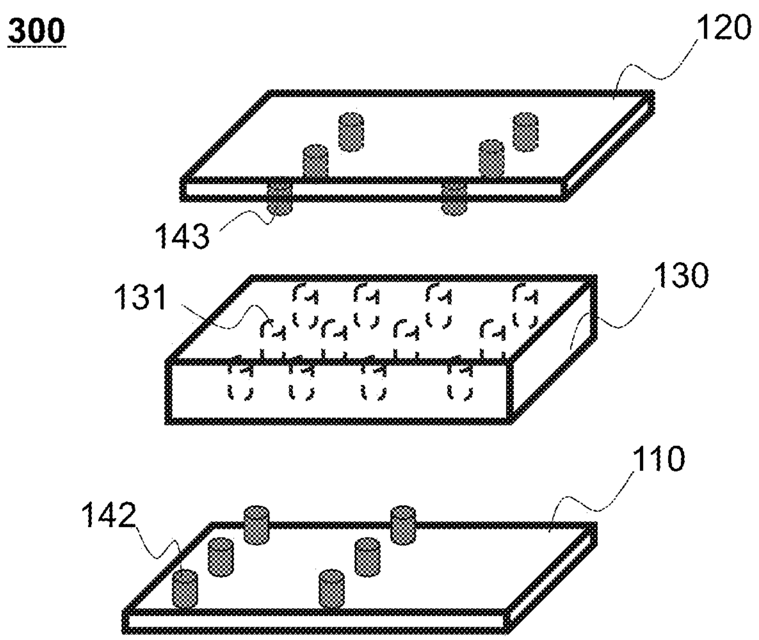
FIG. 20A is a schematic diagram illustrating an exploded view of another touch sensor according to some embodiments of the present disclosure.
Figure 20B:
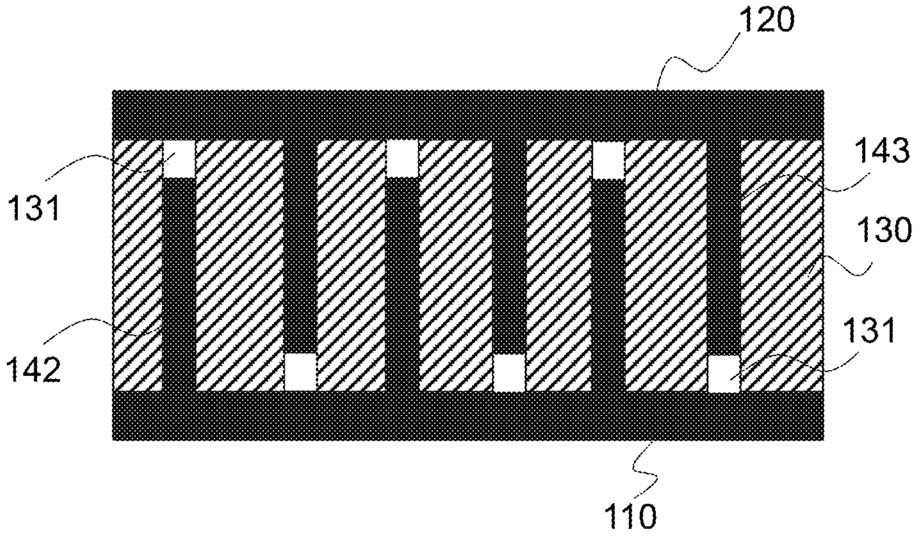
FIG. 20B is a schematic diagram illustrating a cross-sectional view of another touch sensor in an extension direction of at least one conduction post according to some embodiments of the present disclosure.

FIG. 20A is a schematic diagram 1 illustrating an exploded view of another touch sensor according to some embodiments of the present disclosure. FIG. 20B is a schematic diagram illustrating a cross-sectional view of another touch sensor in an extension direction of at least one conduction post according to some embodiments of the present disclosure. Referring to FIG. 1, FIG. 20A, and FIG. 20B, in some embodiments, a touch sensor 300 may include the first electrode 110, the second electrode 120, the substrate 130, and at least one conduction post 140. The first electrode 110 and the second electrode 120 may be located on both sides of the substrate 130, respectively. The at least one conduction post 140 may be located in the substrate 130, and one end of the at least one conduction post 140 may be electrically connected with the first electrode 110. The at least one conduction post 140 may include one or more second conduction posts 142 and one or more third conduction posts 143. One end of each of the one or more second conduction posts 142 may be electrically connected with the first electrode 110. One end of each of the one or more third conduction posts 143 may be electrically connected with the second electrode 120. The one or more second conduction posts 142 and the one or more third conduction posts 143 may be arranged at intervals. A spacing may be provided between one end of at least one of the one or more second conduction posts 142 that is away from the first electrode 110 and a side of the second electrode 120 that fits with the substrate 130. A spacing may be provided between one end of at least one of the one or more third conduction posts 143 that is away from the second electrode 120 and a side of the first electrode 110 that fits with the substrate 130.

In the touch sensor 300, the one or more second conduction posts 142 and the one or more third conduction posts 143 are alternately disposed between the first electrode 110 and the second electrode 120, such that hollow regions of the one or more hole portions 131 may also be alternately distributed in a thickness direction (i.e., the extension direction of the one or more second conduction posts 142 and/or the one or more third conduction posts 143) of the substrate 130, thereby solving the problem of low sensitivity of the touch sensor 300 when subjected to an oblique load due to uneven stiffness of the substrate 130.

It should be noted that when a count of the one or more second conduction posts 142 or the one or more third conduction posts 143 is 0, the structure of the touch sensor 300 may be the same as that of the touch sensor 100.

In some embodiments, an extension direction of the one or more second conduction posts 142 and an extension direction of the one or more third conduction posts 143 may be perpendicular to a plane where the first electrode 110 is located and a plane where the second electrode 120 is located, respectively. In some embodiments, the extension direction of the one or more second conduction posts 142 and the plane where the first electrode 110 is located may be disposed obliquely at a preset angle, and the extension direction of the one or more third conduction posts 143 and the plane where the second electrode 130 is located may be disposed obliquely at a preset angle. In some embodiments, the angle between the extension direction of the one or more second conduction posts 142 and the plane where the first electrode 110 is located and/or the angle between the extension direction of the one or more third conduction posts 143 and the plane where the second electrode 120 is located may be within a range of 15°-175°. For example, the angle may be 30°, 45°, 60°, 120°, 150°, etc.

In some embodiments, a sum of a count of the one or more second conduction posts 142 and a count of the one or more third conduction posts 143 may be 1. In this case, one end of the second conduction post 142 or the third conduction post 143 may be in contact with (electrically connected with) the first electrode 110, and a spacing may be provided between the other end of the second conduction post 142 or the third conduction post 143 and the second electrode 120 (i.e., the other end of the second conduction post 142 or the third conduction post 143 is disconnected from the second electrode 120). When a user exerts a force on the first electrode 110 or the second electrode 120, the substrate 130 may deform, and the spacing between the other end of the second conduction post 142 or the third conduction post 143 and the second electrode 120 may be reduced until the other end of the second conduction post 142 or the third conduction post 143 contacts the second electrode 120. The first electrode 110 and the second electrode 120 may be electrically connected through one second conduction post 142 or third conduction post 143.

In some embodiments, the sum of the count of the one or more second conduction posts 142 and the count of the one or more third conduction posts 143 may be two or more, as shown in FIG. 19A. One end of each of a plurality of second conduction posts 142 may be electrically connected with the first electrode 110, and a spacing may be provided between the other end of each of the plurality of second conduction posts 142 and the second electrode 120. One end of each of the plurality of third conduction posts 143 may be electrically connected with the second electrode 120, and a spacing may be provided between the other end of each of the plurality of third conduction posts 143 and the first electrode 110. The user may exert the force on the first electrode 110 or the second electrode 120 to make the substrate 130 deform, and a spacing between one end of at least one of the plurality of second conduction posts 142 that is away from the first electrode 110 and the second electrode 120 may be reduced until one end of at least one of the plurality of second conduction posts 142 that is away from the first electrode 110 contact the second electrode, and a spacing between one end of at least one of the plurality of third conduction post 143 that is away from the second electrode 120 and the first electrode 110 may be reduced until one end of at least one of the plurality of third conduction post 143 that is away from the second electrode 120 contact the first electrode 110. The first electrode 110 and the second electrode 120 may be electrically connected through at least one of the plurality of second conduction posts 142 and at least one of the plurality of third conduction posts 143.

In some embodiments, the shape of each of the one or more second conduction post 142 and the shape of each of the one or more third conduction posts 143 may include but are not limited to a cylindrical shape, a prism shape (e.g., a quadrangular prism, a hexagonal prism, an octagonal prism, etc.), etc. In some embodiments, the shape of each of the one or more second conduction post 142 and the shape of each of the one or more third conduction posts 143 may also include a conical shape or a truncated cone shape, such as a cone, a triangular pyramid, a truncated cone, a quadrangular cone, etc. In some embodiments, the shape of each of the one or more second conduction post 142 and the shape of each of the one or more third conduction posts 143 may also include other shapes (e.g., an elliptical cylinder or a drum, etc.), which are not limited in the present disclosure. In some embodiments, the shape of each of the one or more second conduction posts 142 and the shape of each of the one or more third conduction posts 143 may be the same or different, which are not limited in the present disclosure. Any structure of any shape capable of achieving the electrical connection between the first electrode 110 and the second electrode 120 when the substrate 130 deforms can be regarded as the second conduction post 142 and the third conduction post 143 in the embodiments of the present disclosure.

In some embodiments, a spacing between one end of a second conduction post 142 that is away from the first electrode 110 and the second electrode 120 is denoted t, and a spacing between one end of a third conduction post 143 that is away from the second electrode 120 and the first electrode 110 is denoted as t. The spacing t may reflect a deformation amount of the substrate 130 moving in an extension direction of the one or more second conduction posts 142 and the one or more third conduction posts 143 during the touch of a user. When the material and dimension parameters of the substrate 130 are constant, the sensitivity of the touch sensor 300 may be adjusted by adjusting the spacing t. For example, the spacing t and the sensitivity of the touch sensor 300 may be inversely correlated, i.e., the smaller the spacing t, the higher the sensitivity of the touch sensor 300.

From the perspective of improving the sensitivity of the touch sensor 300, the smaller the value of the spacing t, the better. However, considering the processing technology, the value of the spacing t cannot be reduced indefinitely. To ensure the normal processing of the touch sensor 300 and make the touch sensor 300 have a relatively high sensitivity, in some embodiments, the spacing t may be within a range of 1 μm-1 mm. To further improve the sensitivity of the touch sensor 300, in some embodiments, the spacing t may be within a range of 3 μm-500 μm. Preferably, the spacing t may be within a range of 5 μm-100 μm. In some embodiments, the spacing t may be matched with a hardness (i.e., a Young's modulus) of a material of the substrate 130, such that after the user exerts a force on the first electrode 110 or the second electrode 120, a deformation degree of the substrate 130 may reduce the spacing t to 0, making one end of the second conduction post 142 that is away from the first electrode 110 contact the second electrode 120, and one end of the third conduction post 143 that is away from the second electrode 120 contact the first electrode 110 to achieve electrical connection. For the substrate 130 made of a material with a relatively low Young's modulus, the spacing t may be relatively large. For the substrate 130 made of a material with a relatively high Young's modulus, the spacing t may be relatively small.

In some embodiments, a distance between the first electrode 110 and the second electrode 120 is denoted as T, i.e., the thickness of the substrate 130 in a natural state may be T. In addition to the spacing t, the sensitivity of the touch sensor 300 may also be closely correlated with the distance T (i.e., the thickness T of the substrate 130) between the first electrode 110 and the second electrode 120. When the material parameters (e.g. the Young's modulus of the substrate 130, etc.) of the substrate 130 are constant, the deformation displacement of the substrate 130 may be proportional to the thickness T under the same external load, i.e., the greater the thickness T of the substrate 130, the greater the deformation displacement of the substrate 130 of the touch sensor 300. When the material parameters of the substrate 130 are constant, the greater the thickness T of the substrate 130 and the smaller the spacing t, the higher the sensitivity of the touch sensor 300.

However, when the thickness T of the substrate 130 of the touch sensor 300 increases, the overall thickness of the touch sensor 300 may increase, then the overall dimension of the touch sensor 300 may increase, and the space occupied in an applied electronic product may increase. For the electronic product (e.g., a TWS earphone, etc.), the space is extremely limited, so it is necessary to control the overall dimension of the touch sensor 300. In some embodiments, the overall thickness of the touch sensor 300 may be less than 2 mm, i.e., the thickness T of the substrate 130 of the touch sensor 300 may be less than 2 mm. In some embodiments, the thickness T of the substrate 130 may be within a range of 0.5 mm-1.5 mm. In some embodiments, the thickness T of the substrate 130 may be within a range of 0.8 mm-1.8 mm. For example, the thickness T of the substrate 130 may be 1 mm.

In some embodiments, a ratio of the spacing t to the distance T is defined as a according to equation (1). To make the touch sensor 300 have a relatively small dimension and a relatively high sensitivity, the ratio α of the distance T (i.e., the thickness T of the substrate 130) to the spacing t may be within a preset value range. In some embodiments, the ratio α of the spacing t to the distance T may be within a range of 1/1500-1000/1001. In some embodiments, the ratio α of the spacing t to the distance T may be within a range of 2/1500-1000/1001. In some embodiments, the ratio α of the spacing t to the distance T may be within a range of 4/1500-1000/1001. In some embodiments, the ratio α of the spacing t to the distance T may be within a range of 5/1500-1000/1001.

In some embodiments, the substrate 130 may include one or more hole portions 131. The one or more hole portions 131 may penetrate through the substrate 130, i.e., openings at both ends of each of the one or more hole portions 131 may be in contact with the first electrode 110 and the second electrode 120, respectively. In a natural state, a depth of each of the one or more hole portions 131 may be the same as the thickness T of the substrate 130. The one or more second conduction post 142 and the corresponding one or more third conduction post 143 may be located in the one or more hole portions 131. When the user exerts the force on the first electrode 110 or the second electrode 120, the substrate 130 may deform, the one or more hole portions 131 may be compressed in an extension direction of the one or more hole portions 131, and one end of at least one of the one or more second conduction posts 142 that is away from the first electrode 110 may be in contact with the second electrode 120, and one end of at least one of the one or more third conduction posts 143 that is away from the second electrode 120 may be in contact with the first electrode 110.

In some embodiments, the extension direction of the one or more hole portions 131 may be consistent with the extension direction of the one or more second conduction posts 142 and the extension direction of the one or more third conduction posts 143. For example, when the extension direction of the one or more second conduction posts 142 and the extension direction of the one or more third conduction posts 143 are perpendicular to a plane where the first electrode 110 is located and a plane where the second electrode 120 is located, the extension direction of the one or more hole portions 131 may also be perpendicular to the plane where the first electrode 110 is located and the plane where the second electrode 120 is located. When the extension direction of the one or more second conduction posts 142 is disposed obliquely with respect to the plane where the first electrode 110 is located and the extension direction of the one or more third conduction posts 143 is disposed obliquely with respect to the plane where the second electrode 120 is located, the extension direction of the one or more hole portions 131 may also be disposed obliquely with respect to the plane where the first electrode 110 is located and the plane where the second electrode 120 is located at a corresponding angle. In some embodiments, the extension direction of the one or more hole portions 131 may not be consistent with the extension direction of the one or more second conduction posts 142 and the extension direction of the one or more third conduction posts 143, as long as the one or more second conduction post 142 and the one or more third conduction post 143 can be accommodated in the one or more hole portions 131. For example, when the extension direction of the one or more second conduction posts 142 and the extension direction of the one or more third conduction posts 143 are perpendicular to the plane where the first electrode 110 is located and the plane where the second electrode 120 is located, the extension direction of the one or more hole portions 131 may be disposed obliquely with respect to the plane where the first electrode 110 is located and the plane where the second electrode 120 is located. In the natural state, one end of one of the one or more second conduction posts 142 that is close to the first electrode 110 may be located in the opening of one of the one or more hole portions 131 that is close to the first electrode 110, and one end of one of the one or more third conduction posts 143 that is close to the second electrode 120 may be located in the opening of one of the one or more hole portions 131 that is close to the second electrode. One end of one of the one or more second conduction posts 142 that is away from the first electrode 110 and one end of one of the one or more third conduction posts 143 that is away from the second electrode 110 may be located in the one or more hole portions 131. When the user exerts the force on the first electrode 110 or the second electrode 120 to achieve an electrical connection between the first electrode 110 and the second electrode 120 through the one or more second conduction posts 142 and/or the one or more third conduction posts 143, one end of at least one of the one or more second conduction posts 142 that is away from the first electrode 110 may be in contact with the second electrode 120, and one end of at least one of the one or more third conduction posts 143 that is away from the second electrode 110 may be in contact with the first electrode 110, thereby achieving electrical connection between the first electrode 110 and the second electrode 120.

In some embodiments, a count of the one or more hole portions 131 may match a sum of a count of the one or more second conduction posts 142 and a count of the one or more third conduction posts 143. One second conduction post 142 or one third conduction post 143 may be disposed in each of the one or more hole portions 131. In some embodiments, the count of the one or more hole portions 131 may be less than the sum of the count of the one or more second conduction posts 142 and the count of the one or more third conduction posts 143. A plurality of second conduction posts 142 and/or a plurality of third conduction posts 143 may be disposed in one of the one or more hole portions 131. The plurality of second conduction posts 142 and/or the plurality of third conduction posts 143 disposed in one of the one or more hole portions 131 may be disposed at intervals. The plurality of third conduction posts 143 disposed in one of the one or more hole portions 131 may be disposed at intervals. In some embodiments, the count of the one or more hole portions 131 may also be greater than the sum of the count of the one or more second conduction posts 142 and the count of the one or more third conduction posts 143. In this case, at least one of the one or more hole portions 131 may not be provided with a second conduction post 142 or a third conduction post 143. The at least one of the one or more hole portions 131 without the second conduction post 142 and the third conduction post 143 may reduce the overall rigidity of the substrate 130, so as to improve the capability of clastic deformation of the substrate 130, thereby improving the sensitivity of the touch sensor 300.

In some embodiments, the shape and the dimension of each of the one or more hole portions 131 may match the shape and the dimension of each of the one or more second conduction posts 142 or each of the one or more third conduction posts 143. A sidewall of the substrate 130 corresponding to at least one of the one or more hole portions 131 may be in contact with at least one of the one or more second conduction posts 142 or at least one of the one or more third conduction posts 143 without gap. In some embodiments, the dimension of at least one of the one or more hole portions 131 may be slightly larger than the dimension of at least one of the one or more second conduction posts 142 and/or at least one of the one or more third conduction posts 143 to reduce the friction generated between the at least one second conduction post 142 and/or the at least one third conduction post 143 and the sidewall of the substrate 130 corresponding to the at least one hole portion 131 during the clastic deformation of the substrate 130, thereby improving the capability of elastic deformation of the substrate 130, and improving the sensitivity of the touch sensor 300.

In some embodiments, in a direction perpendicular to the extension direction of the one or more second conduction posts 142 and the extension direction of the one or more third conduction posts 143, a gap may be provided between at least a portion of a peripheral sidewall of at least one of the one or more second conduction posts 142 and/or at least one of the one or more third conduction posts 143 and an inner wall of at least one of the one or more hole portions 131. By providing the gap, the rigidity of the substrate 130 close to the at least one second conduction post 142 and/or the at least one third conduction post 143 can be reduced, thereby further increasing the deformation amount of the substrate 130 under the same thickness and material parameters of the substrate 130 and a certain external force, and improving the sensitivity of the touch sensor 300.

In some embodiments, in the direction perpendicular to the extension direction of the one or more second conduction posts 142 and the extension direction of the one or more third conduction posts 143, a gap may be provided between an overall peripheral sidewall of at least one of the one or more second conduction posts 142 and at least one of the one or more third conduction posts 143 and the substrate 130, and the width of the gap is denoted as w. By providing the gap between the overall peripheral sidewall of the at least one second conduction post 142 and the at least one third conduction post 143 and the substrate 130, the rigidity of the substrate 130 close to the at least one second conduction post 142 and the at least one third conduction post 143 can be reduced, thereby improving the sensitivity of the touch sensor 300.

In some embodiments, a gap may be provided between only a portion of the peripheral sidewall of at least one of the one or more second conduction posts 142 and/or at least one of the one or more third conduction posts 143 and the substrate 130, and a portion of the peripheral sidewall of the at least one second conduction post 142 and/or the at least one third conduction post 143 may be in direct contact with the substrate 130. In such cases, the rigidity of the substrate 130 close to the at least one second conduction post 142 and/or the at least one third conduction post 143 can be reduced to increase the sensitivity of the touch sensor 300; and the substrate 130 can be in direct contact with the at least one second conduction post 142 and/or the at least one third conduction post 143, thereby enhancing the operation stability of the touch sensor 300. For example, when a direction of the force exerted by the user is not perpendicular to a plane where the first electrode 110 or the second electrode 120 is located, the substrate 130 may undergo transverse deformation (a direction perpendicular to the extension direction of the one or more second conduction posts 142 and the extension direction of the one or more third conduction posts 143). In this case, since a portion of the peripheral sidewall of the at least one second conduction post 142 and/or the at least one third conduction post 143 are in direct contact with the substrate 130, the at least one second conduction post 142 and/or the at least one third conduction post 143 may support the substrate 130 to reduce the transverse deformation of the substrate 130. Meanwhile, since the gap is provided between a portion of the peripheral sidewall of the at least one second conduction post 142 and/or the at least one third conduction post 143 and the substrate 130, the gap may reduce the friction force generated between the at least one second conduction post 142 and/or the at least one third conduction post 143 and the sidewall of the substrate 130 corresponding to the at least one hole portion 131 during the deformation of the substrate 130 in the extension direction of the one or more second conduction post 142 and the extension direction of the one or more third conduction posts 143, thereby improving the capability of elastic deformation of the substrate 130, and improving the sensitivity of the touch sensor 300.

In some embodiments, in the direction perpendicular to the extension direction of the one or more second conduction posts 142 and the extension direction of the one or more third conduction posts 143, i.e., in a circumferential direction of the one or more second conduction post 142 and the one or more third conduction post 143, a gap may be provided between a portion of the peripheral sidewall of at least one of the one or more second conduction posts 142 and/or at least one of the one or more third conduction posts 143 and the substrate 130, and the remaining peripheral sidewall of the at least one second conduction post 142 and/or the at least one third conduction post 143 may be in contact with and connected with the substrate 130, which is similar to the structure shown in FIG. 7. That is, in the circumferential direction of the at least one second conduction post 142 and/or the at least one third conduction post 143, one or more gaps may be distributed at intervals, and in the extension direction of the at least one second conduction post 142 and/or the at least one third conduction post 143, the one or more gaps may penetrate the at least one hole portion 131. That is, in an axial direction of the at least one second conduction post 142 and/or the at least one third conduction post 143, two end portions of each of the one or more gaps may be in contact with the first electrode 110 and the second electrode 120, respectively. Merely by way of example, in the circumferential direction of the at least one second conduction post 142 and/or the at least one third conduction post 143, the peripheral sidewall of the at least one second conduction post 142 and/or the at least one third conduction post 143 may be evenly divided into six portions. Three non-adjacent portions of the six portions may be in contact with and connected with the substrate 130, respectively, and the remaining three non-adjacent portions of the six portions may be provided with the one or more gaps, respectively.

In some embodiments, in the extension direction (also referred to as the axial direction or the length direction) of the one or more second conduction posts 142 and/or the one or more third conduction posts 143, the gap may be provided between a portion of a peripheral sidewall of at least one of the one or more second conduction posts 142 and/or at least one of the one or more third conduction posts 143 and the substrate 130, and the remaining peripheral sidewall of the at least one second conduction post 142 and/or the at least one third conduction post 143 may be in contact with and connected with the substrate 130, which is similar to the structure shown in FIG. 8B. For example, one end of the at least one second conduction post 142 that is connected with the first electrode 110 and the peripheral sidewall near the one end may be in contact with the substrate 130, one end of the at least one third conduction post 143 that is connected with the second electrode 120 the peripheral sidewall near the one end may be in contact with the substrate 130, a gap may be provided between the peripheral sidewall of the at least one second conduction post 142 that is away from the first electrode 110 and the substrate 130, and a gap may be provided between a peripheral sidewall of the at least one third conduction post 143 that is away from the second electrode 120 and the substrate 130.

In some embodiments, by setting the dimension (i.e., the width w of the gap) of the gap in the direction perpendicular to the extension direction of the one or more second conduction posts 142 and/or the third conduction posts 143, the rigidity of the substrate 130 close to the one or more second conduction posts 142 and/or the one or more third conduction posts 143 may be effectively adjusted, thereby adjusting the degree of deformation difficulty of the substrate 130, and adjusting the sensitivity of the touch sensor 300. The rigidity of the substrate 130 close to the one or more second conduction posts 142 and/or the one or more third conduction posts 143 may be inversely correlated with the width of the gap. As the width of the gap increases, the rigidity of the substrate 130 close to the one or more second conduction posts 142 and/or the one or more third conduction posts 143 may decrease. That is, under the action of the same magnitude of force, as the width w of the gap increases, the deformation amount of the substrate 130 close to the one or more second conduction posts 142 and/or the one or more third conduction posts 1431 may increase, making it easier for one end of at least one second conduction post 142 that is away from the first electrode 110 and one end of at least one third conduction post 143 that is away from the second electrode 120 to contact each other, thereby increasing the sensitivity of the touch sensor 200. It should be noted that the range of the width w of the gap needs to be comprehensively considered in combination with the count and the dimension of the one or more hole portions 131, the one or more second conduction posts 142, and the one or more third conduction posts 143, and the dimension of the substrate 130. To improve the sensitivity of the touch sensor 200 based on the reasonable structure of the touch sensor 300, in some embodiments, the dimension w of the gap in the direction perpendicular to the extension direction of the one or more second conduction posts 142 and/or the one or more third conduction posts 143 may be within a range of 5 μm-5 mm. In some embodiments, the dimension w of the gap in the direction perpendicular to the extension direction of the one or more second conduction posts 142 and/or the one or more third conduction posts 143 may be within a range of 5 μm-4 mm. In some embodiments, the dimension w of the gap in the direction perpendicular to the extension direction of the one or more second conduction posts 142 and/or the one or more third conduction posts 143 may be within a range of 5 μm-3.5 mm. In some embodiments, the dimension w of the gap in the direction perpendicular to the extension direction of the one or more second conduction posts 142 and/or the one or more third conduction posts 143 may be within a range of 5 μm-3 mm.

In some embodiments, the touch sensor 300 may be further provided with other structures to improve the elasticity of the substrate 130, thereby improving the sensitivity of the touch sensor 300.

In some embodiments, the substrate 130 may be provided with one or more through holes 133. The one or more through holes 133 may be in flow communication with the one or more hole portions 131. In some embodiments, the substrate 130 may also be provided with one or more clastic structures in an extension direction of the one or more hole portions 131. The extension direction of the one or more clastic structures may be the same as the extension direction of the one or more hole portions 131. More descriptions regarding the one or more through holes 133 and the one or more clastic structures may be found in the related descriptions of FIG. 9A and FIG. 9B, which are not repeated here.

In some embodiments, a conductive structure may be provided at one end of at least one of the one or more second conduction posts 142 that is away from the first electrode 110 and/or one end of at least one of the one or more third conduction posts 143 that is away from the second electrode 110. When a user exerts a force on the first electrode 110 or the second electrode 120 to make the substrate 130 deform, the conductive structure on the at least one second conduction post 142 may be in contact with the second electrode 120 and/or the conductive structure on the at least one third conduction post 143 may be in contact with the first electrode 110, thereby achieving electrical connection between the first electrode 110 and the second electrode 120. The setting of the conductive structure may be equivalent to indirectly reducing the spacing between one end of the at least one second conduction post 142 that is away from the first electrode 110 and the second electrode 120 and the spacing t between one end of the at least one third conduction post 143 that is away from the second electrode 120 and the third electrode 110, thereby improving the sensitivity of the touch sensor 300.

Referring to FIG. 10B, in some embodiments, the touch sensor 300 may further include the resistor 150. The resistor 150 may be electrically connected with the first electrode 110 and the second electrode 120 through a conductive wire. In some embodiments, the touch sensor 300 may further include a power supply component configured to supply power to the touch sensor 300. In the entire circuit, the resistor 150 and the touch sensor 300 may be connected in series.

In some embodiments, whether a user operates the touch sensor 300 may be determined by testing voltage at both ends of the resistor 150. Specifically, a voltage sensing element (e.g., a voltmeter) may be connected in parallel with the resistor 150 to monitor the voltage at both ends of the resistor 150. The voltage sensing element may be configured to monitor the voltage of the resistor 150. In a natural state, the first electrode 110 and the second electrode 120 may be in an open circuit state, and no current flows through the resistor 150. The voltage sensing element may recognize that the voltage of the resistor 150 is 0, thereby determining that the user does not operate the touch sensor 300. When the user exerts a force on the touch sensor 300, the first electrode 110 and the second electrode 120 may be electrically connected through the at least one first conduction post 141, and the current may flow through the resistor 150. The resistor 150 may have the voltage at this time. The voltage sensing element may recognize the voltage at both ends of the resistor 150, thereby determining that the user operates the touch sensor 300.

In some embodiments, whether the user operates the touch sensor 300 may also be determined by testing the current of the resistor 150. Specifically, the resistor 150 may be connected in series with a current sensing element (e.g., an ammeter). The current sensing element may be configured to monitor the current flowing through the resistor 150. In the natural state, the first electrode 110 and the second electrode 120 may be in the open circuit state, and no current flows through the resistor 150. The current sensing element may recognize that the current flowing through the resistor 150 is 0, thereby determining that the user does not operate the touch sensor 300. When the user exerts the force on the touch sensor 100, the first electrode 110 and the second electrode 120 may be electrically connected through the at least one first conduction post 141, and the current may flow through the resistor 150. The current sensing element may recognize that the current flows through the resistor 150, thereby determining that the user operates the touch sensor 300.

Figure 21:
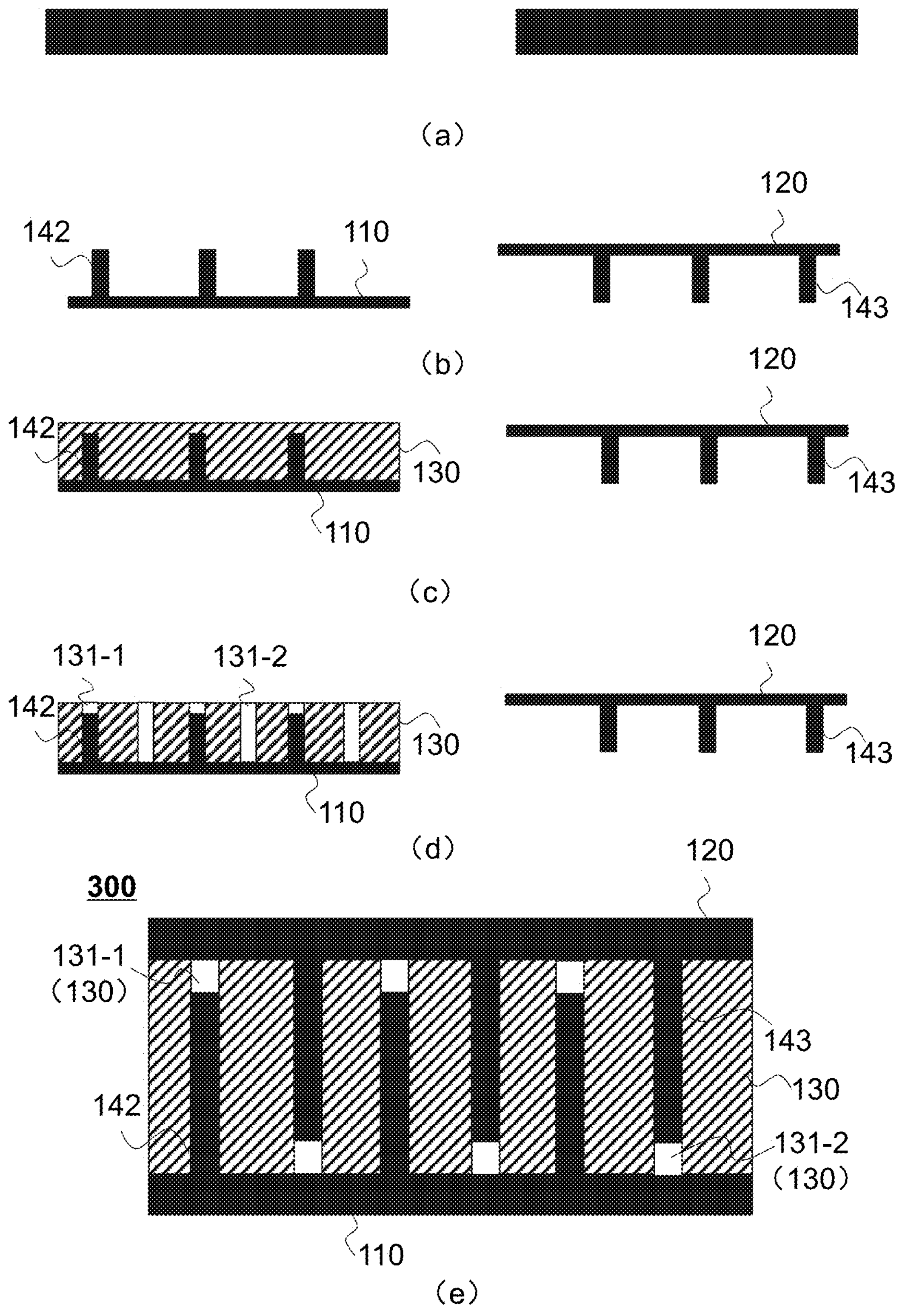
FIG. 21 is a schematic diagram illustrating another preparation process of a touch sensor according to some embodiments of the present disclosure.

FIG. 21 is a schematic diagram illustrating another preparation process of a touch sensor according to some embodiments of the present disclosure. Referring to FIG. 11 and FIG. 21, in some embodiments, the touch sensor 300 may be prepared according to the process 1100. In some embodiments, the process 1100 may include the following operations.

In 1110, an electrode having a plate structure may be obtained by performing patterning on at least one of two conductive structures, the electrode being provided with at least one conduction post protruding relative to a surface of the plate structure.

In some embodiments, the conductive structure refers to a raw material made of a conductive material, as shown in (a) of FIG. 21. In some embodiments, the conductive material may include but is not limited to a metal electrode material (e.g., copper, gold, silver, platinum, palladium, iridium, etc.), a coated electrode material, a graphite electrode material, etc.

In some embodiments, patterning refers to a process for cutting the conductive structure. In some embodiments, a patterning mode may include photolithography and etching. In some embodiments, the patterning mode may also include laser, hot pressing, and other processes, which are not limited in the present disclosure.

In some embodiments, obtaining the electrode having the plate structure by performing patterning on at least one of two conductive structures, the electrode being provided with at least one conduction post protruding relative to the surface of the plate structure may include: obtaining the first electrode 110 and the second electrode 120 having a plate structure by performing patterning on the two conductive structures, the first electrode 110 being provided with the one or more second conduction posts 142 protruding relative to the surface of the plate structure, and the second electrode 120 being provided with the one or more third conduction posts 143 protruding relative to the surface of the plate structure. The one or more second conduction posts 142 and the one or more third conduction posts 143 may be staggered, as shown in (b) of FIG. 21.

In 1120, the at least one of two conductive structures after the patterning may be spin coated with a flexible material such that the flexible material covers the electrode and the at least one conduction post.

In some embodiments, the at least one of two conductive structures after the patterning may include the electrode and the at least one conduction post. The electrode may include the first electrode 110, and the at least one conduction post may include the one or more second conduction posts 142. In some embodiments, the electrode may include the second electrode 120, and the at least one conduction post may include the one or more third conduction posts 143.

As shown in (c) of FIG. 21, in some embodiments, spin coating the at least one of two conductive structures after the patterning with the flexible material such that the flexible material covers the electrode and the at least one conduction post may include: spin coating the first electrode 110 and the one or more second conduction posts 142 with a first flexible material such that the first flexible material covers the first electrode 110 and the one or more second conduction posts 142.

In some embodiments, a covering thickness of the first flexible material may be greater than a height of the one or more second conduction posts 142. In some embodiments, the second electrode 120 and the one or more third conduction post 143 may be spin coated with a second flexible material. The second flexible material may cover the second electrode 120 and the one or more third conduction posts 143.

In 1130, a substrate may be formed after the flexible material is solidified, and one or more hole portions may be provided on the substrate, the at least one conduction post being in flow communication with the outside through the one or more hole portions.

As shown in (d) of FIG. 21, in some embodiments, after the substrate 130 is formed after the flexible material is solidified, the one or more hole portions 131 may be provided on a side of the substrate 130 that is away from the first electrode 110 at positions corresponding to the one or more second conduction posts 142 and the one or more third conduction posts 143. For a hole portion 131 corresponding to the position of a second conduction post 142, the second conduction post 142 may be located in the hole portion 131, and an opening of the hole portion 131 on a side away from the first electrode 110 may be in flow communication with the outside to facilitate subsequent assembly. For a hole portion 131 corresponding to the position of a third conduction post 143, an opening at one end of the hole portion 131 may be in contact with the first electrode, and an opening at the other end of the hole portion 131 may be in flow communication with the outside.

In some embodiments, forming the substrate after the flexible material is solidified, and providing the one or more hole portions on the substrate, the at least one conduction post being in flow communication with the outside through the one or more hole portions may include: forming the first substrate 130 after the first flexible material is solidified, and providing the one or more first hole portions 131-1 and the one or more second hole portions 131-2 on the substrate 130, the one or more second conduction posts 142 being in flow communication with the outside through the one or more first hole portions 131-1, and the first electrode 110 being in flow communication with the outside through the one or more second hole portions 131-2.

As shown in (d) of FIG. 21, in some embodiments, after the substrate 130 is formed after the first flexible material is solidified, the one or more first hole portions 131-1 may be provided on a side of the substrate 130 away from the first electrode 110, and an opening of each first hole portion 131-1 on a side away from the first electrode 110 may be in flow communication with the outside, such that the one or more second conduction posts 142 may correspond to the one or more first hole portions 131-1 one by one. A second hole portion 131-2 may be provided between two adjacent first hole portions 131-1, and the first electrode may be in flow communication with the outside through the second hole portion 131-2, such that the third conduction post 143 may be installed in the second hole portion 131-2. The one or more second hole portions 131-2 may correspond to the one or more third conduction posts 143 one by one. In some embodiments, when a plurality of second conduction posts 142 and a plurality of third conduction posts 143 are provided, the plurality of second conduction posts 142 may not correspond to the one or more first hole portions 131-1 one by one, and the plurality of third conduction posts 143 may not correspond to the one or more second hole portions 131-2 one by one. In other words, only some of the one or more second conduction posts 142 have corresponding first hole portions 131-1 on the side away from the first electrode 110, and only some of the one or more third conduction posts 143 have corresponding second hole portions 131-2 in corresponding regions of the substrate 130.

In some embodiments, when the one or more first hole portions 131-1 are provided, a gap at a preset position and with a preset dimension may be provided between at least one of the one or more second conduction posts 142 and the first substrate 130-1; when the one or more second hole portions 131-2 are provided, a gap at a preset position and with a preset dimension may be provided between at least one of the one or more third conduction posts 143 and the second substrate 130-2.

In some embodiments, a distance between one end of a second conduction post 142 that is away from the first electrode 110 and the opening of a first hole portion 131-1 that is away from the first electrode 110, and a difference between the thickness of the first substrate 130-1 and the height of a third conduction post 143, may be the spacing t.

In some embodiments, the difference between the dimension of a first hole portion 131-1 in the extension direction of the one or more second conduction posts 142 or the thickness of the first substrate 130-1 and the height of the third conduction post 143 may be within a range of 1 μm-1 mm. In some embodiments, the difference between the dimension of the first hole portion 131-1 in the extension direction of the one or more second conduction posts 142 or the thickness of the first substrate 130-1 and the height of the third conduction post 143 may be within a range of 5 μm-500 μm. In some embodiments, the difference between the dimension of the first hole portion 131-1 in the extension direction of the one or more second conduction posts 142 or the thickness of the first substrate 130-1 and the height of the third conduction post 143 may be within a range of 10 μm-100 μm.

In some embodiments, a ratio of the difference (i.e., the spacing t) between the dimension of the first hole portion 131-1 in the extension direction of the one or more second conduction posts 142 or the thickness of the first substrate 130-1 and the height of the third conduction post 143 to the dimension (i.e., the distance/thickness T) of the first substrate 130-1 in the extension direction of the one or more second conduction posts 142 may be within a range of 1/1500-1000/1001. In some embodiments, the ratio of the difference (i.e., the spacing t) between the dimension of the first hole portion 131-1 in the extension direction of the one or more second conduction posts 142 or the thickness of the first substrate 130-1 and the height of the third conduction post 143 to the dimension (i.e., the distance/thickness T) of the first substrate 130-1 in the extension direction of the one or more second conduction posts 142 may be within a range of 2/1500-1000/1001. In some embodiments, the ratio of the difference (i.e., the spacing t) between the dimension of the first hole portion 131-1 in the extension direction of the one or more second conduction posts 142 or the thickness of the first substrate 130-1 and the height of the third conduction post 143 to the dimension (i.e., the distance/thickness T) of the first substrate 130-1 in the extension direction of the one or more second conduction posts 142 may be within a range of 4/1500-1000/1001. In some embodiments, the ratio of the difference (i.e., the spacing t) between the dimension of the first hole portion 131-1 in the extension direction of the one or more second conduction posts 142 or the thickness of the first substrate 130-1 and the height of the third conduction post 143 to the dimension (i.e., the distance/thickness T) of the first substrate 130-1 in the extension direction of the one or more second conduction posts 142 may be within a range of 5/1500-1000/1001.

In 1140, the at least one of two conductive structures after the patterning and formation of the substrate may be connected with another of the two conductive structures such that the two conductive structures are located on both sides of the substrate and cover the one or more hole portions to form the touch sensor.

In some embodiments, the at least one of two conductive structures after the patterning and formation of the substrate 130 refers to the first electrode 110 and the one or more second conduction posts 142, and the other of two conductive structures refers to the second electrode 120 and the one or more third conduction posts 143. The first electrode 110 and the second electrode 120 may be connected through the substrate 130, and the one or more third conduction posts 143 may be inserted into the one or more second hole portions 131-2, such that the first electrode 110 and the second electrode 120 may be located on both sides of the substrate 130, respectively, and the second electrode 120 may cover the one or more hole portions 131 to form the touch sensor 300 shown in (c) of FIG. 21.

In some embodiments, connecting the at least one of two conductive structures after the patterning and formation of the substrate with another of the two conductive structures such that the two conductive structures are located on both sides of the substrate and cover the one or more hole portions to form the touch sensor may include: connecting the second electrode 120 with a side of the substrate 130 away from the first electrode 110, and covering the one or more first hole portions 131-1 and the one or more second hole portions 131-2, the one or more third conduction posts 143 corresponding to openings of the one or more second hole portions 131-2 one by one.

In some embodiments, by making the one or more third conduction posts 143 correspond to the openings of the one or more second hole portions 131-2 one by one, the one or more third conduction posts 143 may be inserted into the one or more second hole portions 131-2 and fixed, such that the one or more second conduction posts 142 and the one or more third conduction posts 143 may be distributed at intervals. In addition, in the extension direction of the one or more second conduction posts 142, hollow regions of the one or more first hole portions 131-1 and hollow regions of the one or more second hole portions 131-2 may be located on both sides of the substrate 130, thereby solving the problem of low sensitivity of the touch sensor 300 when subjected to an oblique load due to uneven stiffness of the substrate 130.

The embodiments of the present disclosure further provide a sensor for recognizing a user gesture. The sensor may be configured to recognize a sliding gesture of a user on an application device (e.g., an earphone, a mobile phone, a tablet computer, a smart watch, etc.). The sensor for recognizing the user gesture will be described below with reference to FIG. 22.

Figure 22:
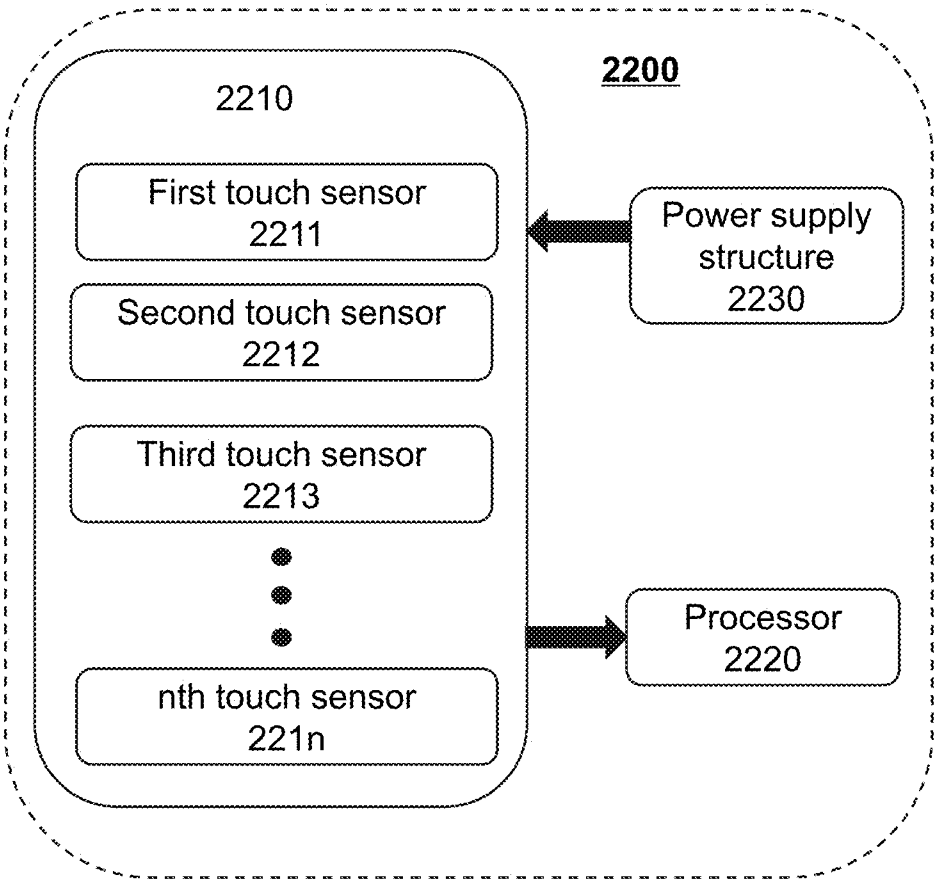
FIG. 22 is a block diagram illustrating an exemplary sensor for recognizing a user gesture according to some embodiments of the present disclosure.

FIG. 22 is a block diagram illustrating an exemplary sensor for recognizing a user gesture according to some embodiments of the present application. As shown in FIG. 22, a sensor 2200 for recognizing a user gesture may include a plurality of touch sensors 2210, a processor 2220, and a power supply structure 2230. The plurality of touch sensors 2210 may be distributed in an array. At least two of the plurality of touch sensors 2210 may form a closed circuit therein in response to the user gesture. The processor 2220 may be configured to determine a sliding direction of the user gesture based on position information of the at least two of the plurality of touch sensors 2210 and time information at which the corresponding closed circuit is formed. The power supply structure 2230 may be configured to supply power to the plurality of touch sensors 2210.

In some embodiments, when the sensor 2200 for recognizing the user gesture includes only one touch sensor, a press touch function may be realized.

In some embodiments, when the sensor 2200 for recognizing the user gesture includes the plurality of touch sensors 2210, the plurality of touch sensors 2210 may include a first touch sensor 2211, a second touch sensor 2212, . . . , an nth touch sensor **221*n*, wherein n is an integer greater than 1. More descriptions regarding any one of the first touch sensor 2211, the second touch sensor 2212, . . . , the nth touch sensor 221*n* may be found in the descriptions of any one of the touch sensors in FIGS. 1-21, which are not repeated here. The sliding operation (continuous contact) of the user may pass through at least two of the plurality of touch sensors 2210 in sequence. The at least two of the plurality of touch sensors may generate electrical signals correspondingly. The processor 2220** may determine the sliding direction of the user gesture based on the position information of the at least two of the plurality of touch sensors and the time when the electrical signals are generated.

In some embodiments, the position information of the plurality of touch sensors 2210 may be prestored in the processor 2220, such that the processor 2220 may directly obtain the position information of the touch sensors that generate the electrical signals. The processor 2220 may receive the electrical signals, i.e., obtain the position information of the corresponding touch sensors, and determine the sliding direction of the user gesture according to the receiving order of the electrical signals. For example, if the positions of the first touch sensor 2211, the second touch sensor 2212 and the third touch sensor 2213 are a point A, a point B, and a point C, respectively, the processor 2220 may receive the electrical signals of the second touch sensor 2212, the first touch sensor 2211, and the third touch sensor 2213 in sequence, and the processor 2230 may determine that the sliding direction of the user gesture is from the point B to the point A and then to the point C. In some embodiments, the sensor 2200 for recognizing the user gesture may further include a storage device (not shown in the figure). The storage device may be configured to store the position information of the plurality of touch sensors. The processor 2220 may receive the electrical signals and may obtain the position information of the corresponding touch sensors from the storage device.

In some embodiments, the sensor 2200 for recognizing the user gesture may further include a timer (not shown in the figure). The timer may be configured to provide the real time. The processor 2220 may read the real time from the timer. The processor 2220 may immediately read the real time from the timer upon receiving the electrical signals, and determine the sliding direction of the user gesture based on the position information of the touch sensors corresponding to the electrical signals and the real time. For example, if the positions of the first touch sensor 2211, the second touch sensor 2212, and the third touch sensor 2213 are the point A, the point B, and the point C, respectively, and the time when the first touch sensor 2211, the second touch sensor 2212, and the third touch sensor 2213 generate the electrical signals is a, b, and c, respectively, wherein c>a>b, the processor 2220 may determine that the sliding direction of the user gesture is from the point B to the point A and then to the point C.

Figure 23:
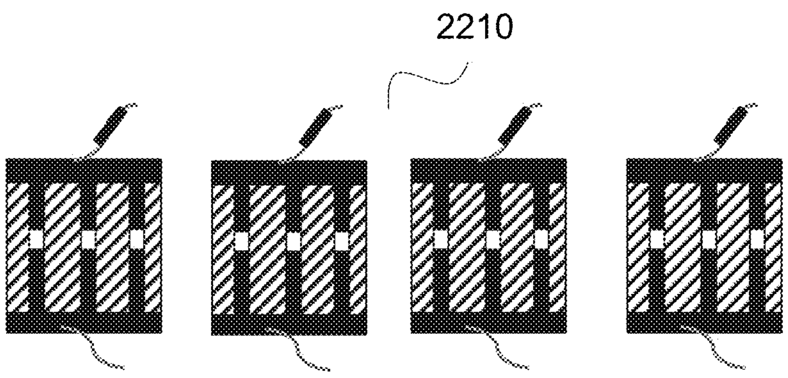
FIG. 23 is a schematic diagram illustrating a connection structure of a plurality of touch sensors according to some embodiments of the present disclosure.
Figure 23:
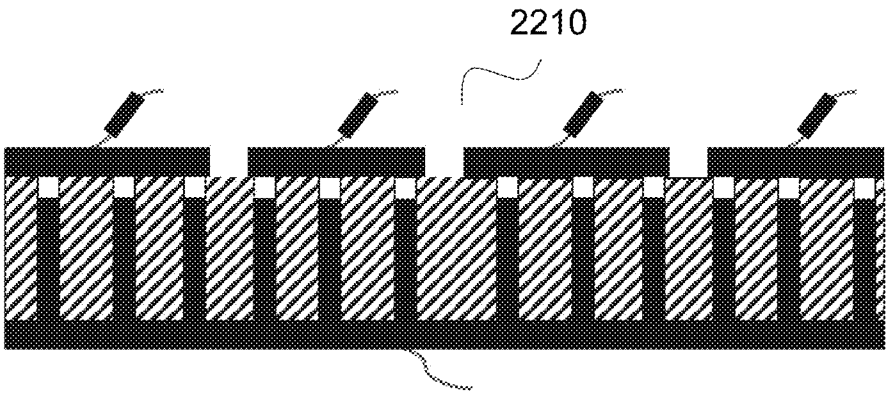

FIG. 23 is a schematic diagram illustrating a connection structure of a plurality of touch sensors according to some embodiments of the present disclosure. As shown in FIG. 22 and (a) of FIG. 23, in some embodiments, the plurality of touch sensors 2210 may be independent of each other, and each of the plurality of touch sensors may be connected with a corresponding resistor and the power supply structure 2230 through a conductive wire. For example, a first electrode of each of the plurality of touch sensors may be connected with the power supply structure 2230 through the corresponding conductive wire; a second electrode of each of the plurality of touch sensors may be connected with the corresponding resistor, and then connected with the power supply structure 2230 through the conductive wire. Each of the plurality of touch sensors may not interfere with each other. When any one of the plurality of touch sensors fails and needs to be disassembled or replaced, the plurality of touch sensors 2210 may not be affected, which is convenient for disassembly and maintenance.

As shown in FIG. 22 and (b) of FIG. 23, in some embodiments, the first electrodes or the second electrodes of the plurality of touch sensors 2210 may be an integrally formed structure. That is, the plurality of touch sensors 2210 may share one first electrode (or one second electrode), and the second electrodes (or the first electrodes) of the plurality of touch sensors 2210 may be independent of each other. In such cases, for the plurality of touch sensors 2210, one of the touch sensors cannot be disassembled individually. However, the integrally formed structure of the first electrodes or the second electrodes makes it more convenient to install the plurality of touch sensors 2210 as a whole without the need to install each touch sensor individually.

In some embodiments, the plurality of touch sensors 2210 may have various arrangements. The arrangements of the plurality of touch sensors 2210 will be described below with reference to FIGS. 24A-24C.

Figure 24A:
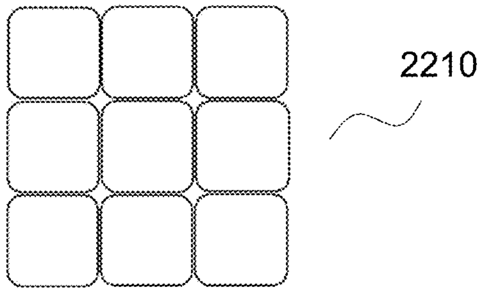
FIG. 24A is a schematic diagram illustrating a distribution of a plurality of touch sensors of a sensor for recognizing a user gesture according to some embodiments of the present disclosure.
Figure 24B:
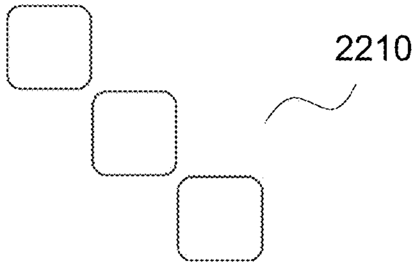
FIG. 24B is a schematic diagram illustrating a distribution of a plurality of touch sensors of a sensor for recognizing a user gesture according to some embodiments of the present disclosure.
Figure 24C:
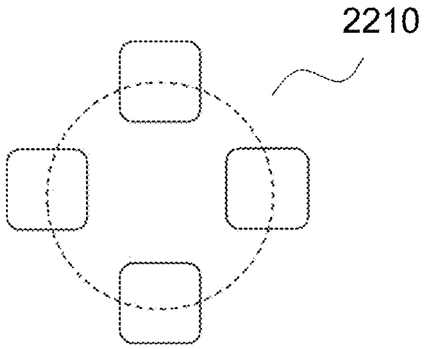
FIG. 24C is a schematic diagram illustrating a distribution of a plurality of touch sensors of a sensor for recognizing a user gesture according to some embodiments of the present disclosure.

FIGS. 24A-24C are schematic diagrams illustrating distributions of a plurality of touch sensors of a sensor for recognizing a user gesture according to some embodiments of the present disclosure. In some embodiments, the plurality of touch sensors 2210 may be arranged in a row, and a user may slide through at least two touch sensors in an arrangement direction of the plurality of touch sensors 2210. In some embodiments, the user may slide through at least two touch sensors in a direction opposite to the arrangement direction of the plurality of touch sensors 2210. In some embodiments, the user may slide back and forth along at least two of the plurality of touch sensors in a row.

In some embodiments, as shown in FIG. 24A, the plurality of touch sensors 2210 may be arranged in a rectangular array, which is conducive to increasing the diversity of sliding gestures. It should be noted that a count of the plurality of touch sensors 2210 and the arrangement thereof are not limited to the nine touch sensors 2210 and the rectangular array arrangement shown in FIG. 24A. For example, the count of the plurality of touch sensors 2210 may be two, three, four, five, or more, and the arrangement of the plurality of touch sensors 2210 may include but is not limited to other irregular shapes such as rectangular, triangular, and wavy line arrangements, etc.

As shown in FIG. 24B, the plurality of touch sensors 2210 may be arranged in a row at an angle. In some embodiments, the plurality of touch sensors 2210 may also be arranged in an X-shape, a V-shape, a W-shape, or the like.

As shown in FIG. 24C, the plurality of touch sensors 2210 may be arranged in a circular shape. In some embodiments, the plurality of touch sensors 2210 may also be arranged in an ellipse, a diamond, a triangle, etc., or in combination with the arrangement shown in FIG. 24A and FIG. 24B, or in any combination thereof.

The embodiments of the present disclosure further provide an electronic device. In some embodiments, the electronic device may include an electronic device carrier and at least one touch sensor (e.g., the touch sensor 100 shown in FIG. 2B, the touch sensor 200 shown in FIG. 14A, and the touch sensor 300 shown in FIG. 20B). In some embodiments, the electronic device carrier may include a housing, and the at least one touch sensor may be integrated in the housing of the electronic device carrier. The plurality of touch sensors 2210 shown in FIGS. 22-24C may also be applied to the electronic device. The arrangement of the plurality of touch sensors 2210 in the electronic device carrier may be similar to the arrangement of the plurality of touch sensors 2210 integrated in the electronic device carrier described in FIGS. 24A-24C.

Figure 25:
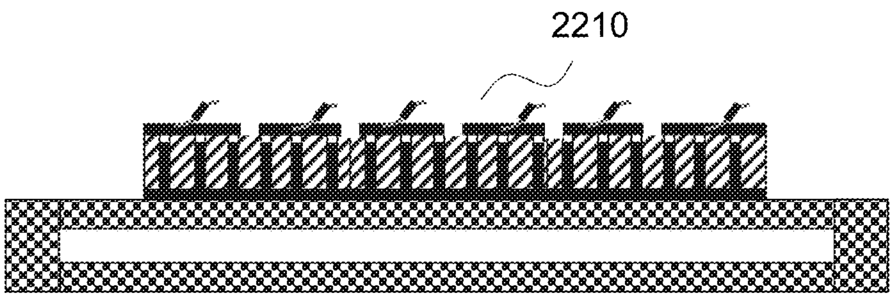
FIG. 25 is a schematic diagram illustrating a structure of a touch sensor and a housing according to some embodiments of the present disclosure.

FIG. 25 is a schematic diagram illustrating a structure of a touch sensor and a housing according to some embodiments of the present disclosure. In some embodiments, the plurality of touch sensors 2210 may be arranged outside a housing of an electronic device carrier. In this case, the first electrodes or second electrodes of the plurality of touch sensors 2210 may be located on an outer surface of the housing. In FIG. 25, the first electrodes of the plurality of touch sensors 2210 may be located on the outer surface of the housing. A user may directly contact the plurality of touch sensors 2210, such that the plurality of touch sensors 2210 may have relatively high sensitivity.

Figure 26:
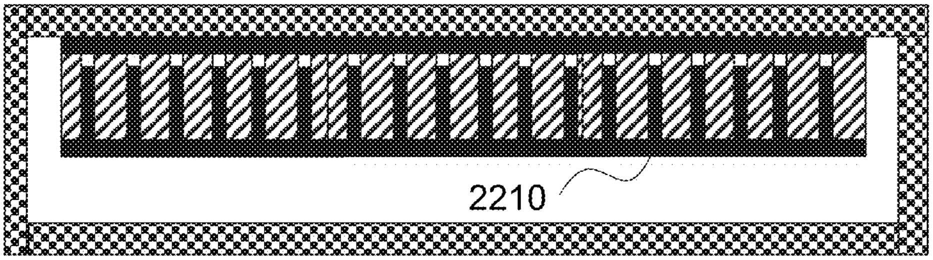
FIG. 26 is a schematic diagram illustrating another structure of a touch sensor and a housing according to some embodiments of the present disclosure.

FIG. 26 is a schematic diagram illustrating another structure of a touch sensor and a housing according to some embodiments of the present disclosure. In some embodiments, the plurality of touch sensors 2210 may be disposed in a housing of an electronic device carrier. In this case, the first electrodes or second electrodes of the plurality of touch sensors 2210 may be located on an inner surface of the housing. In FIG. 26, the second electrodes of the plurality of touch sensors 2210 may be connected with the inner surface of the housing. A user may indirectly contact the plurality of touch sensors 2210 through the housing. The housing may protect the plurality of touch sensors 2210, providing a stable operation space for the plurality of touch sensors 2210, and enhancing the anti-interference capability and operation stability of the plurality of touch sensors 2210, thereby reducing the probability of false touch.

It should be noted that, in addition to the second electrodes of the plurality of touch sensors 2210 being fixedly connected with the inner surface of the housing, the first electrodes of the plurality touch sensors 2210 may also be fixed to an inner wall (not shown in the figure) of the housing, such that when the user exerts a force on the housing and the housing deforms to drive the second electrodes to move in a direction close to the first electrodes, the first electrodes may be supported and fixed and may not move with the movement of the second electrodes, and thus the first electrodes and the second electrodes may be electrically connected through at least one conduction post. In some embodiments, the first electrodes or the second electrodes of the plurality of touch sensors 2210 may also be embedded in the housing. For example, the first electrodes or the second electrodes of the plurality of touch sensor 2210 may be embedded in the inner wall or the outer wall of the housing, which can reduce the volume of the electronic device carrier. When the user touches the housing, the touch applied by the user may also act on the first electrodes or the second electrodes of the plurality of touch sensors 2210, thereby improving the touch sensitivity of the electronic device.

In some embodiments, the electronic device carrier may include but is not limited to a mobile phone, a tablet computer, a smart watch, and an earphone. The application of the plurality of touch sensors 2210 in the electronic device will be described with reference to FIGS. 27-29.

Figure 27:
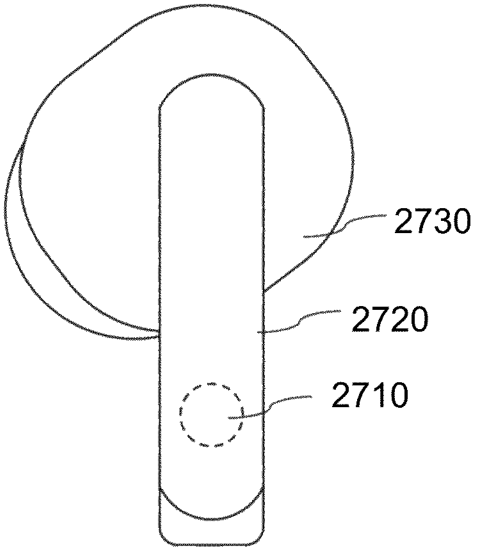
FIG. 27 is a schematic diagram illustrating an exemplary earphone according to some embodiments of the present disclosure.

FIG. 27 is a schematic diagram illustrating an exemplary earphone according to some embodiments of the present disclosure. As shown in FIG. 27, an earphone 2700 may include an earphone handle 2720 and an earphone body 2730. The earphone handle 2720 may be connected with the earphone body 2730. A touch sensor may be integrated inside the earphone. A portion of a chamber enclosed by a scaling structure may be a partial region of a surface region of the earphone 2700. For case of illustration, the partial region is defined as a touch region. Merely by way of example, a touch region 2710 of the earphone 2700 may be located on the earphone handle 2720. A user may control the earphone 2700 by acting on the touch region 2710 by tapping, long pressing, or sliding. In some embodiments, the touch region 2710 may be seamlessly connected with other regions on the surface of the earphone 2700. In some embodiments, the touch region 2710 may slightly protrude from other regions on the surface of the earphone 2700. In some embodiments, the touch region 2710 may also be integrated with other regions on the surface of the earphone 2700.

In some embodiments, the user may act on the touch region 2710 by tapping or pressing to adjust an output volume of the earphone 2700. For example, the touch region 2710 may be provided with a first touch sensor and a second touch sensor (e.g., the touch sensor 100 shown in FIG. 2B, the touch sensor 200 shown in FIG. 14A, and the touch sensor 300 shown in FIG. 20B), and the user may act on the first touch sensor by tapping or pressing to increase the volume of the earphone, and the user may act on the second touch sensor by tapping or pressing to reduce the volume of the earphone. As another example, the touch region 2710 may be provided with a sensor 2200 for recognizing a user gesture as shown in FIG. 22, and the user may control the volume by controlling a sliding direction of the gesture. For example, the user may slide in a specific direction (e.g., a length direction of the earphone handle 2720) to increase the volume of the earphone 2700, or slide in a direction opposite to the specific direction to reduce the volume of the earphone 2700. As another example, the user may long press the touch region 2710 to switch the power on and off state of the earphone 2700. As another example, the user may switch or play the audio of the earphone 2700 through different sliding directions.

In some embodiments, the touch region 2710 may be set on a side of the earphone body 2730 close to a human car when the earphone is worn, and may be configured to detect whether the earphone 2700 is worn. When the earphone 2700 is worn on the human car, a wearing portion may contact the touch region 2710, which may cause the touch region 2710 to deform, and the touch sensor may generate an electrical signal. For example, the touch sensor may generate the electrical signal with a platform peak or a spike. When the touch sensor generates the electrical signal, it means that the earphone 2700 is worn, and other processes of the earphone 2700 may be responded accordingly, such as answering a call, automatically playing music, etc. When the earphone 2700 is not worn, the touch region 2710 does not deform, and the touch sensor does not generate the electrical signal. When no electrical signal is generated, it means that the earphone 2700 is not worn, and other processes of the earphone 2700 may be responded accordingly, such as hanging up a call, pausing music, adjusting the volume, etc.

Figure 28:
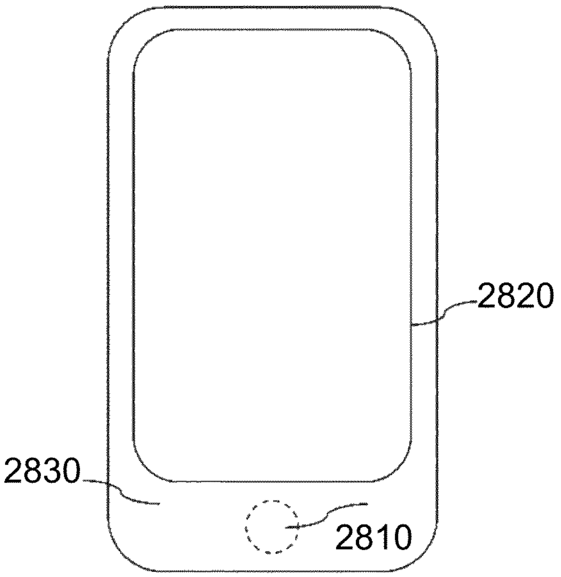
FIG. 28 is a schematic diagram illustrating an exemplary mobile phone or tablet computer according to some embodiments of the present disclosure.

FIG. 28 is a schematic diagram illustrating an exemplary mobile phone or tablet computer according to some embodiments of the present disclosure. As shown in FIG. 28, a mobile phone or tablet computer 2800 may include a display screen 2820 and a body 2830. The display screen 2820 may be embedded in the body 2830. A touch sensor or a sensor for recognizing a user gesture on the mobile phone or tablet computer 2800 may be set similarly to the touch sensor on the earphone 2700. In some embodiments, a touch region 2810 may be located on a side where the body 2830 and the display screen 2820 are coplanar. In some embodiments, the touch region 2810 may be located on a side adjacent to or opposite to the plane where the body 2830 and the display screen 2820 are located. In some embodiments, the touch region 2810 may also be integrated into the display screen 2820. A user may control the mobile phone or tablet computer 2800 by tapping, long pressing, or sliding the touch region 2810.

In some embodiments, the user may act on the touch region 2810 to wake up the mobile phone or tablet computer 2800 or make the mobile phone or tablet computer 2800 in a standby mode. In some embodiments, the user may long press the touch region 2810 to switch the power on and off state of the mobile phone or tablet computer 2800. In some embodiments, the user may act on the touch region 2810 to adjust the volume of the mobile phone or tablet computer 2800. In some embodiments, the user may act on the touch region 2810 to start a voice call or video call on the mobile phone or tablet computer 2800. In some embodiments, the user may act on the touch region 2810 to adjust the progress of a video or audio. For example, the touch region 2810 may be provided with a first touch sensor and a second touch sensor (e.g., the touch sensor 100 shown in FIG. 2B, the touch sensor 200 shown in FIG. 14A, and the touch sensor 300 shown in FIG. 20B), and the user may act on the first touch sensor by tapping or pressing to advance the progress of the video or audio, and the user may act on the second touch sensor by tapping or pressing to rewind the progress of the video or audio.

In some embodiments, the sensor 2200 for recognizing the user gesture shown in FIG. 22 may be provided in the touch region 2810, and touch portions of the plurality of touch sensors 2210 may be concentrated in the touch region 2810 of the mobile phone or tablet computer 2800 shown in FIG. 28. In some embodiments, the plurality of touch sensors 2210 may be distributed in any form shown in FIGS. 24A-24C, or in a rectangular shape, a triangular shape, or any combination thereof. The user may slide through at least two touch sensors in the touch region 2810 to control different functions of the mobile phone or tablet computer 2800. In some embodiments, the user may control the progress of the video or audio by controlling a sliding direction of the gesture. In some embodiments, the user may unlock the mobile phone or tablet computer 2800 by sliding a corresponding pattern in the touch region 2810 to compare with a preset pattern. In some embodiments, the user may slide downward in the touch region 2810 to turn the page of the mobile phone or tablet computer 2800 downward, and the user may also slide upward in the touch region 2810 to turn the page of the mobile phone or tablet computer 2800 upward. In some embodiments, the user may slide out a "Z" shape within the touch region 2810 to take a screenshot of the mobile phone or tablet computer 2800.

Figure 29:
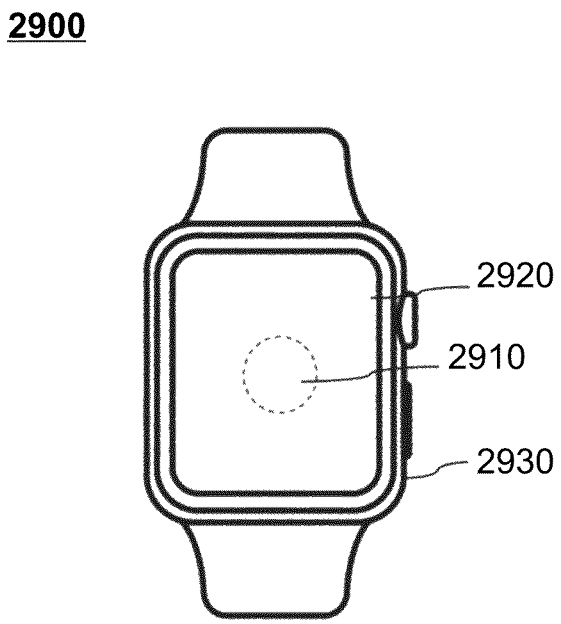
FIG. 29 is a schematic diagram illustrating an exemplary smart watch according to some embodiments of the present disclosure.

FIG. 29 is a schematic diagram illustrating an exemplary smart watch according to some embodiments of the present disclosure. As shown in FIG. 29, a smart watch 2900 may include a display screen 2920 and a dial 2930. The display screen 2920 may be embedded in the dial 2930. A touch sensor or the sensor 2200 for recognizing the user gesture on the smart watch 2900 may be set similarly to the touch sensor or the sensor 2200 for recognizing the user gestures on the mobile phone or tablet computer 2800. In some embodiments, a touch region 2910 of the smart watch 2900 may be integrated into the display screen 2920 or in a side adjacent to the display screen 2920. A user may control the smart watch 2900 by tapping, long pressing, or sliding the touch region 2910.

In some embodiments, the user may tap the touch region 2910 to wake up the smart watch 2900 or make the smart watch in a standby mode. In some embodiments, the user may long press the touch region 2910 to switch the power on and off state of the smart watch 2900 or terminate the function process of the smart watch 2900 (e.g., music switching, App conversion, audio adjustment), etc.

In some embodiments, the touch region 2910 may also be disposed on a side of the dial 2930 away from the display screen 2920 for detecting whether the smart watch 2900 is worn. A wearing detection mode may be similar to a wearing detection mode of the earphone 2700. When the smart watch 2900 is worn, the touch sensor in the touch region 2910 may respond to other processes of the smart watch 2900, such as monitoring the heart rate, etc. When the smart watch 2900 is not worn, other processes of the smart watch 2900 may also be responded, such as terminating non-essential processes, etc.

In some embodiments, the touch portions of the plurality of touch sensors 2210 may be concentrated in the touch region 2910 of the smart watch 2900 shown in FIG. 29. In some embodiments, the plurality of touch sensors 2210 may be distributed in any form shown in FIGS. 24A-24C, or in a rectangular shape, a triangular shape, or any combination thereof. A user may slide through at least two touch sensors in the touch region 2910 to control different functions of the smart watch 2900. In some embodiments, the user may unlock the smart watch 2900 by sliding a corresponding pattern in the touch region 2910 to compare with a preset pattern. In some embodiments, the user may slide down in the touch region 2910 of the smart watch 2900 to turn the page downward, and the user may also slide up in the touch region 2910 of the smart watch 2900 to turn the page upward. In some embodiments, the user may slide out an "O" shape in the touch region 2910 to hang up the call on the smart watch 2900.

In some embodiments, the electronic device carrier may further include a keyboard or a gamepad. The keyboard or the gamepad may include buttons. The touch sensor or the sensor 2200 for recognizing the user gesture may be integrated inside the keyboard or the gamepad. In some embodiments, the touch region of the touch sensor may be located below the buttons or on a button surface. In some embodiments, the user may long press the buttons to cause the touch sensor to continuously generate electrical signals to achieve continuous control of a corresponding physical quantity in the game, such as to control continuous forward or backward movement. In some embodiments, the user may press the touch region of the touch sensor with different forces to cause the touch sensor to generate electrical signals of different strengths to achieve adjustment control of the corresponding physical quantity in the game, such as the force of stepping on an accelerator, the adjustment speed of a rotation angle of a steering wheel, etc. A chamber of the touch sensor may produce different degrees of deformation under the action of forces of different magnitudes. The greater the pressing force, the greater the degree of deformation of the chamber, and the greater amplitude of the change in the air pressure in the chamber, which in turn causes the greater degree of deformation of a membrane structure, and correspondingly, the stronger the electrical signal generated by the touch sensor. For example, the user may increase the force of stepping on the accelerator in the game by pressing the touch region of the touch sensor with relatively great. As another example, the user may press the touch region of the touch sensor with greater force to make the rotation angle of the steering wheel in the game change faster.

In some embodiments, the plurality of touch sensors 2210 may be distributed on the keyboard or the gamepad in any form shown in FIGS. 24A-24C, or in a cross shape, a triangular shape, or any combination thereof, and the user may slide through at least two touch sensors in the touch region to achieve different controls of the game. In some embodiments, the touch portions of the plurality of touch sensors 2210 may be concentrated in the touch region of the buttons. In some embodiments, the user may slide back and forth, left and right on the buttons to achieve the turning of the character in the game. In some embodiments, the touch portions of the plurality of touch sensors 2210 may be dispersed in the touch region of a plurality of buttons. In some embodiments, the user may rotate and slide on the plurality of keys clockwise or counterclockwise to adjust the power storage of the bow and arrow in the game or the rotation angle of the steering wheel, etc.

It should be noted that the electronic device is not limited to the above earphone 2700, the tablet computer or mobile phone 2800, the smart watch 2900, the gamepad, the keyboard, etc., but may also be other electronic devices. For example, the electronic device may include a household appliance (e.g., a television, a refrigerator, an air conditioner, a control switch, a smart door lock, etc.), a wearable device (e.g., a virtual reality (VR) device, an augmented reality (AR) device, a helmet, glasses, etc.).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various parts described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by +20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A touch sensor, comprising:

a first electrode and a second electrode, a substrate, the first electrode and the second electrode being located on both sides of the substrate, respectively; and at least one conduction post located in the substrate, one end of the at least one conduction post being electrically connected with the first electrode or the second electrode, wherein when the substrate is in a natural state, an open circuit is formed between the first electrode, the at least one conduction post, and the second electrode, and when a user exerts a force on the first electrode or the second electrode, the substrate deforms, and the first electrode and the second electrode are electrically connected by the at least one conduction post such that a closed circuit is formed between the first electrode, the at least one conduction post, and the second electrode;

the at least one conduction post includes a first conduction post, the first conduction post includes a first end portion and a second end portion, the first end portion of the first conduction post is electrically connected with the first electrode, and when the substrate is in the natural state, a spacing is provided between the second end portion of the first conduction post and a side of the second electrode that is in contact with the substrate; and when the user exerts the force on the first electrode or the second electrode, the substrate deforms, and the second end portion of the first conduction post contacts with the second electrode such that the closed circuit is formed between the first electrode, the first conduction post, and the second electrode; wherein the spacing is within a range of 1 μm-1 mm; or a ratio of the spacing to a distance between the first electrode and the second electrode is within a range of 1/1500-1000/1001.

2. The touch sensor of claim 1, wherein the substrate is made of a flexible material, and a Young's modulus of the flexible material is within a range of 5E5 Pa-5E9 Pa.

3. The touch sensor of claim 2, wherein the spacing is within a range of 5 μm-100 μm.

4. The touch sensor of claim 2, where a ratio of the spacing to a distance between the first electrode and the second electrode is within a range of 5/1500-1000/1001.

5. The touch sensor of claim 1, wherein the substrate includes one or more hole portions, the one or more hole portions penetrate through the substrate, the at least one first conduction post is located in the one or more hole portions, and when the user exerts the force on the first electrode or the second electrode, the second end portion contacts with the second electrode.

6. The touch sensor of claim 5, wherein one or more through holes are provided on the substrate, and the one or more through holes are in flow communication with the one or more hole portions.

7. The touch sensor of claim 1, wherein a gap is provided between at least a portion of a peripheral sidewall of the at least one conduction post and the substrate in a direction perpendicular to an extension direction of the at least one conduction post.

8. The touch sensor of claim 1, further comprising a resistor, wherein when the closed circuit is formed between the first electrode, the at least one conduction post, and the second electrode, the resistor is electrically connected with the first electrode and the second electrode, respectively.

9. The touch sensor of claim 1, wherein in a direction perpendicular to an extension direction of the at least one conduction post, a gap is provided between a portion of a peripheral sidewall of the at least one conduction post and the substrate, and a remaining portion of the peripheral sidewall of the at least one conduction post is in contact with the substrate.

10. A sensor for recognizing a user gesture, comprising:

a plurality of touch sensors, each of the plurality of touch sensors including:

a first electrode and a second electrode, a substrate, the first electrode and the second electrode being located on both sides of the substrate, respectively; and at least one conduction post located in the substrate, one end of the at least one conduction post being electrically connected with the first electrode or the second electrode, wherein when the substrate is in a natural state, an open circuit is formed between the first electrode, the at least one conduction post, and the second electrode, and when a user exerts a force on the first electrode or the second electrode, the substrate deforms, and the first electrode and the second electrode are electrically connected by the at least one conduction post such that a closed circuit is formed between the first electrode, the at least one conduction post, and the second electrode, wherein the plurality of touch sensors are distributed in an array, and at least two of the plurality of touch sensors form a closed circuit therewithin in response to the user gesture;

a power supply structure, configured to supply power to the plurality of touch sensors; and a processor, configured to determine a sliding direction of the user gesture based on position information of the at least two of the plurality of touch sensors and time information at which the at least two of the plurality of touch sensors formed the closed circuit;

the at least one conduction post includes a first conduction post, the first conduction post includes a first end portion and a second end portion, the first end portion of the first conduction post is electrically connected with the first electrode, and when the substrate is in the natural state, a spacing is provided between the second end portion of the first conduction post and a side of the second electrode that is in contact with the substrate; and when the user exerts the force on the first electrode or the second electrode, the substrate deforms, and the second end portion of the first conduction post contacts with the second electrode such that the closed circuit is formed between the first electrode, the first conduction post, and the second electrode; wherein the spacing is within a range of 1 μm-1 mm; or a ratio of the spacing to a distance between the first electrode and the second electrode is within a range of 1/1500-1000/1001.

11. The sensor of claim 10, wherein the first electrodes or the second electrodes of the plurality of touch sensors have an integrally formed structure.

* * * * *